US009691410B2

(12) United States Patent
Yamamoto et al.

(10) Patent No.: US 9,691,410 B2
(45) Date of Patent: Jun. 27, 2017

(54) FREQUENCY BAND EXTENDING DEVICE AND METHOD, ENCODING DEVICE AND METHOD, DECODING DEVICE AND METHOD, AND PROGRAM

(71) Applicant: Sony Corporation, Tokyo (JP)

(72) Inventors: Yuki Yamamoto, Tokyo (JP); Toru Chinen, Kanagawa (JP); Hiroyuki Honma, Chiba (JP); Yuhki Mitsufuji, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/870,268

(22) Filed: Sep. 30, 2015

(65) Prior Publication Data

US 2016/0019911 A1 Jan. 21, 2016

Related U.S. Application Data

(63) Continuation of application No. 13/499,559, filed as application No. PCT/JP2010/066882 on Sep. 29, 2010, now Pat. No. 9,208,795.

(30) Foreign Application Priority Data

Oct. 7, 2009 (JP) ................................ 2009-233814
Apr. 13, 2010 (JP) ................................ 2010-092689
Jul. 16, 2010 (JP) ................................ 2010-162259

(51) Int. Cl.
*H04J 1/00* (2006.01)
*G10L 21/0388* (2013.01)
(Continued)

(52) U.S. Cl.
CPC ........ *G10L 21/0388* (2013.01); *G10L 21/038* (2013.01); *G10L 19/0208* (2013.01)

(58) Field of Classification Search
None
See application file for complete search history.

(56) References Cited

U.S. PATENT DOCUMENTS 4,628,529 A 12/1986 Borth et al.
6,073,100 A 6/2000 Goodridge, Jr.
(Continued)

FOREIGN PATENT DOCUMENTS

CA 2775387 A1 4/2011
CN 1328707 C 7/2007
(Continued)

OTHER PUBLICATIONS

International Search Report and Written Opinion and English translation thereof mailed Dec. 28, 2010 in connection with International Application No. PCT/JP2010/066882.
(Continued)

*Primary Examiner* — Minh-Trang Nguyen
(74) *Attorney, Agent, or Firm* — Wolf, Greenfield & Sacks, P.C.

(57) ABSTRACT

The present invention relates to a frequency band extending device and method, an encoding device and method, a decoding device and method, and a program, whereby music signals can be played with higher sound quality due to the extension of frequency bands.
A bandpass filter 13 divides an input signal into multiple sub-band signals, a feature amount calculating circuit 14 calculates feature amount using at least one of the multiple divided sub-band signals and the input signal, a high frequency sub-band power estimating circuit 15 calculates an estimated value of a high frequency sub-band power based on the calculated feature amount, a high frequency signal generating circuit 16 generates a high frequency signal component based on the multiple sub-band signals divided by the bandpass filter 13, and the estimated value of the high
(Continued)

frequency sub-band power calculated by the high frequency sub-band power estimating circuit 15. A frequency band extending device 10 extends the frequency band of the input signal using a high frequency signal component. The present invention may be applied to a frequency band extending device, for example.

10 Claims, 30 Drawing Sheets

(51) Int. Cl.
*G10L 21/038* (2013.01)
*G10L 19/02* (2013.01)

(56) References Cited

U.S. PATENT DOCUMENTS

| | | | |
|---|---|---|---|
| 6,415,251 | B1 | 7/2002 | Oikawa et al. |
| 6,708,145 | B1 | 3/2004 | Liljeryd et al. |
| 6,829,360 | B1 | 12/2004 | Iwata et al. |
| 6,895,375 | B2 | 5/2005 | Malah et al. |
| 7,003,451 | B2 | 2/2006 | Kjorling et al. |
| 7,069,212 | B2 | 6/2006 | Tanaka et al. |
| 7,139,702 | B2 | 11/2006 | Tsushima et al. |
| 7,242,710 | B2 | 7/2007 | Ekstrand |
| 7,246,065 | B2 | 7/2007 | Tanaka et al. |
| 7,318,035 | B2 | 1/2008 | Andersen et al. |
| 7,330,812 | B2 | 2/2008 | Ding |
| 7,337,118 | B2 | 2/2008 | Davidson et al. |
| 7,447,631 | B2 | 11/2008 | Truman et al. |
| 7,899,676 | B2 | 3/2011 | Honma et al. |
| 7,941,315 | B2 | 5/2011 | Matsuo |
| 7,974,847 | B2 | 7/2011 | Kjoerling et al. |
| 7,983,424 | B2 | 7/2011 | Kjorling et al. |
| 7,991,621 | B2 | 8/2011 | Oh et al. |
| 8,019,614 | B2 | 9/2011 | Takagi et al. |
| 8,032,387 | B2 | 10/2011 | Davidson et al. |
| 8,050,933 | B2 | 11/2011 | Davidson et al. |
| 8,063,809 | B2 | 11/2011 | Liu et al. |
| 8,078,474 | B2 | 12/2011 | Vos et al. |
| 8,144,804 | B2 | 3/2012 | Chinen et al. |
| 8,145,475 | B2 | 3/2012 | Kjoerling et al. |
| 8,244,524 | B2 | 8/2012 | Shirakawa et al. |
| 8,260,609 | B2 | 9/2012 | Rajendran et al. |
| 8,321,229 | B2 | 11/2012 | Choo et al. |
| 8,332,210 | B2 | 12/2012 | Nilsson et al. |
| 8,340,213 | B2 | 12/2012 | Chinen et al. |
| 8,346,566 | B2 | 1/2013 | Kjoerling et al. |
| 8,352,249 | B2 | 1/2013 | Chong et al. |
| 8,364,474 | B2 | 1/2013 | Honma et al. |
| 8,370,133 | B2 | 2/2013 | Taleb et al. |
| 8,386,243 | B2 | 2/2013 | Nilsson et al. |
| 8,407,046 | B2 | 3/2013 | Gao |
| 8,423,371 | B2 | 4/2013 | Yamanashi et al. |
| 8,433,582 | B2 | 4/2013 | Ramabadran et al. |
| 8,463,599 | B2 | 6/2013 | Ramabadran et al. |
| 8,463,602 | B2 | 6/2013 | Oshikiri |
| 8,484,036 | B2 | 7/2013 | Vos |
| 8,498,344 | B2 | 7/2013 | Wilson et al. |
| 8,527,283 | B2 | 9/2013 | Jasiuk et al. |
| 8,560,330 | B2 | 10/2013 | Gao |
| 8,688,441 | B2 | 4/2014 | Ramabadran et al. |
| 8,793,126 | B2 | 7/2014 | Gao |
| 8,818,541 | B2 | 8/2014 | Villemoes et al. |
| 8,949,119 | B2 | 2/2015 | Yamamoto et al. |
| 8,972,248 | B2 | 3/2015 | Otani et al. |
| 9,047,875 | B2 | 6/2015 | Gao |
| 9,177,563 | B2 | 11/2015 | Yamamoto et al. |
| 9,208,795 | B2 | 12/2015 | Yamamoto et al. |
| 9,294,062 | B2 | 3/2016 | Hatanaka et al. |
| 9,361,900 | B2 | 6/2016 | Yamamoto et al. |
| 9,390,717 | B2 | 7/2016 | Yamamoto et al. |
| 9,406,306 | B2 | 8/2016 | Yamamoto et al. |
| 9,406,312 | B2 | 8/2016 | Yamamoto et al. |
| 9,437,197 | B2 | 9/2016 | Honma et al. |
| 9,437,198 | B2 | 9/2016 | Hatanaka et al. |
| 9,536,542 | B2 | 1/2017 | Yamamoto et al. |
| 9,542,952 | B2 | 1/2017 | Hatanaka et al. |
| 9,583,112 | B2 | 2/2017 | Yamamoto et al. |
| 2002/0128835 | A1* | 9/2002 | Iso ........................ G10L 21/038 704/247 |
| 2003/0033142 | A1 | 2/2003 | Murashima |
| 2003/0093271 | A1 | 5/2003 | Tsushima et al. |
| 2003/0093278 | A1 | 5/2003 | Malah |
| 2003/0187663 | A1 | 10/2003 | Truman et al. |
| 2003/0233234 | A1 | 12/2003 | Truman et al. |
| 2004/0028244 | A1 | 2/2004 | Tsushima et al. |
| 2005/0004793 | A1 | 1/2005 | Ojala et al. |
| 2005/0060146 | A1 | 3/2005 | Oh |
| 2005/0096917 | A1 | 5/2005 | Kjorling et al. |
| 2005/0143985 | A1 | 6/2005 | Sung et al. |
| 2005/0267763 | A1 | 12/2005 | Ojanpera |
| 2006/0031075 | A1 | 2/2006 | Oh et al. |
| 2006/0106620 | A1 | 5/2006 | Thompson et al. |
| 2006/0136199 | A1 | 6/2006 | Nongpiur et al. |
| 2006/0251178 | A1 | 11/2006 | Oshikiri |
| 2006/0271356 | A1 | 11/2006 | Vos |
| 2007/0005351 | A1 | 1/2007 | Sathyendra et al. |
| 2007/0040709 | A1 | 2/2007 | Sung et al. |
| 2007/0071116 | A1 | 3/2007 | Oshikiri |
| 2007/0088541 | A1 | 4/2007 | Vos et al. |
| 2007/0150267 | A1 | 6/2007 | Honma et al. |
| 2007/0165869 | A1 | 7/2007 | Ojanpera |
| 2007/0174063 | A1 | 7/2007 | Mehrotra et al. |
| 2007/0219785 | A1 | 9/2007 | Gao |
| 2007/0282599 | A1 | 12/2007 | Choo et al. |
| 2007/0299656 | A1 | 12/2007 | Son et al. |
| 2008/0027733 | A1 | 1/2008 | Oshikiri et al. |
| 2008/0056511 | A1 | 3/2008 | Zhang et al. |
| 2008/0097751 | A1 | 4/2008 | Tsuchinaga et al. |
| 2008/0120118 | A1 | 5/2008 | Choo et al. |
| 2008/0129350 | A1 | 6/2008 | Mitsufuji et al. |
| 2008/0140425 | A1 | 6/2008 | Shimada |
| 2008/0253587 | A1 | 10/2008 | Une |
| 2008/0262835 | A1 | 10/2008 | Oshikiri |
| 2008/0263285 | A1 | 10/2008 | Sharma et al. |
| 2008/0270125 | A1 | 10/2008 | Choo et al. |
| 2009/0048846 | A1 | 2/2009 | Smaragdis et al. |
| 2009/0132238 | A1 | 5/2009 | Sudhakar |
| 2009/0157413 | A1 | 6/2009 | Oshikiri |
| 2009/0192792 | A1 | 7/2009 | Lee et al. |
| 2009/0228284 | A1 | 9/2009 | Moon et al. |
| 2009/0234657 | A1 | 9/2009 | Takagi et al. |
| 2009/0248407 | A1 | 10/2009 | Oshikiri |
| 2009/0265167 | A1 | 10/2009 | Ehara et al. |
| 2009/0271204 | A1 | 10/2009 | Tammi |
| 2009/0281811 | A1 | 11/2009 | Oshikiri et al. |
| 2010/0017198 | A1 | 1/2010 | Yamanashi et al. |
| 2010/0063802 | A1 | 3/2010 | Gao |
| 2010/0063812 | A1 | 3/2010 | Gao |
| 2010/0083344 | A1 | 4/2010 | Schildbach et al. |
| 2010/0106494 | A1 | 4/2010 | Honma et al. |
| 2010/0106509 | A1 | 4/2010 | Shimada |
| 2010/0161323 | A1 | 6/2010 | Oshikiri |
| 2010/0198587 | A1 | 8/2010 | Ramabadran et al. |
| 2010/0198588 | A1 | 8/2010 | Sudo et al. |
| 2010/0217607 | A1 | 8/2010 | Neuendorf et al. |
| 2010/0222907 | A1 | 9/2010 | Hashimoto |
| 2010/0226498 | A1 | 9/2010 | Kino et al. |
| 2010/0228557 | A1 | 9/2010 | Chen et al. |
| 2010/0241437 | A1 | 9/2010 | Taleb et al. |
| 2010/0280833 | A1 | 11/2010 | Yamanashi et al. |
| 2010/0286990 | A1 | 11/2010 | Biswas et al. |
| 2010/0305956 | A1 | 12/2010 | Oh et al. |
| 2010/0318350 | A1 | 12/2010 | Endo et al. |
| 2011/0046965 | A1 | 2/2011 | Taleb et al. |
| 2011/0054911 | A1 | 3/2011 | Baumgarte et al. |
| 2011/0075855 | A1 | 3/2011 | Oh et al. |
| 2011/0106529 | A1 | 5/2011 | Disch |
| 2011/0112845 | A1 | 5/2011 | Jasiuk et al. |
| 2011/0137643 | A1 | 6/2011 | Yamanashi et al. |
| 2011/0137650 | A1 | 6/2011 | Ljolje |
| 2011/0137659 | A1 | 6/2011 | Honma et al. |

(56) References Cited

U.S. PATENT DOCUMENTS

| | | | | |
|---|---|---|---|---|
| 2011/0153318 | A1 | 6/2011 | Rossello et al. | |
| 2011/0170711 | A1 | 7/2011 | Rettelbach et al. | |
| 2011/0173006 | A1 | 7/2011 | Nagel et al. | |
| 2011/0178807 | A1 | 7/2011 | Yang et al. | |
| 2011/0222630 | A1* | 9/2011 | Suzuki .................. | H03F 1/3247 375/297 |
| 2011/0264454 | A1 | 10/2011 | Ullberg et al. | |
| 2011/0282675 | A1 | 11/2011 | Nagel et al. | |
| 2011/0305352 | A1 | 12/2011 | Villemoes et al. | |
| 2012/0010880 | A1 | 1/2012 | Nagel et al. | |
| 2012/0016667 | A1 | 1/2012 | Gao | |
| 2012/0016668 | A1 | 1/2012 | Gao | |
| 2012/0057711 | A1 | 3/2012 | Makino et al. | |
| 2012/0243526 | A1 | 9/2012 | Yamamoto et al. | |
| 2012/0328124 | A1 | 12/2012 | Kjoerling | |
| 2013/0028427 | A1 | 1/2013 | Yamamoto et al. | |
| 2013/0030818 | A1 | 1/2013 | Yamamoto et al. | |
| 2013/0124214 | A1 | 5/2013 | Yamamoto et al. | |
| 2013/0202118 | A1 | 8/2013 | Yamamoto et al. | |
| 2013/0208902 | A1 | 8/2013 | Yamamoto et al. | |
| 2013/0218577 | A1 | 8/2013 | Taleb et al. | |
| 2013/0226598 | A1 | 8/2013 | Laaksonen et al. | |
| 2013/0275142 | A1 | 10/2013 | Hatanaka et al. | |
| 2014/0006037 | A1 | 1/2014 | Honma et al. | |
| 2014/0156289 | A1 | 6/2014 | Hatanaka et al. | |
| 2014/0172433 | A2 | 6/2014 | Honma et al. | |
| 2014/0180682 | A1 | 6/2014 | Shi et al. | |
| 2014/0200899 | A1 | 7/2014 | Yamamoto et al. | |
| 2014/0200900 | A1 | 7/2014 | Yamamoto et al. | |
| 2014/0205101 | A1 | 7/2014 | Yamamoto et al. | |
| 2014/0205111 | A1 | 7/2014 | Hatanaka et al. | |
| 2014/0211948 | A1 | 7/2014 | Hatanaka et al. | |
| 2014/0214432 | A1 | 7/2014 | Hatanaka et al. | |
| 2014/0214433 | A1 | 7/2014 | Hatanaka et al. | |
| 2014/0226822 | A1 | 8/2014 | Engdegard et al. | |
| 2015/0051904 | A1 | 2/2015 | Kikuiri et al. | |
| 2015/0088528 | A1 | 3/2015 | Toguri et al. | |
| 2015/0120307 | A1 | 4/2015 | Yamamoto et al. | |
| 2015/0243295 | A1 | 8/2015 | Truman et al. | |
| 2016/0012829 | A1 | 1/2016 | Yamamoto et al. | |
| 2016/0140982 | A1 | 5/2016 | Yamamoto et al. | |
| 2016/0225376 | A1 | 8/2016 | Honma et al. | |
| 2016/0322057 | A1 | 11/2016 | Yamamoto et al. | |
| 2016/0343380 | A1 | 11/2016 | Hatanaka et al. | |

FOREIGN PATENT DOCUMENTS

| | | | |
|---|---|---|---|
| CN | 1992533 | A | 7/2007 |
| CN | 101083076 | A | 12/2007 |
| CN | 101178898 | A | 5/2008 |
| CN | 101183527 | A | 5/2008 |
| CN | 101548318 | A | 9/2009 |
| CN | 101853663 | A | 6/2010 |
| CN | 101896968 | A | 11/2010 |
| EP | 1921610 | | 5/2008 |
| EP | 2019391 | A2 | 1/2009 |
| EP | 2317509 | | 5/2011 |
| EP | 2472512 | A1 | 7/2012 |
| JP | 08-008933 | A | 1/1996 |
| JP | 08-030295 | | 2/1996 |
| JP | 08-123484 | | 5/1996 |
| JP | 10-20888 | A | 1/1998 |
| JP | 3-254223 | | 11/1999 |
| JP | 2001-134287 | A1 | 5/2001 |
| JP | 2001-521648 | | 11/2001 |
| JP | 2002-536679 | | 10/2002 |
| JP | 2002-373000 | A | 12/2002 |
| JP | 2003-514267 | | 4/2003 |
| JP | 2003-216190 | | 7/2003 |
| JP | 2003-255973 | A | 9/2003 |
| JP | 2004-101720 | | 4/2004 |
| JP | 2004-258603 | | 9/2004 |
| JP | 2005-520219 | | 7/2005 |
| JP | 2005-521907 | | 7/2005 |
| JP | 2006-048043 | | 2/2006 |
| JP | 2007-017908 | A | 1/2007 |
| JP | 2007-171821 | | 7/2007 |
| JP | 2007-316254 | A | 12/2007 |
| JP | 2007-333785 | | 12/2007 |
| JP | 2008-107415 | | 5/2008 |
| JP | 2008-139844 | | 6/2008 |
| JP | 2008-224902 | | 9/2008 |
| JP | 2008-261978 | A | 10/2008 |
| JP | 2009-116275 | A1 | 5/2009 |
| JP | 2009-116371 | | 5/2009 |
| JP | 2009-134260 | A | 6/2009 |
| JP | 2010-020251 | | 1/2010 |
| JP | 2010-079275 | | 4/2010 |
| JP | 2010-526331 | A | 7/2010 |
| JP | 2010-212760 | A | 9/2010 |
| JP | 2012-504260 | A | 2/2012 |
| JP | 2013-015633 | A | 1/2013 |
| KR | 10-2006-0060928 | A | 6/2006 |
| KR | 10-2007-0083997 | A | 8/2007 |
| KR | 10-2007-0118174 | A | 12/2007 |
| WO | WO 2004/010415 | | 1/2004 |
| WO | WO 2005/111568 | | 11/2005 |
| WO | WO 2006/049205 | | 5/2006 |
| WO | WO 2006/075563 | | 7/2006 |
| WO | WO 2007/037361 | | 4/2007 |
| WO | WO 2007/052088 | A1 | 5/2007 |
| WO | WO 2007/126015 | A1 | 11/2007 |
| WO | WO 2007/129728 | A1 | 11/2007 |
| WO | WO 2007/142434 | A1 | 12/2007 |
| WO | WO 2009/001874 | A1 | 12/2008 |
| WO | WO 2009/004727 | | 1/2009 |
| WO | WO 2009/029037 | | 3/2009 |
| WO | WO 2009/054393 | | 4/2009 |
| WO | WO 2009/059631 | A1 | 5/2009 |
| WO | WO 2009/093466 | | 7/2009 |
| WO | WO 2010/024371 | | 8/2009 |
| WO | WO 2011/043227 | | 4/2011 |

OTHER PUBLICATIONS

International Search Report and Written Opinion and English translation thereof dated Jul. 12, 2011 in connection with Application No. PCT/JP2011/059028.

International Search Report and Written Opinion and English translation thereof dated Jul. 12, 2011 in connection with Application No. PCT/JP2011/059029.

English Translation of International Search Report from the Japanese Patent Office in Application No. PCT/JP2011/059030 mailed Jul. 12, 2011.

International Preliminary Report on Patentability and English translation thereof mailed Apr. 19, 2012 in connection with International Application No. PCT/JP2010/066882.

International Preliminary Report on Patentability and English translation thereof dated Oct. 26, 2012 in connection with Application No. PCT/JP2011/059028.

International Preliminary Report on Patentability and English translation thereof dated Oct. 26, 2012 in connection with Application No. PCT/JP2011/059029.

International Preliminary Report on Patentability and English translation thereof mailed Oct. 26, 2012 in connection with Application No. PCT/JP2011/059030.

International Search Report and Written Opinion and English translation thereof dated Oct. 30, 2012 in connection with Application No. PCT/JP2012/070682.

Supplementary European Search Report from the European Patent Office in Application No. 10821898.3 dated Jan. 18, 2013, 8 pages.

Written Opinion of the Intellectual Property Office of Singapore in corresponding Singapore Patent Application No. 201207284-9 mailed Oct. 23, 2013.

Supplementary European Search Report from the European Patent Office for corresponding EP 11768824 issued Nov. 6, 2013.

Supplementary European Search Report from the European Patent Office for corresponding EP 11768825 issued Nov. 12, 2013.

(56) References Cited

OTHER PUBLICATIONS

Supplementary European Search Report from the European Patent Office for corresponding EP 11768826 issued Nov. 14, 2013.
International Preliminary Report on Patentability and English translation thereof dated Mar. 6, 2014 in connection with Application No. PCT/JP2012/070682.
Notification of the Second Office Action of the State Intellectual Property Office of People's Republic of China in corresponding Chinese Patent Application No. 201180018932.3 mailed Mar. 26, 2014.
Office Action issued by the Japanese Patent Office on Aug. 5, 2014, in counterpart Japanese Application No. JP 2011-072382.
Office Action issued by the Japanese Patent Office on Aug. 12, 2014, in counterpart Japanese Application No. JP 2011-072380.
Office Action issued by the Japanese Patent Office on Oct. 15, 2014, in counterpart Japanese Application No. JP 2010-162259.
Office Action issued by the Japanese Patent Office on Mar. 17, 2015 in counterpart Japanese Application No. JP 2011-072380.
Extended European Search Report Issued Apr. 15, 2015 in connection with Application No. 12825891.0.
Japanese Office Action mailed Jul. 7, 2015 in connection with Japanese Application No. 2014-160284 and English translation thereof.
Korean Office Action mailed Oct. 8, 2015 and English translation thereof in connection with Korean Application No. 10-2012-7008330.
Chennoukh et al., Speech Enhancement Via Frequency Bandwidth Extension Using Line Spectral Frequencies, IEEE International Conference on Acoustics, Speech and Signal Processing, vol. 1, pp. 665-668 (2001).
Liu Chi-Min et al., High Frequency Reconstruction for Band-Limited Audio Signals, Proc. of the $6^{th}$ Int. Conference on Digital Audio Effects (DAFX-03), Sep. 8-11, 2003, 6 pages.
Abstract of International Application No. PCT/IB1998/000893, filed Jun. 9, 1998 (1 page).
Abstract of Internatonal Application No. PCT/JP2003/011601, filed Sep. 11, 2003 (2 pages).
Chinen et al., Report on PVC CE for SBR in USAC, Motion Picture Expert Group Meeting, Oct. 28, 2010, ISO/IEC JTC1/SC29/WG11, No. M18399, 47 pages.
Krishnan et al., EVRC-Wideband: The New 3GPP2 Wideband Vocoder Standard, Qualcomm Inc., IEEE International Conference on Acoustics, Speech, and Signal Processing, Apr. 15, 2007, pp. II-333-336.
No Author Listed, Information technology—Coding of audio-visual objects—Part 3: Audio, International Standard, ISO/IEC 14496-3:/ Amd.1:1999(E), ISO/IEC JTC 1/SC 29/WG 11, 199 pages.
No Author Listed, Information technology Coding of audio-visual objects Part 3: Audio, International Standard, ISO/IEC 14496-3:2001(E), Second Edition, Dec. 15, 2001, 110 pages.
Korean Office Action mailed Apr. 19, 2017 and English translation thereof in connection with Korean Application No. 10-2012-7026063.
Korean Office Action mailed Apr. 19, 2017 and English translation thereof in connection with Korean Application No. 10-2012-7026087.

* cited by examiner

FREQUENCY BAND EXTENDING DEVICE AND METHOD, ENCODING DEVICE AND METHOD, DECODING DEVICE AND METHOD, AND PROGRAM

This is a divisional patent application which claims the benefit under 35 U.S.C. §120 of U.S. application Ser. No. 13/499,559, entitled "FREQUENCY BAND EXTENDING DEVICE AND METHOD, ENCODING DEVICE AND METHOD, DECODING DEVICE AND METHOD, AND PROGRAM" filed on Jun. 11, 2012, which is herein incorporated by reference in its entirety. Foreign priority benefits are claimed under 35 U.S.C. §119(a)-(d) or 35 U.S.C. §365(b) of Japanese application number 2010-162259, filed Jul. 16, 2010, Japanese application number 2010-092689, filed Apr. 13, 2010, and Japanese application number 2009-233814, filed Oct. 7, 2009.

TECHNICAL FIELD

The present invention relates to a frequency band extending device and method, an encoding device and method, a decoding device and method, and a program, and specifically relates to a frequency band extending device and method, an encoding device and method, a decoding device and method, and a program, whereby music signals can be played with higher sound quality due to the extension of frequency bands.

BACKGROUND ART

In recent years, music distribution services that distribute music data via the Internet or the like have come to be widely used. With such music distribution services, encoded data that is obtained by encoding music signals is distributed as music data. As an encoding method of music signals, an encoding method that suppresses file capacity of the encoded data and lowers the bit rate so to reduce the amount of time taken in the event of a download has become mainstream.

Such music signal encoding methods are largely divided into encoding methods such as MP3 (MPEG (Moving Picture Experts Group) Audio Layer 3) (International standard ISO/IEC 11172-3) and so forth, and encoding methods such as HE-AAC (High Efficiency MPEG4 AAC) (International standard ISO/IEC 14496-3) and so forth.

With the encoding method represented by MP3, music signal components of high frequency bands (hereafter called high frequencies) of approximately 15 kHz or higher that are difficult to be detected by the human ear are deleted, and the signal components of the remaining low frequency bands (hereafter called low frequencies) are encoded. This sort of encoding method will be hereafter called high frequency deleting encoding method. With this high frequency deleting encoding method, file capacity of the encoded data can be suppressed. However, high frequency sounds, while minimally, can be detected by humans, so if sound is generated and output from a music signal after decoding which is obtained by decoding the encoded data, deterioration of sound quality can occur, such as losing the realistic feeling which the original sound had, or the sound becoming muffled.

Conversely, with the encoding method represented by HE-AAC, feature information is extracted from high frequency signal components, and this is encoded together with low frequency signal components. This sort of encoding method will hereafter be called high frequency feature encoding method. With the high frequency feature encoding method, only feature information of the high frequency signal components are encoded as information relating to high frequency signal components, whereby encoding efficiency can be improved while suppressing deterioration of sound quality.

In decoding the encoded data that has been encoded with the high frequency feature encoding method, low frequency signal components and feature information are decoded, and high frequency signal components are generated from the low frequency signal components and feature information after decoding. Thus, by generating high frequency signal components from low frequency signal components, the technique to extend the frequency band of the low frequency signal components will hereafter be called a band extending technique.

As an application example of the band extending technique, there is post-processing after decoding the encoded data with the above-described high frequency deleting encoding method. In this the post-processing the frequency band of the low frequency signal components are extended by generating the high frequency signal components, lost by encoding, from the low frequency signal components after decoding (see PTL 1). Note that the method for frequency band extending in PTL 1 will hereafter be called the PTL 1 band extending method.

With the PTL 1 band extending method, a device estimates a high frequency power spectrum (hereafter called high frequency envelope, as appropriate) from the power spectrum of the input signal, with the low frequency signal components after decoding as the input signal, and generates high frequency signal components having the frequency envelope of the high frequency thereof from the low frequency signal components.

FIG. 1 shows an example of the low frequency power spectrum after decoding as the input signal and the estimated high frequency envelope.

In FIG. 1, the vertical axis represents power with logarithms, and the horizontal axis represents frequency.

A device determines the band of the low frequency end of the high frequency signal components (hereafter called extension starting band) from the type of encoding format relating to the input signal and information such as sampling rate, bit rate, and so forth (hereafter called side information). Next, the device divides the input signal serving as the low frequency signal components into multiple sub-band signals. The device finds multiple sub-band signals after dividing, i.e. an average for each group for a temporal direction of the power of each of multiple sub-band signals on the low frequency side (hereafter simply called low frequency side) from the extension starting band (hereafter called group power). As shown in FIG. 1, the device uses the average of respective group powers of multiple sub-band signals on the low frequency side as the power, and uses a point where the frequency is the frequency on the lower edge of the extension starting band as the origin point. The device estimates a linear line at a predetermined slope passing through the origin point as the frequency envelope on the higher frequency side from the extension starting band (hereafter simply called high frequency side). Note that the positions for the power direction of the origin point can be adjusted by the user. The device generates each of multiple sub-band signals on the high frequency side from multiple sub-band signals on the low frequency side so as to become frequency envelopes on the high frequency side as estimated. The device adds the multiple generated sub-band signals on the high frequency side so as to be the high frequency signal components, and further, adds the low frequency signal components and outputs this. Thus, the music signal after extension of the frequency band becomes much closer to the original music signal. Accordingly, music signals with higher sound quality can be played.

The above described PTL 1 band extending method has the advantages of being able to extend the frequency bands for music signals after decoding the encoded data thereof, with such encoded data having various high frequency deleting encoding methods and various bit rates.

CITATION LIST

Patent Literature

PTL 1: Japanese Unexamined Patent Application Publication No. 2008-139844

SUMMARY OF INVENTION

Technical Problem

However, the PTL 1 band extending method can be improved upon with regard to the point in that the estimated high frequency side frequency envelope is a linear line having a predetermined slope, i.e. with regard to the point that the shape of the frequency envelope is fixed.

That is to say, the power spectrum of the music signal has various shapes, and depending on the type of music signal, not a few cases will widely vary from the high frequency side frequency envelope estimated with the PTL 1 band extending method.

FIG. 2 shows an example of the original power spectrum of an attack-type music signal (attack-type music signal) which accompanies a temporally sudden change, such as when a drum is beat loudly once, for example.

Note that FIG. 2 also shows the low frequency side signal components of the attack-type music signals as input signals, from the PTL 1 band extending method, and the high frequency side frequency envelope estimated from the input signal thereof, together.

As shown in FIG. 2, the original high frequency side power spectrum on the attack-type music signal is approximately flat.

Conversely, the estimated high frequency side frequency envelope has a predetermined negative slope, and even if this is adjusted at the origin point to a power nearer the original power spectrum, the difference from the original power spectrum increases as the frequency increases.

Thus, with the PTL 1 band extending method, the estimated high frequency side frequency envelope cannot realize the original high frequency side frequency envelope with a high degree of precision. Consequently, if sound is generated and output from the music signal after extension of the frequency band, clarity of sound can be lost as compared to the original sound, from a listening perspective.

Also, with a high frequency feature encoding method such as HE-AAC or the like as described above, high frequency side frequency envelope is used as feature information of the high frequency signal components to be encoded, but the decoding side is required to reproduce the original high frequency side frequency envelope in a highly precise manner.

The present invention has been made taking such situations into consideration, and enables music signals to be played with high sound quality due to the extension of frequency bands.

Solution to Problem

A frequency band extending device according to a first aspect of the present invention includes: signal dividing means configured to divide an input signal into multiple sub-band signals; feature amount calculating means configured to calculate feature amount which expresses a feature of the input signal using at least one of the multiple sub-band signals divided by the signal dividing means, and the input signal; high frequency sub-band power estimating means configured to calculate an estimated value of a high frequency sub-band power that is the power of a sub-band signal having a higher frequency band than the input signal based on the feature amount calculated by the feature amount calculating means; and high frequency signal component generating means configured to generate a high frequency signal component based on the multiple sub-band signals divided by the signal dividing means, and the estimated value of the high frequency sub-band power calculated by the high frequency sub-band power estimating means; with the frequency band of the input signal being extended using the high frequency signal component generated by the high frequency signal component generating means.

The feature amount calculating means may calculate a low frequency sub-band power that is a power of the multiple sub-band signals as the feature amount.

The feature amount calculating means may calculate a temporal variation of a low frequency sub-band power that is a power of the multiple sub-band signals as the feature amount.

The feature amount calculating means may calculate difference between the maximum and minimum powers in a predetermined frequency band, of the input signal, as the feature amount.

The feature amount calculating means may calculate a temporal variation of difference between the maximum value and minimum value of power in a predetermined frequency band, of the input signal, as the feature amount.

The feature amount calculating means may calculate the slope of a power in a predetermined frequency band, of the input signal, as the feature amount.

The feature amount calculating means may calculate a temporal variation of the slope of a power in a predetermined frequency band, of the input signal, as the feature amount.

The high frequency sub-band power estimating means may calculate of an estimated value of the high frequency sub-band power based on the feature amount, and a coefficient for each high frequency sub-band obtained beforehand by learning.

The coefficient for each high frequency sub-band may be generated by performing clustering of the residual vector of the high frequency signal component calculated with the coefficient for each high frequency sub-band obtained by regression analysis with multiple teacher signals, and performing regression analysis, for each cluster obtained by the clustering, using the teacher signals belonging to the cluster.

The residual vector may be normalized with the dispersion value of each component of the multiple residual vectors, and the vector after normalization may be subjected to clustering.

The high frequency sub-band power estimating means may calculate an estimated value of the high frequency sub-band power based on the feature amount, and the coefficient and constant for each of the high frequency sub-bands; with the constant being calculated from a center-of-gravity vector for the new clusters obtained by further calculating the residual vector using the coefficient for each high frequency sub-band obtained by regression analysis with the teacher signals belonging to the cluster, and performing clustering of the residual vector thereof to multiple new clusters.

The high frequency sub-band power estimating means may record the coefficient for each of the high frequency sub-bands, and a pointer that determines the coefficient for the each high frequency sub-band, in a correlated manner, and also record multiple sets of the pointer and the constant, and some of the multiple sets may include a pointer having the same value.

The high frequency signal generating means may generate the high frequency signal component from a low frequency sub-band power that is a power of the multiple sub-band signals, and an estimated value of the high frequency sub-band power.

A frequency band extending method according to the first aspect of the present invention includes: a signal dividing step arranged to divide an input signal into multiple sub-band signals; a feature amount calculating step arranged to calculate feature amount which expresses a feature of the input signal using at least one of the multiple sub-band signals divided by the processing in the signal dividing step, and the input signal; a high frequency sub-band power estimating step arranged to calculate an estimated value of a high frequency sub-band power that is the power of a sub-band signal having a higher frequency band than the input signal based on the feature amount calculated by the processing in the feature amount calculating step; and a high frequency signal component generating step arranged to generate a high frequency signal component based on the multiple sub-band signals divided by the processing in the signal dividing step, and the estimated value of the high frequency sub-band power calculated by the processing in the high frequency sub-band power estimating step; with the frequency band of the input signal being extended using the high frequency signal component generated by the processing in the high frequency signal component generating step.

A program according to the first aspect of the present invention includes: a signal dividing step arranged to divide an input signal into multiple sub-band signals; a feature amount calculating step arranged to calculate feature amount which expresses a feature of the input signal using at least one of the multiple sub-band signals divided by the processing in the signal dividing step, and the input signal; a high frequency sub-band power estimating step arranged to calculate an estimated value of a high frequency sub-band power that is the power of a sub-band signal having a higher frequency band than the input signal based on the feature amount calculated by the processing in the feature amount calculating step; and a high frequency signal component generating step arranged to generate a high frequency signal component based on the multiple sub-band signals divided by the processing in the signal dividing step, and the estimated value of the high frequency sub-band power calculated by the processing in the high frequency sub-band power estimating step; causing a computer to execute processing for extending the frequency band of the input signal using the high frequency signal component generated by the processing in the high frequency signal component generating step.

With the first aspect of the present invention, divide an input signal is divided into multiple sub-band signals, feature amount which expresses a feature of the input signal is calculated with at least one of the multiple divided sub-band signals and the input signal, an estimated value of a high frequency sub-band power that is the power of a sub-band signal having a higher frequency band than the input signal is calculated based on the calculated feature amount, a high frequency signal component is generated based on the multiple divided sub-band signals, and the estimated value of the calculated high frequency sub-band power, and the frequency band of the input signal is generated with the generated high frequency signal component.

An encoding device according to a second aspect of the present invention includes: sub-band dividing means configured to divide an input signal into multiple sub-bands, and to generate a low frequency sub-band signal made up of multiple sub-bands at a low frequency side and a high frequency sub-band signal made up of multiple sub-bands at a high frequency side; feature amount calculating means configured to calculate feature amount that expresses a feature of the input signal, using at least one of the low frequency sub-band signal generated by the sub-band dividing means, and the input signal; pseudo high frequency sub-band power calculating means configured to calculate a pseudo high frequency sub-band power that is a pseudo power of the high frequency sub-band signal based on the feature amount calculated by the feature amount calculating means; pseudo high frequency sub-band power difference calculating means configured to calculate a high frequency sub-band power that is the power of the high frequency sub-band signal from the high frequency sub-band signal generated by the sub-band dividing means, and to calculate pseudo high frequency sub-band power difference that is difference as to the pseudo high frequency sub-band power calculated by the pseudo high frequency sub-band power calculating means; high frequency encoding means configured to encode the pseudo high frequency sub-band power difference calculated by the pseudo high frequency sub-band power difference calculating means to generate high frequency encoded data; low frequency encoding means configured to encode a low frequency signal that is a low frequency signal of the input signal to generate low frequency encoded data; and multiplexing means configured to multiplex the low frequency encoded data generated by the low frequency encoding means, and the high frequency encoded data generated by the high frequency encoding means to obtain an output code string.

The encoding device may further include low frequency decoding means configured to decode the low frequency encoded data generated by the low frequency encoding means to generate a low frequency signal; with the sub-band dividing means generating the low frequency sub-band signal from the low frequency signal generated by the low frequency decoding means.

The high frequency encoding means may calculate similarity between the pseudo high frequency sub-band power difference, and a representative vector or representative value in predetermined plurality of pseudo high frequency sub-band power difference space to generate an index corresponding to a representative vector or representative value of which the similarity is the maximum, as the high frequency encoded data.

The pseudo high frequency sub-band power difference calculating means may calculate an evaluated value based on the pseudo high frequency sub-band power of each sub-band, and the high frequency sub-band power for every multiple coefficients for calculating the pseudo high frequency sub-band power; with the high frequency encoding means generating an index indicating the coefficient of the evaluated value that is the highest evaluated value, as the high frequency encoded data.

The pseudo high frequency sub-band power difference calculating means may calculate the evaluated value based on at least any of sum of squares of the pseudo high frequency sub-band power difference of each sub-band, the maximum value of the absolute value of the pseudo high frequency sub-band power of the sub-band, or the mean value of the pseudo high frequency sub-band power difference of each sub-band.

The pseudo high frequency sub-band power difference calculating means may calculate the evaluated value based on the pseudo high frequency sub-band power difference of different frames.

The pseudo high frequency sub-band power difference calculating means may calculate the evaluated value using the pseudo high frequency sub-band power difference multiplied by weight that is weight for each sub-band such that the lower frequency side the sub-band is, the greater weight thereof is.

The pseudo high frequency sub-band power difference calculating means may calculate the evaluated value using the pseudo high frequency sub-band power difference multiplied by weight that is weight for each sub-band such that the greater the high frequency sub-band power of the sub-band is, the greater weight thereof is.

An encoding method according to the second aspect of the present invention includes: a sub-band dividing step arranged to divide an input signal into multiple sub-bands, and to generate a low frequency sub-band signal made up of multiple sub-bands at a low frequency side and a high frequency sub-band signal made up of multiple sub-bands at a high frequency side; a feature amount calculating step arranged to calculate feature amount that expresses a feature of the input signal, using at least one of the low frequency sub-band signal generated by the processing in the sub-band dividing step, and the input signal; a pseudo high frequency sub-band power calculating step arranged to calculate a pseudo high frequency sub-band power that is a pseudo power of the high frequency sub-band signal based on the feature amount calculated by the processing in the feature amount calculating step; a pseudo high frequency sub-band power difference calculating step arranged to calculate a high frequency sub-band power that is the power of the high frequency sub-band signal from the high frequency sub-band signal generated by the processing in the sub-band dividing step, and to calculate pseudo high frequency sub-band power difference that is difference as to the pseudo high frequency sub-band power calculated by the processing in the pseudo high frequency sub-band power calculating step; a high frequency encoding step arranged to encode the pseudo high frequency sub-band power difference calculated by the processing in the pseudo high frequency sub-band power difference calculating step to generate high frequency encoded data; a low frequency encoding step arranged to encode a low frequency signal that is a low frequency signal of the input signal to generate low frequency encoded data; and a multiplexing step arranged to multiplex the low frequency encoded data generated by the processing in the low frequency encoding step, and the high frequency encoded data generated by the processing in the high frequency encoding step to obtain an output code string.

A program according to the second aspect causing a computer to execute processing including: a sub-band dividing step arranged to divide an input signal into multiple sub-bands, and to generate a low frequency sub-band signal made up of multiple sub-bands at a low frequency side and a high frequency sub-band signal made up of multiple sub-bands at a high frequency side; a feature amount calculating step arranged to calculate feature amount that expresses a feature of the input signal, using at least one of the low frequency sub-band signal generated by the processing in the sub-band dividing step, and the input signal; a pseudo high frequency sub-band power calculating step arranged to calculate a pseudo high frequency sub-band power that is a pseudo power of the high frequency sub-band signal based on the feature amount calculated by the processing in the feature amount calculating step; a pseudo high frequency sub-band power difference calculating step arranged to calculate a high frequency sub-band power that is the power of the high frequency sub-band signal from the high frequency sub-band signal generated by the processing in the sub-band dividing step, and to calculate pseudo high frequency sub-band power difference that is difference as to the pseudo high frequency sub-band power calculated by the processing in the pseudo high frequency sub-band power calculating step; a high frequency encoding step arranged to encode the pseudo high frequency sub-band power difference calculated by the processing in the pseudo high frequency sub-band power difference calculating step to generate high frequency encoded data; a low frequency encoding step arranged to encode a low frequency signal that is a low frequency signal of the input signal to generate low frequency encoded data; and a multiplexing step arranged to multiplex the low frequency encoded data generated by the processing in the low frequency encoding step, and the high frequency encoded data generated by the processing in the high frequency encoding step to obtain an output code string.

With the second aspect of the present invention, an input signal is divided into multiple sub-bands, a low frequency sub-band signal made up of multiple sub-bands at a low frequency side and a high frequency sub-band signal made up of multiple sub-bands at a high frequency side are generated, feature amount that expresses a feature of the input signal is calculated with at least one of the generated low frequency sub-band signal and the input signal, a pseudo high frequency sub-band power that is a pseudo power of the high frequency sub-band signal is calculated based on the calculated feature amount, a high frequency sub-band power that is the power of the high frequency sub-band signal is calculated from the generated high frequency sub-band signal, pseudo high frequency sub-band power difference that is difference as to the calculated pseudo high frequency sub-band power is calculated, the calculated pseudo high frequency sub-band power difference is encoded to generate high frequency encoded data, a low frequency signal that is a low frequency signal of the input signal is encoded to generate low frequency encoded data, and the generated low frequency encoded data and the generated high frequency encoded data are multiplexed to obtain an output code string.

A decoding device according to a third aspect of the present invention includes: demultiplexing means configured to demultiplex input encoded data into at least low frequency encoded data and an index; low frequency decoding means configured to decode the low frequency encoded data to generate a low frequency signal; sub-band dividing means configured to divide the band of the low frequency signal into multiple low frequency sub-bands to generate a low frequency sub-band signal for each of the low frequency sub-bands; and generating means configured to generate the high frequency signal based on the index and the low frequency sub-band signal.

The index may be obtained, at a device which encodes an input signal and outputs the encoded data, based on the input signal before encoding, and the high frequency signal estimated from the input signal.

The index may have not been encoded.

The index may be information indicating an estimating coefficient used for generation of the high frequency signal.

The generating means may generate the high frequency signal based on, of the multiple estimating coefficients, the estimating coefficient indicated by the index.

The generating means may include feature amount calculating means configured to calculate feature amount that expresses a feature of the encoded data using at least one of the low frequency sub-band signal and the low frequency signal; high frequency sub-band power calculating means configured to calculate a high frequency sub-band power of a high frequency sub-band signal of the high frequency sub-band by calculation using the feature amount and the estimating coefficient regarding each of multiple high frequency sub-bands making up the band of the high frequency signal; and high frequency signal generating means configured to generate the high frequency signal based on the high frequency sub-band power and the low frequency sub-band signal.

The high frequency sub-band power calculating means may calculate the high frequency sub-band power of the high frequency sub-band by linearly combining a plurality of the feature amount using the estimating coefficient prepared for each of the high frequency sub-bands.

The feature amount calculating means may calculate a low frequency sub-band power of the low frequency sub-band signal for each of the low frequency sub-bands as the feature amount.

The index may be information indicating the estimating coefficient whereby the high frequency sub-band power most approximate to the high frequency sub-band power obtained from the high frequency signal of the input signal before encoding is obtained as a result of comparison between the high frequency sub-band power obtained from the high frequency signal of the input signal before encoding and the high frequency sub-band power generated based on the estimating coefficient of the multiple estimating coefficients.

The index may be information indicating the estimating coefficient whereby the sum of squares of difference between the high frequency sub-band power obtained from the high frequency signal of the input signal before encoding, and the high frequency sub-band power generated based on the estimating coefficient obtained for each of the high frequency sub-bands, becomes the minimum.

The encoded data may further includes difference information indicating difference between the high frequency sub-band power obtained from the high frequency signal of the input signal before encoding, and the high frequency sub-band power generated based on the estimating coefficient.

The difference information may have been encoded.

The high frequency sub-band power calculating means may add the difference indicated with the difference information included in the encoded data to the high frequency sub-band power obtained by calculation using the feature amount and the estimating coefficient; with the high frequency signal generating means generating the high frequency signal based on the high frequency sub-band power to which the difference has been added, and the low frequency sub-band signal.

The estimating coefficient may be obtained by regression analysis using the least square method with the feature amount as an explanatory variable and the high frequency sub-band power as an explained variable.

The decoding device may further include, with the index being information indicating a difference vector made up of the difference for each of the high frequency sub-bands wherein difference between the high frequency sub-band power obtained from the high frequency signal of the input signal before encoding, and the high frequency sub-band power generated based on the estimating coefficient as an element, coefficient output means configured to obtain distance between a representative vector or representative value in feature space of the difference with the difference of the high frequency sub-bands as an element, obtained beforehand for each of the estimating coefficients, and the difference vector indicated by the index, and to supply the estimating coefficient of the representative vector or the representative value whereby the distance is the shortest, of the multiple estimating coefficients, to the high frequency sub-band power calculating means.

The index may be information indicating the estimating coefficient of a plurality of the estimating coefficients whereby as a result of comparison between the high frequency signal of the input signal before encoding, and the high frequency signal generated based on the estimating coefficient, the high frequency signal most approximate to the high frequency signal of the input signal before encoding is obtained.

The estimating coefficient may be obtained by regression analysis.

The generating means may generate the high frequency signal based on information obtained by decoding the encoded index.

The index may have been subjected to entropy encoding.

A decoding method or program according to the third aspect includes: a demultiplexing step arranged to demultiplex input encoded data into at least low frequency encoded data and an index; a low frequency decoding step arranged to decode the low frequency encoded data to generate a low frequency signal; a sub-band dividing step arranged to divide the band of the low frequency signal into multiple low frequency sub-bands to generate a low frequency sub-band signal for each of the low frequency sub-bands; and a generating step arranged to generate the high frequency signal based on the index and the low frequency sub-band signal.

With the third aspect of the present invention, input encoded data is demultiplexed into at least low frequency encoded data and an index, the low frequency encoded data is decoded to generate a low frequency signal, the band of the low frequency signal is divided into multiple low frequency sub-bands to generate a low frequency sub-band signal for each of the low frequency sub-bands, and the high frequency signal is generated based on the index and the low frequency sub-band signal.

A decoding device according to a fourth aspect of the present invention includes: demultiplexing means configured to demultiplex input encoded data into low frequency encoded data and an index for obtaining an estimating coefficient used for generation of a high frequency signal; low frequency decoding means configured to decode the low frequency encoded data to generate a low frequency signal; sub-band dividing means configured to divide the band of the low frequency signal into multiple low frequency sub-bands to generate a low frequency sub-band signal for each of the low frequency sub-bands; feature amount calculating means configured to calculate feature amount that expresses a feature of the encoded data using at least one of the low frequency sub-band signal and the low frequency signal; high frequency sub-band power calculating means configured to calculate a high frequency sub-band power of the high frequency sub-band signal of the high frequency sub-band by multiplexing the feature amount by the estimating coefficient determined by the index of the multiple estimating coefficients prepared beforehand regarding each of multiple high frequency sub-bands making up the band of the high frequency signal, and obtaining the sum of the feature amount by which the estimating coefficient has been multiplied; and high frequency signal generating means configured to generate the high frequency signal using the high frequency sub-band power and the low frequency sub-band signal.

The feature amount calculating means may calculate a low frequency sub-band power of the low frequency sub-band signal for each of the low frequency sub-bands as the feature amount.

The index may be information for obtaining the estimating coefficient of the multiple estimating coefficients whereby the sum of squares of difference obtained for each of the high frequency sub-bands, which is difference between the high frequency sub-band power obtained from the true value of the high frequency signal, and the high frequency sub-band power generated with the estimating coefficient, becomes the minimum.

The index may further include difference information indicating difference between the high frequency sub-band power obtained from the true value, and the high frequency sub-band power generated with the estimating coefficient; with the high frequency sub-band power calculating means further adding the difference indicated by the difference information included in the index to the high frequency sub-band power obtained by obtaining the sum of the feature amount by which the estimating coefficient has been multiplied; and wherein the high frequency signal generating means generating the high frequency signal using the high frequency sub-band power to which the difference has been added by the high frequency sub-band power calculating means, and the low frequency sub-band signal.

The index may be information indicating the estimating coefficient.

The index may be information obtained by information indicating the estimating coefficient being subjected to entropy encoding; with the high frequency sub-band power calculating means calculating the high frequency sub-band power using the estimating coefficient indicated by information obtained by decoding the index.

The multiple estimating coefficients may be obtained beforehand by regression analysis using the least square method with the feature amount as an explanatory variable and the high frequency sub-band power as an explained variable.

The decoding device may further include, with the index being information indicating a difference vector made up of the difference for each of the high frequency sub-bands wherein difference between the high frequency sub-band power obtained from the true value of the high frequency signal, and the high frequency sub-band power generated with the estimating coefficient as an element, coefficient output means configured to obtain distance between a representative vector or representative value in feature space of the difference with the difference of the high frequency sub-bands as an element, obtained beforehand for each of the estimating coefficients, and the difference vector indicated by the index, and to supply the estimating coefficient of the representative vector or the representative value whereby the distance is the shortest, of the multiple estimating coefficients, to the high frequency sub-band power calculating means.

A decoding method or program according to the fourth aspect of the present invention includes: a demultiplexing step arranged to demultiplex input encoded data into low frequency encoded data and an index for obtaining an estimating coefficient used for generation of a high frequency signal; a low frequency decoding step arranged to decode the low frequency encoded data to generate a low frequency signal; a sub-band dividing step arranged to divide the band of the low frequency signal into multiple low frequency sub-bands to generate a low frequency sub-band signal for each of the low frequency sub-bands; a feature amount calculating step arranged to calculate feature amount that expresses a feature of the encoded data using at least one of the low frequency sub-band signal and the low frequency signal; a high frequency sub-band power calculating step arranged to calculate a high frequency sub-band power of the high frequency sub-band signal of the high frequency sub-band by multiplexing the feature amount by the estimating coefficient determined by the index of the multiple estimating coefficients prepared beforehand regarding each of multiple high frequency sub-bands making up the band of the high frequency signal, and obtaining the sum of the feature amount by which the estimating coefficient has been multiplied; and a high frequency signal generating step arranged to generate the high frequency signal using the high frequency sub-band power and the low frequency sub-band signal.

With the fourth aspect of the present invention, input encoded data is demultiplexed into low frequency encoded data and an index for obtaining an estimating coefficient used for generation of a high frequency signal, the low frequency encoded data is decoded to generate a low frequency signal, the band of the low frequency signal is divided into multiple low frequency sub-bands to generate a low frequency sub-band signal for each of the low frequency sub-bands, feature amount that expresses a feature of the encoded data is calculated with at least one of the low frequency sub-band signal and the low frequency signal, a high frequency sub-band power of the high frequency sub-band signal of the high frequency sub-band is calculated by multiplexing the feature amount by the estimating coefficient determined by the index of the multiple estimating coefficients prepared beforehand regarding each of multiple high frequency sub-bands making up the band of the high frequency signal, and obtaining the sum of the feature amount by which the estimating coefficient has been multiplied, and the high frequency signal is generated with the high frequency sub-band power and the low frequency sub-band signal.

Advantageous Effects of Invention

According to the first aspect through fourth aspect of the present invention, music signals can be played with higher sound quality due to the extension of frequency bands.

DESCRIPTION OF EMBODIMENTS

Embodiments of the present invention will be described with reference to the appended diagrams. Note that description will be given in the following order.

1. First Embodiment (in case of applying the present invention to a frequency band extending device)
2. Second Embodiment (in case of applying the present invention to an encoding device and decoding device)
3. Third Embodiment (in case of including coefficient index in high frequency encoded data)
4. Fourth Embodiment (in case of including coefficient index and pseudo high frequency sub-band power difference in the high frequency encoded data)
5. Fifth Embodiment (in case of selecting a coefficient index using an evaluation value)
6. Sixth Embodiment (in case of sharing a portion of coefficients)

<1. First Embodiment>

According to a first embodiment, processing to extend a frequency band (hereafter called frequency band extending processing) is performed as to low frequency signal components after decoding which are obtained by decoding encoded data with a high frequency deleting encoding method.

[Functional Configuration Example of Frequency Band Extending Device]

Figure 3:
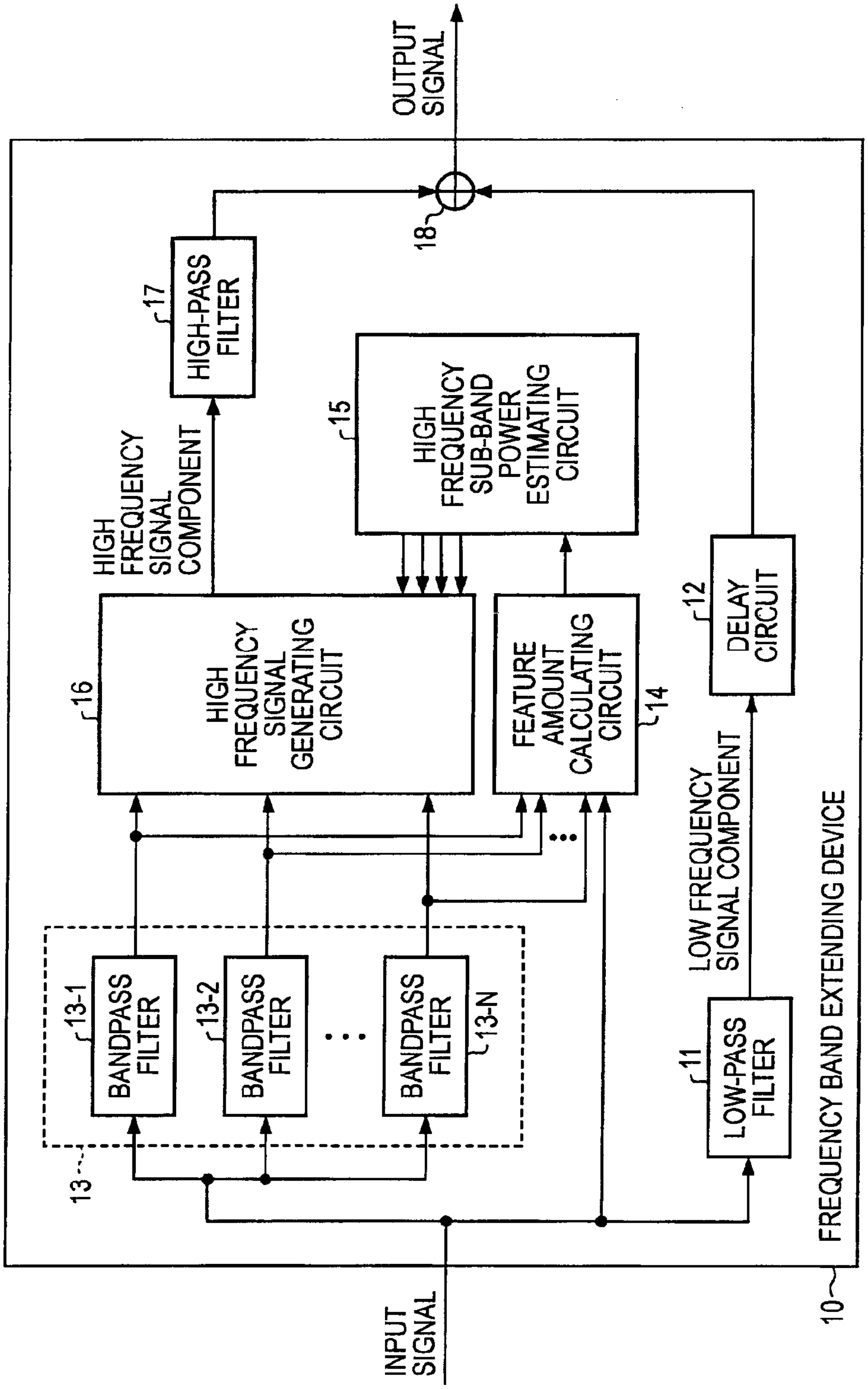
FIG. 3 is a block diagram illustrating a functional configuration example of a frequency band extending device according to a first embodiment of the present invention.

FIG. 3 shows a functional configuration example of a frequency band extending device to which the present invention is applied.

With low frequency signal components after decoding as an input signal, the frequency band extending device 10 performs frequency band extending processing as to the input signal thereof, and outputs the signal after frequency band extending processing obtained as a result thereof as an output signal.

A frequency band extending device 10 is made up of a low-pass filter 11, delay circuit 12, bandpass filter 13, feature amount calculating circuit 14, high frequency sub-band power estimating circuit 15, high frequency signal generating circuit 16, high-pass filter 17, and signal adding unit 18.

The low-pass filter 11 filters the input signal with a predetermined cutoff frequency, and supplies the low frequency signal components which are signal components of a low frequency to the delay circuit 12 as a post-filtering signal.

In order to synchronize in the event of adding together the low frequency signal components from the low-pass filter 11 and the high frequency signal components to be described later, the delay circuit 12 delays the low frequency signal components for a certain amount of delay time and then supplies to the signal adding unit 18.

The bandpass filter 13 is made up of bandpass filters 13-1 through 13-N which each have different passbands. The bandpass filter 13-$i$ ($1 \le i \le N$) allows a predetermined passband signal of the input signal to pass through, and as one of the multiple sub-band signals, supplies this to the feature amount calculating circuit 14 and high frequency signal generating circuit 16.

The feature amount calculating circuit 14 uses at least one of multiple sub-band signals from the bandpass filter 13 and the input signal to calculate one or multiple feature amounts, and supplies this to the high frequency sub-band power estimating circuit 15. Now, the feature amount is information indicating a signal feature of the input signal.

The high frequency sub-band power estimating circuit 15 calculates an estimated value of a high frequency sub-band power which is a power of a high frequency sub-band signal, for each high frequency sub-band, based on the one or multiple feature amounts from the feature amount calculating circuit 14, and supplies these to the high frequency signal generating circuit 16.

The high frequency signal generating circuit 16 generates high frequency signal components which are signal components of a high frequency, based on the multiple sub-band signals from the bandpass filter 13 and the estimated values of the multiple sub-band powers from the high frequency sub-band power estimating circuit 15, and supplies these to the high-pass filter 17.

The high-pass filter 17 filters the high frequency signal components from the high frequency signal generating circuit 16 with a cutoff frequency corresponding to the cutoff frequency in the low-pass filter 11, and supplies this to the signal adding unit 18.

The signal adding unit 18 adds a low frequency signal component from the delay circuit 12 and a high frequency signal component from the high-pass filter 17, and outputs this as the output signal.

Note that according to the configuration in FIG. 3, the bandpass filter 13 is used to obtain a sub-band signal, but the configuration is not restricted to this, and for example, a band dividing filter such as disclosed in PTL 1 may be used.

Also, similarly, according to the configuration in FIG. 3, the signal adding unit 18 is used to synthesize the sub-band signals, but the configuration is not restricted to this, and for example, a band synthesizing filter such as disclosed in PTL 1 may be used.

[Frequency Band Extending Processing of Frequency Band Extending Device]

Next, the frequency band extending processing with the frequency band extending device in FIG. 3 will be described with reference to the flowchart in FIG. 4.

In step S1, the low-pass filter 11 filters the input signal with a predetermined cutoff frequency, and supplies the low frequency signal component serving as a post-filtering signal to the delay circuit 12.

The low-pass filter 11 can set an optional frequency as the cutoff frequency, but according to the present embodiment, with a predetermined band as the extension starting band to be described later, a cutoff frequency is set corresponding to the frequency of the lower end of the extension starting band. Accordingly, the low-pass filter 11 supplies to the delay circuit 12 the low frequency signal components, which are signal components of a band lower than the extension starting band, as the post-filtering signal.

Also, the low-pass filter 11 can also set an optimal frequency as the cutoff frequency, according to encoding parameters such as the high frequency deleting encoding method and bit rate and so forth of the input signal. The side information used by the band extending method in PTL 1, for example, can be used as the encoding parameter.

In step S2, the delay circuit 12 delays the low frequency signal components from the low-pass filter 11 by just a certain amount of delay time, and supplies this to the signal adding unit 18.

In step S3, the bandpass filter 13 (bandpass filters 13-1 through 13-N) divides the input signal into multiple sub-band signals, and supplies each of the post-dividing multiple sub-band signals to a feature amount calculating circuit 14 and high frequency signal generating circuit 16. Note that details of the processing to divide the input signal with the bandpass filter 13 will be described later.

In step S4, the feature amount calculating circuit 14 uses at least one of multiple sub-band signals from the bandpass filter 13 and the input signal to calculate one or multiple feature amounts, and supplies this to the high frequency sub-band power estimating circuit 15. Note that the details of the processing to calculate the feature amount with the feature amount calculating circuit 14 will be described later.

In step S5, the high frequency sub-band power estimating circuit 15 calculates estimated values of the multiple high frequency sub-band powers, based on the one or multiple feature amounts from the feature amount calculating circuit 14, and supplies these to the high frequency signal generating circuit 16. Note that details of the processing to calculate the estimated values of the high frequency sub-band powers with the high frequency sub-band power estimating circuit 15 will be described later.

In step S6, the high frequency signal generating circuit 16 generates high frequency signal components, based on the multiple sub-band signals from the bandpass filter 13 and the estimated values of the multiple high frequency sub-band power from the high frequency sub-band power estimating circuit 15, and supplies these to the high-pass filter 17. The high frequency signal components here are signal components of a higher band than the extension starting band. Note that details of the processing to generate the high frequency signal components with the high frequency signal generating circuit 16 will be described later.

In step S7, the high-pass filter 17 filters the high frequency signal components from the high frequency signal generating circuit 16, thereby removing noise from repeating components to the low frequency included in the high frequency signal components, and the like, and supplies the high frequency signal components to the signal adding unit 18.

In step S8, the signal adding unit 18 adds the low frequency signal components from the delay circuit 12 and the high frequency signal components from the high-pass filter 17, and outputs this as an output signal.

According to the processing above, the frequency band can be extended as to the post-decoding low frequency signal components after decoding.

Next, details of the processing for each of the steps S3 through S6 in the flowchart in FIG. 4 will be described.

[Details of Processing by Bandpass Filter]

First, details of the processing by the bandpass filter 13 in step S3 of the flowchart in FIG. 4 will be described.

Note that for ease of description, hereafter, the number N of bandpass filters 13 will be N=4.

For example, one of the 16 sub-bands obtained by dividing the Nyquist frequency of the input signal into 16 equal parts may be set as the extension starting band, and of the 16 sub-bands, each of 4 sub-bands of a band lower than the extension starting band are set as passbands of the bandpass filters 13-1 through 13-4, respectively.

Figure 5:
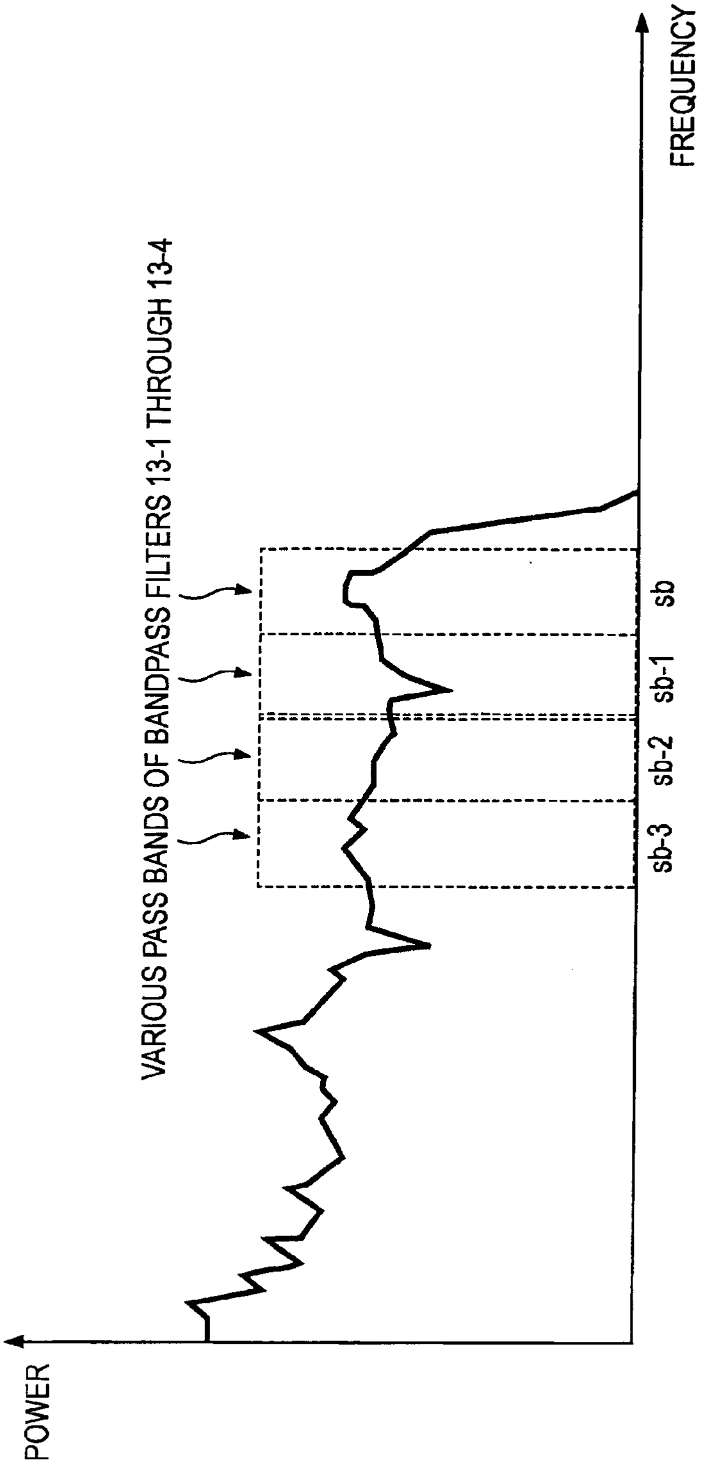
FIG. 5 is a diagram illustrating the power spectrum of the signal input in the frequency band extending device in FIG. 3 and the positioning on the frequency axis of the bandpass filter.

FIG. 5 shows the position of each of the passbands of the bandpass filters 13-1 through 13-4 on the frequency axis of each.

As shown in FIG. 5, if the first sub-band index from the high frequency of the frequency band (sub-band) that is a band lower than the extension starting band is represented as sb, and second sub-band index as sb−1, and the I'th sub-band index as sb-(I−1), each of the bandpass filters 13-1 through 13-4 are assigned to be passbands for each of the sub-bands having an index of sb through sb−3, out of the sub-bands lower than the extension starting band.

Note that according to the present embodiment, each of the passbands of the bandpass filters 13-1 through 13-4 are described as being a predetermined four out of the 16 sub-bands obtained by dividing the Nyquist frequency of the input signal into 16 equal parts, but unrestricted to this, the passbands may be a predetermined four out of 256 sub-bands obtained by dividing the Nyquist frequency of the input signal into 256 equal parts. Also, the bandwidth of each of the bandpass filters 13-1 through 13-4 may each be different.

[Details of Processing by Feature Amount Calculating Circuit]

Next, details of the processing by the feature amount calculating circuit 14 in step S4 of the flowchart in FIG. 4 will be described.

The feature amount calculating circuit 14 uses at least one of the multiple sub-band signals from the bandpass filter 13 and the input signal, and calculates one or multiple feature amounts that the high frequency sub-band power estimating circuit 15 uses for calculating the high frequency sub-band power estimating values.

More specifically, the feature amount calculating circuit 14 calculates, as feature amounts, the power of the sub-band signal (sub-band power (hereafter, also called low frequency sub-band power)) for each sub-band, from the four sub-band signals from the bandpass filter 13, and supplies these to the high frequency sub-band power estimating circuit 15.

That is to say, the feature amount calculating circuit 14 finds a low frequency sub-band power in a certain predetermined time frame, called power (ib,J), from the four sub-band signals x(ib,n) supplied from the bandpass filter 13, with Expression (1) below. Here, ib represents the sub-band index and n represents the dispersion time index. Note that the sample size of one frame is FSIZE and the power is expressed in decibels.

[Expression 1]

$$\text{power}(ib, J) = 10\log 10\left\{\left(\sum_{n=J*FSIZE}^{(J+1)FSIZE-1} \times (ib, n)^2\right) \Big/ FSIZE\right\} \quad (1)$$

$$(sb - 3 \le ib \le sb)$$

Thus, the low frequency sub-band power, power (ib,J), found with the feature amount calculating circuit 14, is supplied as a feature amount to the high frequency sub-band power estimating circuit 15.

[Details of Processing with High Frequency Sub-Band Power Estimating Circuit]

Next, details of the processing with the high frequency sub-band power estimating circuit 15 in step S5 of the flowchart in FIG. 4 will be described.

The high frequency sub-band power estimating circuit 15 calculates the estimated value of the sub-band power (high frequency sub-band power) of the band to be extended (frequency extending band) beyond the sub-band of which the index is sb+1 (extension starting band), based on the four sub-band powers supplied from the feature amount calculating circuit 14.

That is to say, if we say that the sub-band index of the highest band of the frequency extending band is eb, the high frequency sub-band power estimating circuit 15 estimates (eb-sb) numbers of the sub-band powers for the sub-bands wherein the index is sb+1 through eb.

The estimating value of the sub-band power in the frequency extending band wherein the index is ib, $power_{est}$(ib, J), uses the four sub-band powers, power(ib,j), supplied from the feature amount calculating circuit 14, and can be expressed with Expression (2) below, for example.

[Expression 2]

$$power_{est}(ib, J) = \left(\sum_{kb=sb-3}^{sb} \{A_{ib}(kb)\text{power}(kb, J)\}\right) + B_{ib} \quad (2)$$

$$(J * FSIZE \le n \le (J+1)FSIZE - 1,\ sb + 1 \le ib \le eb)$$

Now, in Expression (2), the coefficients $A_{ib}$(kb) and $B_{ib}$ are coefficients having values that differ for each sub-band ib. The coefficients $A_{ib}$(kb) and $B_{ib}$ are coefficients set appropriately so that favorable values can be obtained as to various input signals. Also, the coefficients $A_{ib}$(kb) and $B_{ib}$ are changed to optimal values by the change of the sub-band sb. Note that yielding of the coefficients $A_{ib}$(kb) and $B_{ib}$ will be described later.

In Expression (2), the high frequency sub-band power estimating values are calculated with a linear combination using the power for each of multiple sub-band signals from the bandpass filter 13, but the arrangement is not restricted to this, and for example, calculation may be performed using linear combination of multiple low frequency sub-band powers of several frames before and after a time frame J, or using non-linear functions.

Thus, the high frequency sub-band power estimating values calculated with the high frequency sub-band power estimating circuit 15 is supplied to the high frequency signal generating circuit 16.

[Details of Processing by High Frequency Signal Generating Circuit]

Next, details of processing by the high frequency signal generating circuit 16 in step S6 of the flowchart in FIG. 4 will be described.

The high frequency signal generating circuit 16 calculates a low frequency sub-band power, power(ib,J), of each sub-band from the multiple sub-band signals supplied from the bandpass filter 13, based on Expression (1) described above. The high frequency signal generating circuit 16 uses the calculated multiple low frequency sub-band powers, power(ib,J), and the high frequency sub-band power estimated values, $power_{est}$(ib,J), which are calculated based on the above-described Expression (2) by the high frequency sub-band power estimating circuit 15 to find a gain amount G(ib,J), according to Expression (3) below.

[Expression 3]

$$G(ib,J) = 10^{\{(power_{est}(ib,J) - power(sb_{map}(ib),J))/20\}}$$

$$(J*FSIZE \le n \le (J+1)FSIZE-1,\ sb+1 \le ib \le eb) \quad (3)$$

Now, in Expression (3), $sb_{map}$(ib) represents a sub-band index of an image source in the case that the sub-band ib is the sub-band of an image destination, and is expressed in Expression (4) below.

[Expression 4]

$$sb_{map}(ib) = ib - 4INT\left(\frac{ib - sb - 1}{4} + 1\right) \quad (4)$$

$$(sb + 1 \le ib \le eb)$$

Note that in Expression (4), INT(a) is a function to round down below the decimal point of a value a.

Next, the high frequency signal generating circuit 16 calculates a post-gain-adjustment sub-band signal x2(*ib,n*), by multiplying gain amount G(ib,J) found with Expression (3) by the output of the bandpass filter 13, using Expression (5) below.

[Expression 5]

$$x2(ib,n)=G(ib,J)\times(sb_{map}(ib),n)(J*FSIZE\leq n\leq(J+1)FSIZE-1,sb+1\leq ib\leq eb) \quad (5)$$

Further, the high frequency signal generating circuit 16 calculates, using Expression (6) below, a post-gain-adjustment sub-band signal x3(*ib,n*) that has been subjected to cosine transform, from the post-gain-adjustment sub-band signal x2(*ib,n*), by performing cosine adjustment to the frequency corresponding to a frequency on the upper end of the sub-band having an index of sb, from a frequency corresponding to a frequency on the lower end of the sub-band having an index of sb−3.

[Expression 6]

$$x3(ib,n)=x2(ib,n)*2\cos(n)*\{4(ib+1)\pi/32\}(sb+1\leq ib\leq eb) \quad (6)$$

Note that in Expression (6), represents the circumference ratio. Expression (6) herein means that the post-gain-adjustment sub-band signal x2(*ib,n*) is shifted toward the high frequency side frequency, by four bands worth each.

The high frequency signal generating circuit 16 then calculates high frequency signal components $x_{high}(n)$ from the post-gain-adjustment sub-band signal x3(*ib,n*) shifted toward the high frequency side, with the Expression (7) below.

[Expression 7]

$$x_{high}(n)=\sum_{ib=sb+1}^{eb}\times 3(ib,n) \quad (7)$$

Thus, high frequency signal components are generated by the high frequency signal generating circuit 16, based on the four low frequency sub-band powers calculated based on the four sub-band signals from the bandpass filter 13, and on the high frequency sub-band power estimated value from the high frequency sub-band power estimating circuit 15, and are supplied to the high-pass filter 17.

According to the above processing, as to an input signal obtained after decoding of the encoded data by a high frequency deleting encoding method, using the low frequency sub-band power calculated from multiple sub-band signals as the feature amount, based on this and an appropriately set coefficient, a high frequency sub-band power estimated value is calculated, and high frequency signal components are appropriately generated from the low frequency sub-band power and high frequency sub-band power estimated value, whereby the frequency extending band sub-band power can be estimated with high precision, and music signals can be played with higher sound quality.

Descriptions have been given above of an example wherein the feature amount calculating circuit 14 calculates only the low frequency sub-band power calculated from the multiple sub-band signals as the feature amount, but in this case, depending on the type of input signal, the sub-band power of the frequency extending band may not be able to be estimated with high precision.

Thus, the feature amount calculating circuit 14 calculates a feature amount having a strong correlation with the form of the frequency extending band sub-band power (form of high frequency power spectrum), whereby estimating the frequency extending band sub-band power at the high frequency sub-band power estimating circuit 15 can be performed with higher precision.

[Other Example of Feature Amount Calculated by Feature Amount Calculating Circuit]

Figure 6:
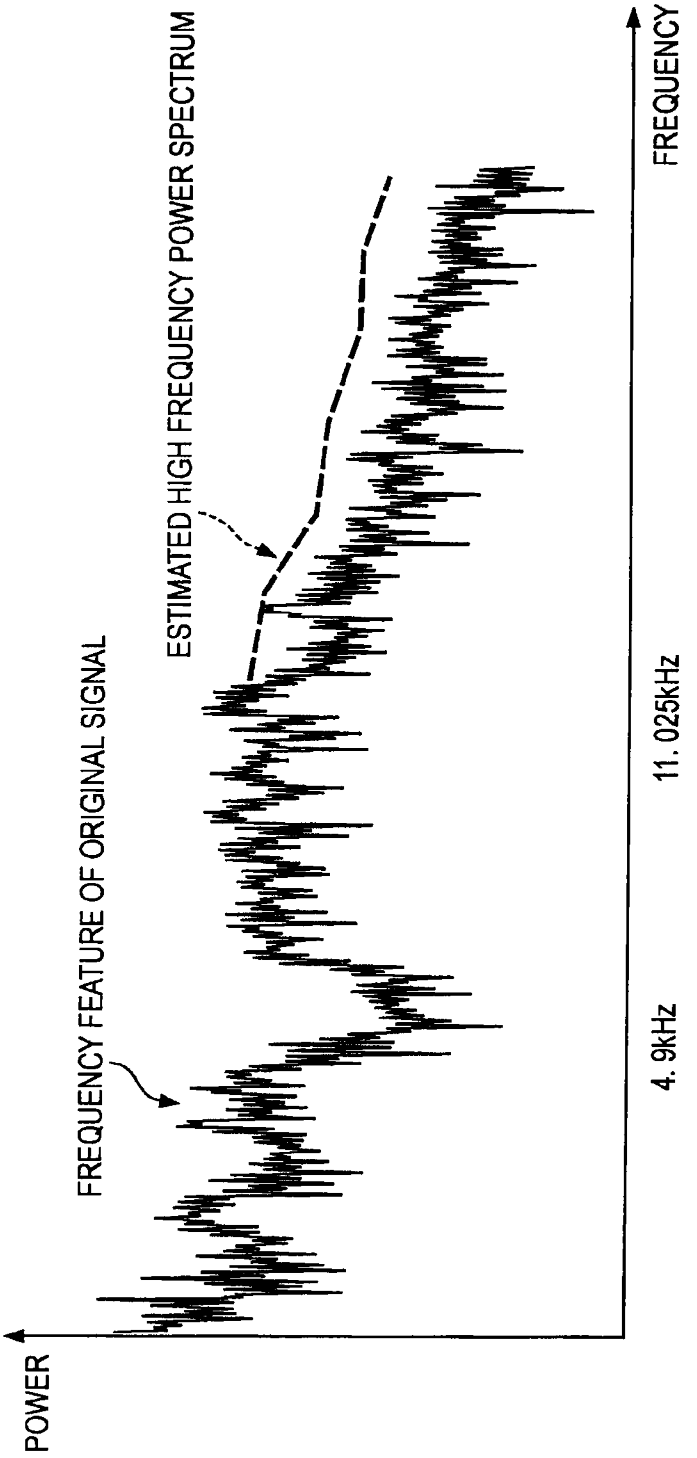
FIG. 6 is a diagram illustrating an example of the frequency feature of a vocal segment and the estimated high frequency power spectrum.

FIG. 6 shows, with regard to a certain input signal, an example of a frequency feature in a vocal segment which is a segment wherein the vocal takes up a large portion thereof, and a high frequency power spectrum obtained by calculating the low frequency sub-band power solely as a feature amount to estimate the high frequency sub-band power.

As shown in FIG. 6, in the frequency feature in a vocal segment, the estimated high frequency power spectrum is often positioned higher than the high frequency power spectrum of the original signal. Discomfort of a singing voice of a person is readily sensed by the human ear, so the high frequency sub-band power estimating needs to be particularly precisely performed in a vocal segment.

Also, as shown in FIG. 6, in the frequency feature in a vocal segment, one large recess is often seen between 4.9 kHz and 11.025 kHz.

Now, an example will be described below of an example to apply the degree of recess between 4.9 kHz and 11.025 kHz in the frequency region, serving as the feature amount used to estimate the high frequency sub-band power in a vocal segment. Note that the feature amount that indicates the degree of recess will hereafter be called dip.

A calculation example of the dip, dip(J), in time frame J will be described below.

First, 2048-point FFT (Fast Fourier Transform) is performed as to signals in 2048 sample segments included in a range of several frames before and after, including time frame J, of the input signal, and coefficients on the frequency axis are calculated. A power spectrum is obtained by performing db transform on the absolute values of the various calculated coefficients.

Figure 7:
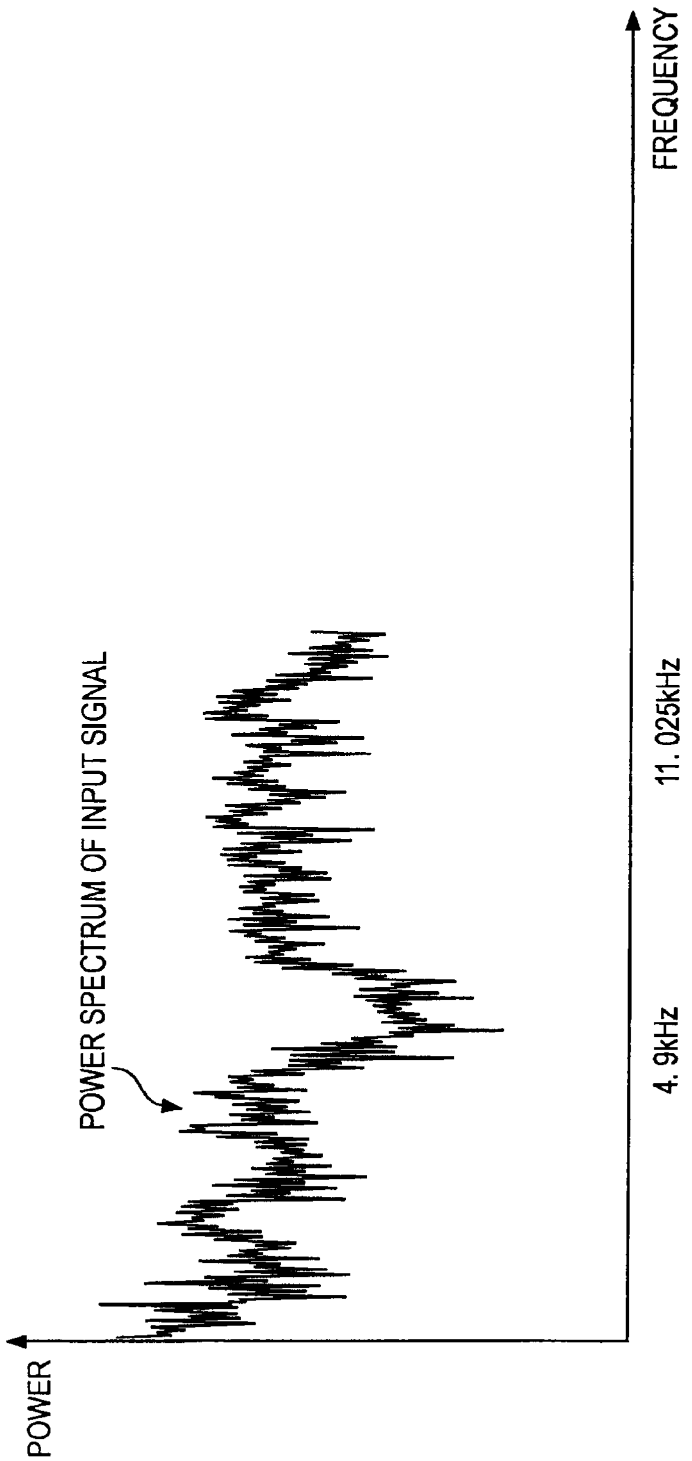
FIG. 7 is a diagram illustrating an example of the power spectrum of the signal input in the frequency band extending device in FIG. 3.

FIG. 7 shows an example of a power spectrum obtained as described above. Now, in order to remove fine components of the power spectrum, liftering processing is performed so as to remove components that are 1.3 kHz or less, for example. According to the liftering processing, the various dimensions of the power spectrum are viewed as time-series, and filtering processing is performed by applying a low-pass filter, thereby smoothing the fine components of the spectrum peak.

Figure 8:
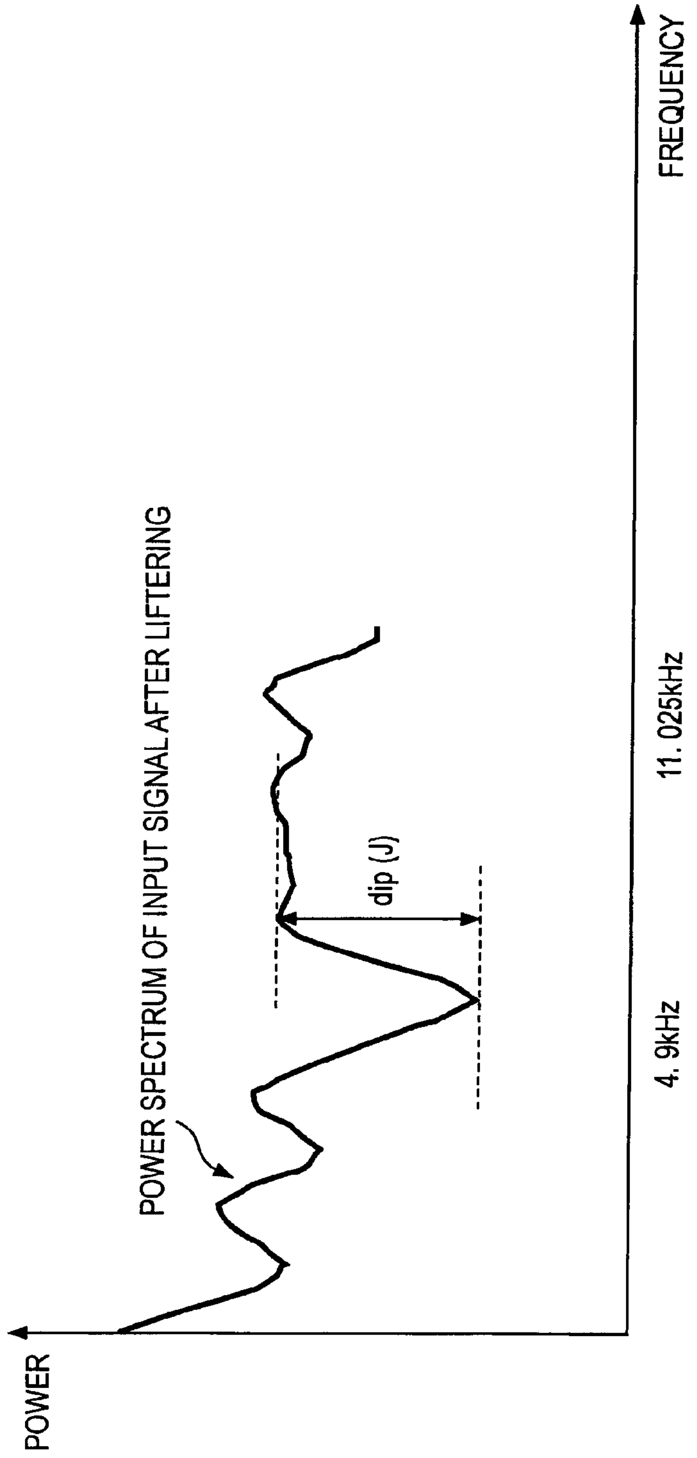
FIG. 8 is a diagram illustrating an example of a power spectrum after liftering of the input signal in FIG. 7.

FIG. 8 shows an example of a power spectrum of a post-liftering input signal. In the post-liftering power spectrum in FIG. 8, the difference between the minimum value and maximum value of the power spectrum included in a range corresponding to 4.9 kHz to 11.025 kHz is set as the dip, dip(J).

Thus, a feature amount having a feature amount that is strongly correlated with the sub-band power of a frequency extending band is calculated. Note that the calculation example of dip dip(J) is not restricted to the above-described example, and may use another method.

Next, another example of calculating a feature amount having a strong correlation with the sub-band power of a frequency extending band will be described.

[Yet Another Example of a Feature Amount Calculated with Feature Amount Calculating Circuit]

For a frequency feature of an attack segment, which is a segment including an attack-type music signal, the high frequency side power spectrum is often approximately flat in a certain input signal, as described with reference to FIG. 2. With the method to calculate solely the low frequency sub-band power as the feature amount, the frequency extending band sub-band power is estimated without using the feature amount showing a temporal variation unique to the input signal that includes the attack segment, so estimating an approximately flat frequency extending band sub-band power such as seen in an attack segment, with high precision, is difficult.

Thus, an example of applying a low frequency sub-band power temporal variation serving as a feature amount used in the estimation of high frequency sub-band power in an attack segment will be described below.

The temporal variation $power_d(J)$ of the low frequency sub-band power in a certain time frame J is found with Expression (8) below, for example.

[Expression 8]

$$power_d(J) = \sum_{ib=sb-3}^{sb} \sum_{n=J*FSIZE}^{(J+1)FSIZE-1} (x(ib, n)^2) \Big/ \sum_{ib=sb-3}^{sb} \sum_{n=(J-1)FSIZE}^{J*FSIZE-1} (x(ib, n)^2) \tag{8}$$

According to Expression (8), the temporal variation $power_d(J)$ of the low frequency sub-band power expresses a ratio of the sum of the four low frequency sub-band powers in the time frame J and the sum of the four low frequency sub-band powers in the time frame (J−1) which is one frame prior to the time frame J, and the greater this value is, the greater the temporal variation in power between frames, i.e. the stronger the attacking is considered to be of the signal included in time frame J.

Figure 1:
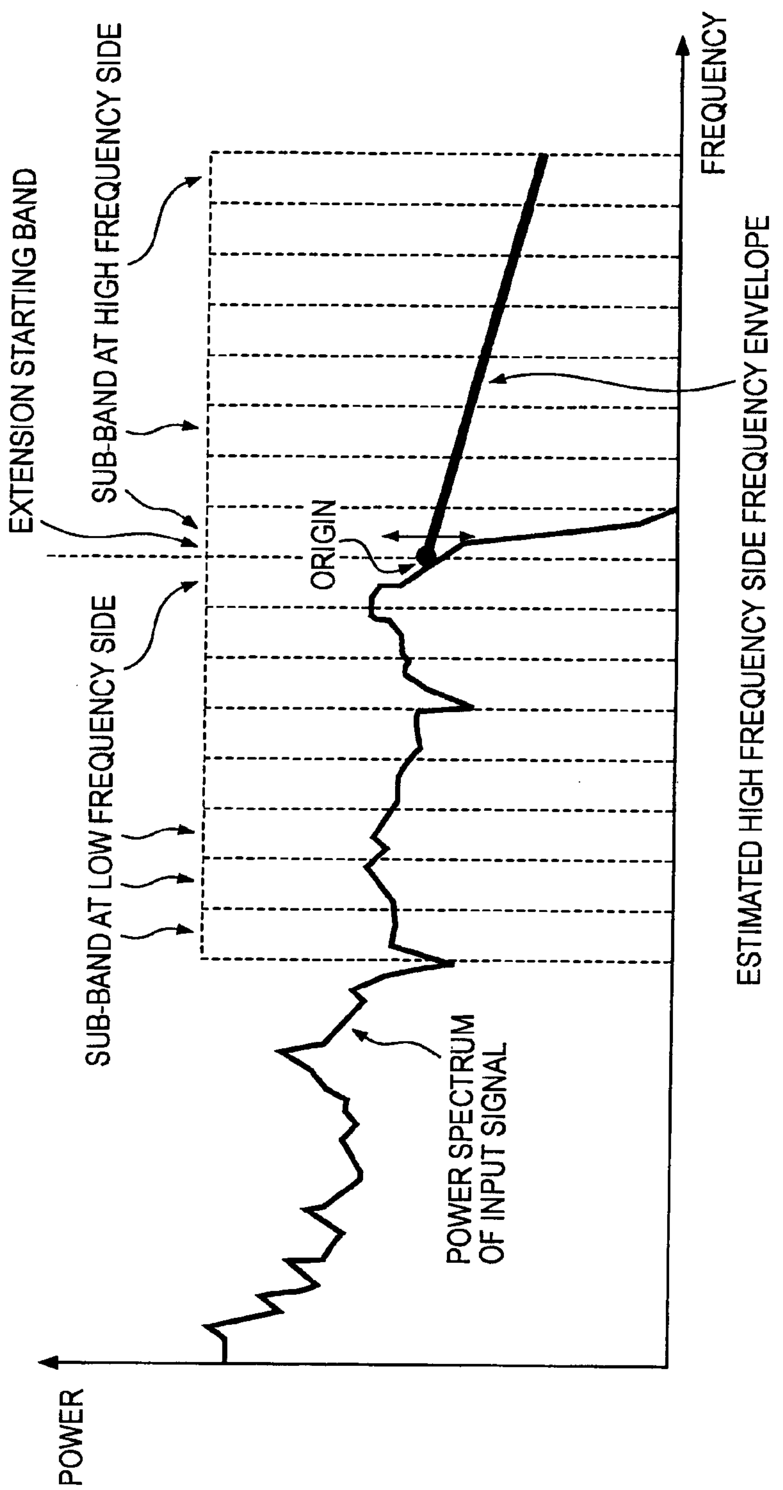
FIG. 1 is a diagram illustrating an example of a low frequency power spectrum after decoding, serving as an input signal, and an estimated high frequency envelope.
Figure 2:
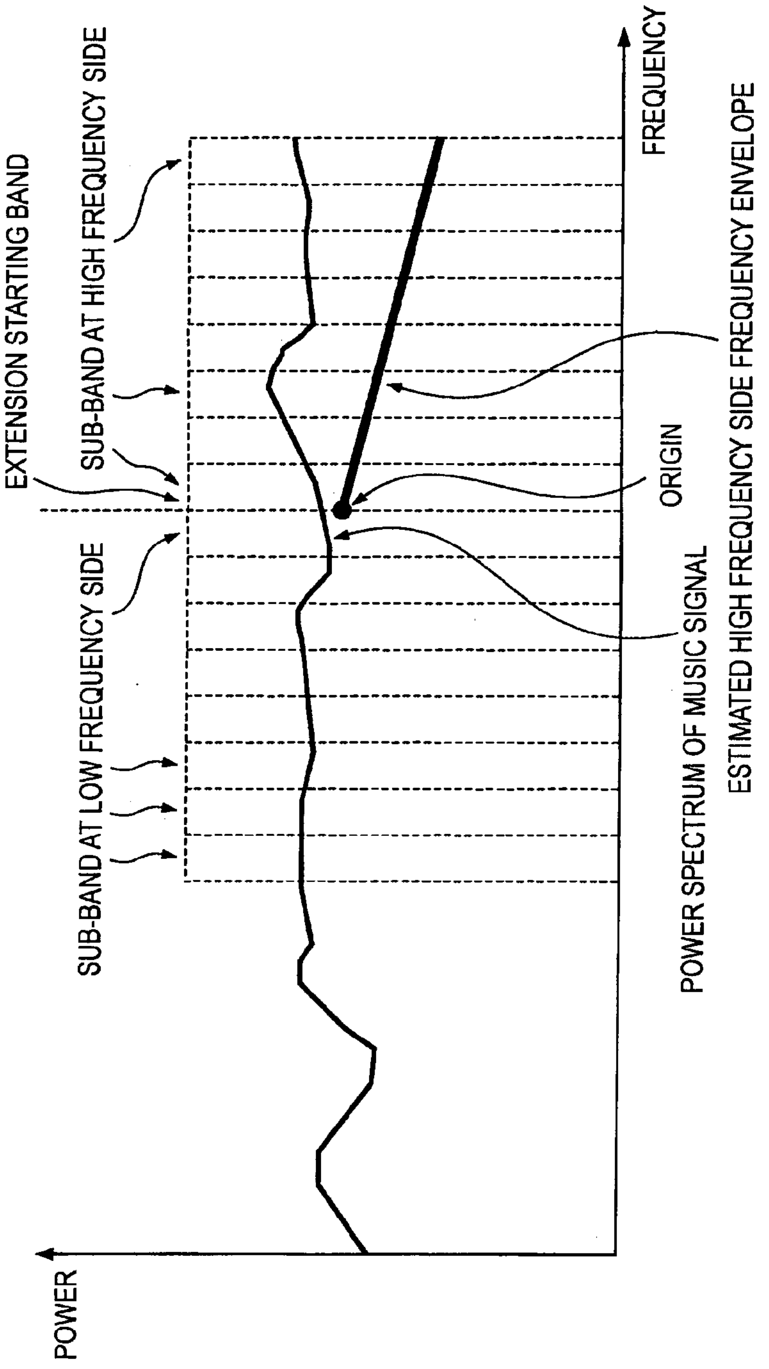
FIG. 2 is a diagram illustrating an example of an original power spectrum of an attack-type music signal which accompanies a temporally sudden change.

Also, comparing a statistically average power spectrum shown in FIG. 1 and a power spectrum in an attack segment (attack-type musical signal) shown in FIG. 2, the power spectrum in the attack segment rises to the right in a medium frequency. This sort of frequency feature is often shown in attack segments.

Now, an example of applying a slope in the medium frequency will be described below, as a feature amount used to estimate the high frequency sub-band power in an attack segment.

The slope, slope(J), in the medium frequency of a certain time frame J is obtained with Expression (9) below, for example.

[Expression 1]

$$\mathrm{slope}(J) = \sum_{ib=sb-3}^{sb} \sum_{n=J*FSIZE}^{(J+1)FSIZE-1} \{W(ib) * x(ib, n)^2\} \Big/ \sum_{ib=sb-3}^{sb} \sum_{n=J*FSIZE}^{(J+1)FSIZE-1} (x(ib, n)^2) \tag{9}$$

In Expression (9), the coefficient w(ib) is a weighted coefficient that is adjusted to be weighted by the high frequency sub-band power. According to Expression (9), the slope(J) expresses the ratio between the sum of the four low frequency sub-band powers weighted by the high frequency and the sum of the four low frequency sub-band powers. For example, in the case that the four low frequency sub-band powers become a power corresponding to a medium frequency sub-band, the slope(J) takes a greater value when the medium frequency power spectrum rises to the right, and a smaller value when falling to the right.

Also, in many cases the medium frequency slope varies widely before and after an attack segment, whereby the slope temporal variation, $\mathrm{slope}_d(J)$, expressed with Expression (10) below may be set as the feature amount used to estimate the high frequency sub-band power of an attack segment.

[Expression 10]

$$\mathrm{slope}_d(J)=\mathrm{slope}(J)/\mathrm{slope}(J-1)(J*F\mathrm{SIZE}\le n\le(J+1)F\mathrm{SIZE}-1) \tag{10}$$

Also, similarly, the temporal variation, $\mathrm{dip}_d(J)$, of the above described dip, dip(J), expressed in the following Expression (11), may be set as the feature amount used to estimate the high frequency sub-band power of an attack segment.

[Expression 11]

$$\mathrm{dip}_d(J)=\mathrm{dip}(J)-\mathrm{dip}(J-1)(J*F\mathrm{SIZE}\le n\le(J+1)F\mathrm{SIZE}-1) \tag{11}$$

According to the method above, a feature amount having a strong correlation with the frequency extending band sub-band power is calculated, so by using these, estimation of the frequency extending band sub-band power with the high frequency sub-band power estimating circuit 15 can be performed with higher precision.

An example to calculate a feature amount having a strong correlation with the frequency extending band sub-band power is described above, but an example of estimating a high frequency sub-band power using the feature amount thus calculated will be described below.

[Details of Processing with High Frequency Sub-Band Power Estimating Circuit]

Now, an example of estimating the high frequency sub-band power, using the dip described with reference to FIG. 8 and the low frequency sub-band power as the feature amounts, will be described.

Figure 4:
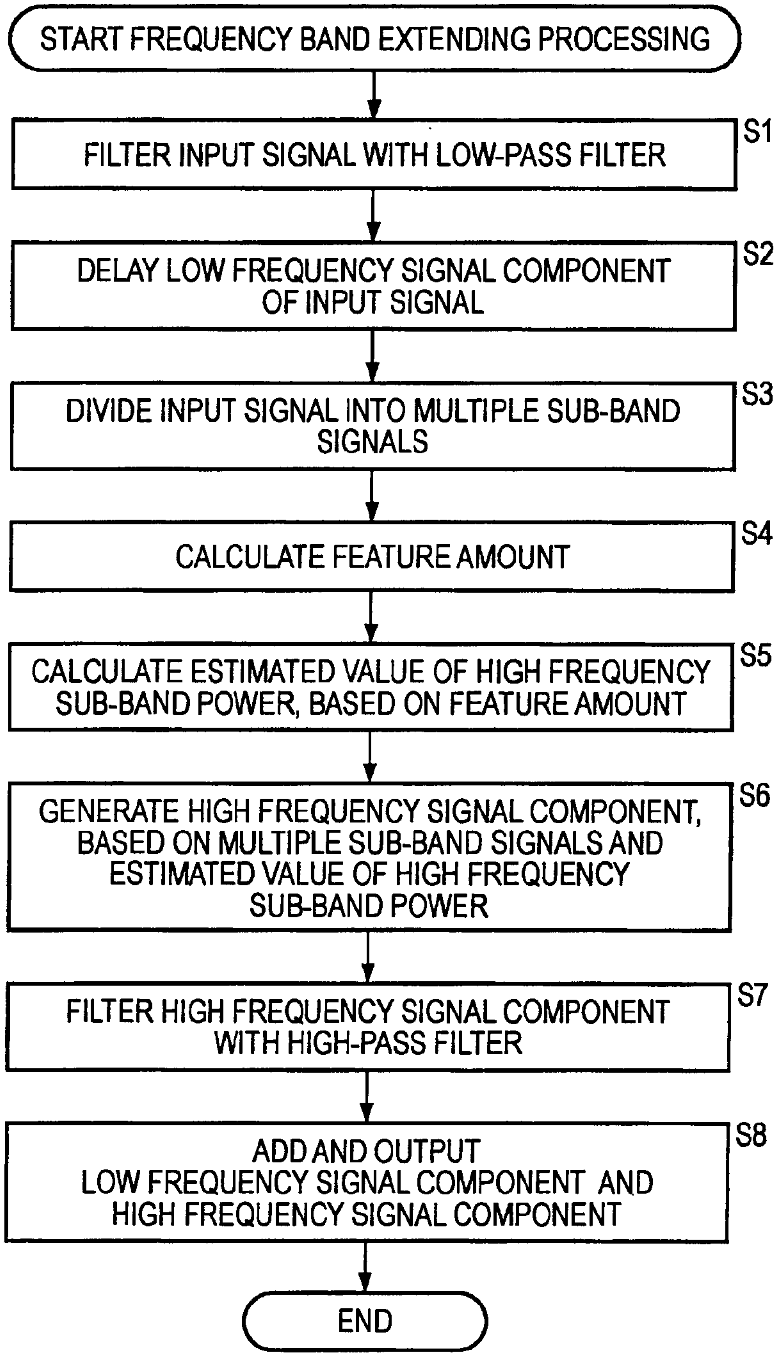
FIG. 4 is a flowchart describing an example of frequency band extending processing by the frequency band extending device in FIG. 3.

That is to say, in step S4 in the flowchart in FIG. 4, the feature amount calculating circuit 14 calculates a low frequency sub-band power and dip as feature amounts for each sub-band, from the four sub-band signals from the bandpass filter 13, and supplies these to the high frequency sub-band power estimating circuit 15.

In step S5, the high frequency sub-band power estimating circuit 15 calculates an estimating value of the high frequency sub-band power, based on the four low frequency sub-band powers from the feature amount calculating circuit 14 and the dip.

Now, with the sub-band power and dip, since the range (scale) of the values that can be taken differ, the high frequency sub-band power estimating circuit 15 performs transform of the dip values as shown below, for example.

The high frequency sub-band power estimating circuit 15 calculates the maximum frequency sub-band power of the four low frequency sub-band powers, and the dip values, for a large number of input signals beforehand, and finds average values and standard deviations for each. Now, the average value of the sub-band powers is represented by $power_{ave}$, the standard deviation of the sub-band powers as $power_{std}$, the average value of the dips as $dip_{ave}$, and the standard deviation of the dips as $dip_{std}$.

The high frequency sub-band power estimating circuit 15 transforms the dip value dip(J) as shown in Expression (12) below, using these values, and obtains a post-transform dip, $dip_s(J)$.

[Expression 12]

$$dip_s(J) = \frac{\text{dip}(J) - dip_{ave}}{dip_{std}} power_{std} + power_{ave} \quad (12)$$

By performing the transform shown in Expression (12), the high frequency sub-band power estimating circuit 15 can transform the dip value dip(J) into variables (dips) $dip_s(J)$ equivalent to the statistical average and dispersion of the low frequency sub-band powers, and can cause the range of values that can be taken of the dips to be approximately the same as the range of values that can be taken of the sub-band powers.

An estimated value $power_{est}$ (ib,J) of the sub-band power having an index of ib in the frequency extending band is expressed with Expression (13) below, for example, using a linear combination of the four low frequency sub-band powers, power(ib,J), from the feature amount calculating circuit 14 and the dips, $dip_s(J)$, shown in Expression (12).

[Expression 13]

$$power_{est}(ib, J) = \left( \sum_{kb=sb-3}^{sb} \{C_{ib}(kb)\text{power}(kb, J)\} \right) + D_{ib} dip_s(J) + E_{ib} (J * FSIZE \le n \le (J+1)FSIZE - 1, sb + 1 \le ib \le eb) \quad (13)$$

Now, in Expression (13), the coefficients $C_{ib}$(kb), $D_{ib}$, and $E_{ib}$ are coefficients having values that differ for each sub-band ib. The coefficients $C_{ib}$(kb), $D_{ib}$, and $E_{ib}$ are coefficients appropriately set so that favorable values can be obtained as to various input signals. Also, depending on the variation of the sub-band sb, the coefficients $C_{ib}$(kb), $D_{ib}$, and $E_{ib}$ can also be varied to be optimal values. Note that yielding the coefficients $C_{ib}$(kb), $D_{ib}$, and $E_{ib}$ will be described later.

In Expression (13), the high frequency sub-band power estimating value is calculated with a linear combination, but unrestricted to this, may be calculated using a linear combination of multiple feature amounts of several frames before and after the time frame J, or may be calculated using a non-linear function, for example.

According to the processing above, the dip value unique to the vocal segment is used as a feature amount in the estimation of the high frequency sub-band power, whereby the precision of high frequency sub-band power estimating of the vocal segment can be improved, as compared to the case wherein solely the low frequency sub-band power is the feature amount, and discomfort readily sensed by the human ear, which is generated by a high frequency power spectrum being estimated to be greater than the high frequency power spectrum of the original signal with the method wherein solely the low frequency sub-band power is the feature amount, is reduced, whereby music signals can be played with greater sound quality.

Now, regarding the dips (degree of recess in a vocal segment frequency feature) calculated as feature amounts with the above-described method, in the case that the number of sub-band divisions is 16, frequency resolution is low, so the degree of recess herein cannot be expressed solely with the low frequency sub-band power.

Now, by increasing the number of sub-band divisions (e.g. by 16 times, which is 256 divisions), increasing the number of band divisions with the bandpass filter 13 (e.g. by 16 times, which is 64), and increasing the number of low frequency sub-band powers (e.g. by 16 times, which is 64) calculated with the feature amount calculating circuit 14, frequency resolution can be improved, and the degree of recessing herein can be expressed solely with the low frequency sub-band power.

Thus, it can be thought that a high frequency sub-band power can be estimated with approximately the same precision as estimation of a high frequency sub-band power using the above-described dip as a feature amount, using solely the low frequency sub-band power.

However, by increasing the number of sub-band divisions, number of band divisions, and number of low frequency sub-band powers, the amount of calculations increase. If we consider that high frequency sub-band power can be estimated with similar precision for either method, the method that does not increase the number of sub-band divisions and that uses the dip as a feature amount to estimate the high frequency sub-band power is more efficient from the perspective of calculation amounts.

The description above has been given about a method to estimate a high frequency sub-band power using the dip and the low frequency sub-band power, but the feature amount used in the estimation of a high frequency sub-band power is not restricted to this combination, and one or multiple of the above-described feature amounts (low frequency sub-band power, dip, low frequency sub-band power temporal variation, slope, temporal variation of slope, and temporal variation of dip), may be used. Thus, precision of estimating the high frequency sub-band power can be further improved.

Also, as described above, in an input signal, by using parameters unique to a segment wherein estimation of the high frequency sub-band power is difficult as the feature amount used for estimation of the high frequency sub-band power, the estimation precision of the segment thereof can be improved. For example, low frequency sub-band power temporal variation, slope, temporal variation of slope, and temporal variation of dip, are parameters unique to the attack segment, and by using these parameters as feature amounts, the estimation precision of the high frequency sub-band power in the attack segment can be improved.

Note that in the case of performing estimation of the high frequency sub-band power using the feature amount other than the low frequency sub-band power and dip, i.e. using low frequency sub-band power temporal variation, slope, temporal variation of slope, and temporal variation of dip, the high frequency sub-band power can be estimated with the same method as described above.

Note that each of the calculating methods of the feature amounts shown here are not restricted to the methods described above, and that other methods may be used.

[Method of Finding Coefficients $C_{ib}$(Kb), $D_{ib}$, $E_{ib}$]

Next, a method to find the coefficients $C_{ib}$(kb), $D_{ib}$, and $E_{ib}$ in Expression (13) above will be described.

As a method to find the coefficients $C_{ib}$(kb), $D_{ib}$, and $E_{ib}$, a method is used whereby learning is performed beforehand with a teacher signal having a wide band (hereafter called wide band teacher signal), so that, in estimating the frequency extending band sub-band power, the coefficients $C_{ib}$(kb), $D_{ib}$, $E_{ib}$ can be favorable values as to various input signals, and can be determined based on the learning results thereof.

In the event of performing learning of the coefficients $C_{ib}$(kb), $D_{ib}$, and $E_{ib}$, a coefficient learning device which positions a bandpass filter having a passband width similar to the bandpass filters 13-1 through 13-4 described above with reference to FIG. 5, with a higher frequency than the extension starting band, is used. Upon a wide band teacher signal being input, the coefficient learning device performs learning.

[Functional Configuration Example of Coefficient Learning Device]

Figure 9:
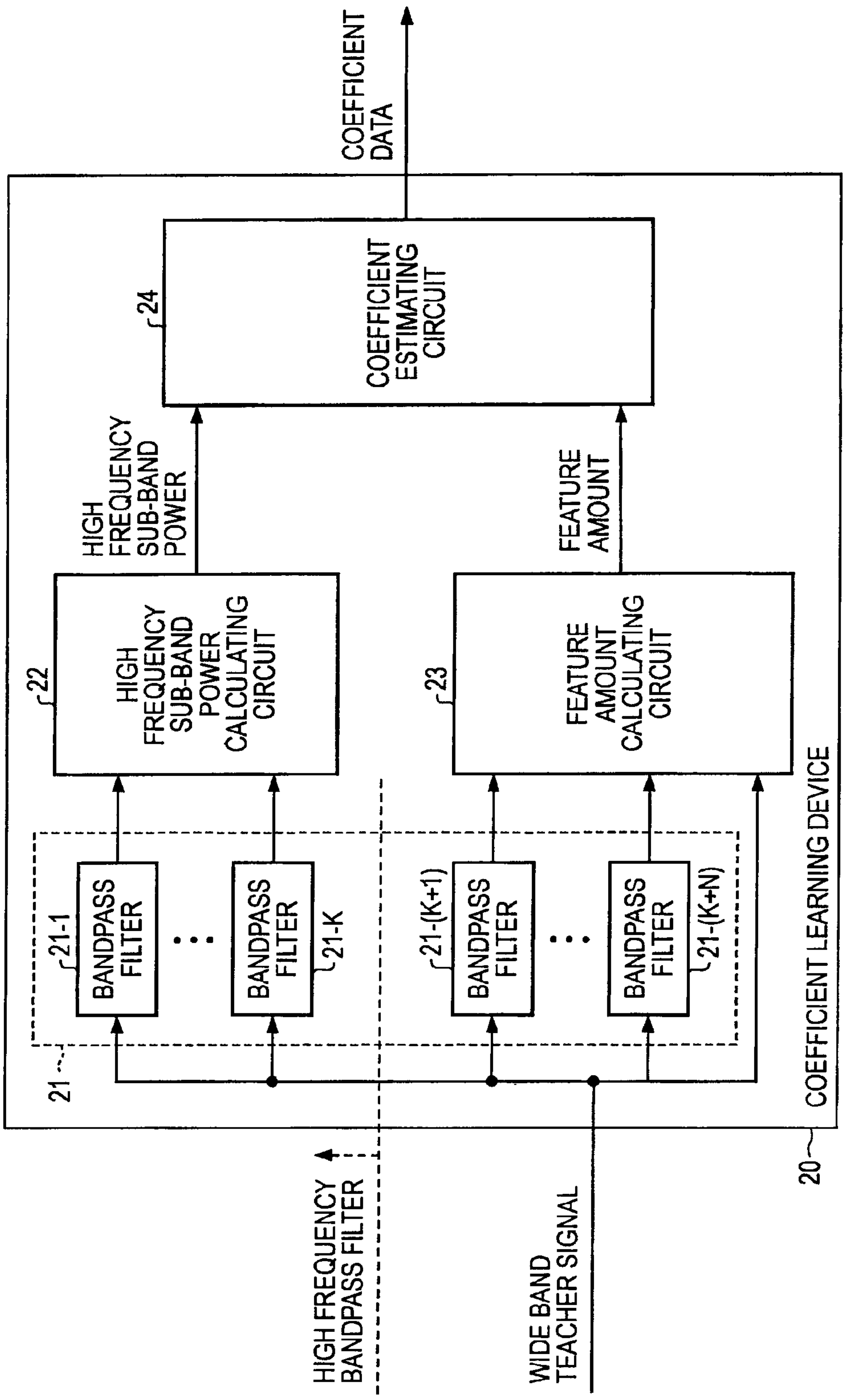
FIG. 9 is a block diagram illustrating a functional configuration example of a coefficient learning device to perform learning of coefficients used in a high frequency signal generating circuit of the frequency band extending device in FIG. 3.

FIG. 9 shows a functional configuration example of a coefficient learning device to perform learning of the coefficients $C_{ib}(kb)$, $D_{ib}$, and $E_{ib}$.

With regard to the signal components of a frequency lower than the extension starting band of the wide band teacher signal input to the coefficient learning device 20 in FIG. 9, it is favorable for a band-restricted input signal that is input into the frequency band extending device 10 in FIG. 3 to be a signal encoded with the same format as the encoding format performed in the event of encoding.

The coefficient learning device 20 is made up of a bandpass filter 21, high frequency sub-band power calculating circuit 22, feature amount calculating circuit 23, and coefficient estimating circuit 24.

The bandpass filter 21 is made up of bandpass filters 21-1 through 21-(K+N), each of which have different passbands. The bandpass filter 21-*i*(1K+N) allows a predetermined passband signal of the input signal to pass through, and supplies this as one of the multiple sub-band signals to the high frequency sub-band power calculating circuit 22 or feature amount calculating circuit 23. Note that the bandpass filters 21-1 through 21-K, of the bandpass filters 21-1 through 21-(K+N), allows signals of a frequency higher than the extension starting band to pass through.

The high frequency sub-band power calculating circuit 22 calculates the high frequency sub-band power for each sub-band for each certain time frame as to multiple high frequency sub-band signals from the bandpass filter 21, and supplies these to the coefficient estimating circuit 24.

The feature amount calculating circuit 23 calculates a feature amount that is the same as the feature amount calculated by the feature amount calculating circuit 14 of the frequency band extending device 10 in FIG. 3, for each time frame that is the same as the certain time frame calculated for the high frequency sub-band power by the high frequency sub-band power calculating circuit 22. That is to say, the feature amount calculating circuit 23 uses at least one of the multiple sub-band signals from the bandpass filter 21 and wide band teacher signal to calculate one or multiple feature amounts, and supplies this to the coefficient estimating circuit 24.

The coefficient estimating circuit 24 estimates a coefficient used with the high frequency sub-band power estimating circuit 15 of the frequency band extending device 10 in FIG. 3, based on the high frequency sub-band power from the high frequency sub-band power calculating circuit 22 and the feature amount from the feature amount calculating circuit 23 each certain time frame.

[Coefficient Learning Processing of Coefficient Learning Device]

Figure 10:
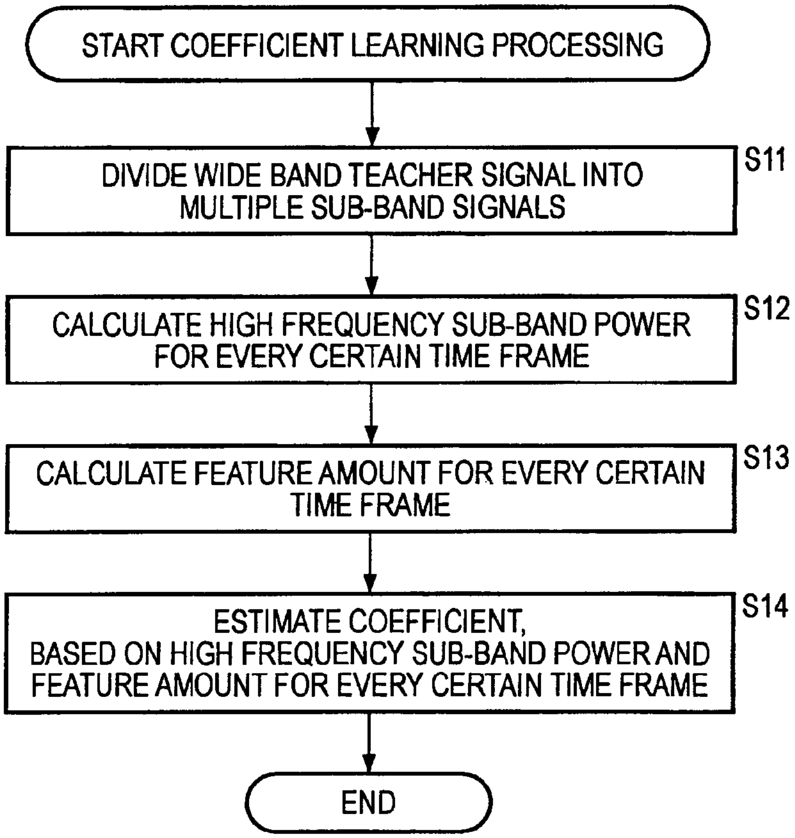
FIG. 10 is a flowchart describing an example of coefficient learning processing by the coefficient learning device in FIG. 9.

Next, the coefficient learning processing by the coefficient learning device in FIG. 9 will be described with reference to the flowchart in FIG. 10.

In step S11, the bandpass filter 21 divides the input signal (wide band teacher signal) into (K+N) number of sub-band signals. The bandpass filters 21-1 through 21-K supply the multiple sub-band signals having a frequency higher than the extension starting band to the high frequency sub-band power calculating circuit 22. Also, the bandpass filter 21-(K+1) through 21-(K+N) supply the multiple sub-band signals having a frequency lower than the extension starting band to the feature amount calculating circuit 23.

In step S12, the high frequency sub-band power calculating circuit 22 calculates the high frequency sub-band power, power(ib,J) for each sub-band, for each certain time frame, as to the multiple high frequency sub-band signals from the bandpass filter 21 (bandpass filters 21-1 through 21-K). The high frequency sub-band power, power(ib,J), is found with Expression (1) described above. The high frequency sub-band power calculating circuit 22 supplies the calculated high frequency sub-band power to the coefficient estimating circuit 24.

In step S13, the feature amount calculating circuit 23 calculates the feature amount for each time frame that is the same as the certain time frame calculated for the high frequency sub-band power by the high frequency sub-band power calculating circuit 22.

Note that in the feature amount calculating circuit 14 of the frequency band extending device 10 in FIG. 3, it is assumed that the four low frequency sub-band powers and the dip are calculated as the feature amounts, and similar to the feature amount calculating circuit 23 of the coefficient learning device 20, description is given below as calculating the four low frequency sub-band powers and the dip.

That is to say, the feature amount calculating circuit 23 uses four sub-band signals, each having the same band as the four sub-band signals input in the feature amount calculating circuit 14 of the frequency band extending device 10, from the bandpass filter 21 (bandpass filters 21-(K+1) through 21-(K+4), to calculate the four low frequency sub-band powers. Also, the feature amount calculating circuit 23 calculates a dip from the wide band teacher signal, and calculates the dip, dips(J) based on Expression (12) described above. The feature amount calculating circuit 23 supplies the calculated four low frequency sub-band power and dip, $dip_s(J)$, as feature amounts to the coefficient estimating circuit 24.

In step S14, the coefficient estimating circuit 24 performs estimation of the coefficients $C_{ib}(kb)$, $D_{ib}$, and $E_{ib}$, based on multiple combinations of the (eb-sb) number of high frequency sub-band powers supplied to the same time frame from the high frequency sub-band power calculating circuit 22 and feature amount calculating circuit 23 and of the feature amounts (four low frequency sub-band powers and dip $dip_s(J)$). For example, for one certain high frequency sub-band, the coefficient estimating circuit 24 sets five feature amounts (four low frequency sub-band powers and the dip $dip_s(J)$) as explanatory variables, and the high frequency sub-band power power(ib,J) as an explained variable, and performs regression analysis using a least square method, thereby determining the coefficients $C_{ib}(kb)$ $D_{ib}$, and $E_{ib}$ in Expression (13).

Note that, as it goes without saying, the estimation method of the coefficients $C_{ib}(kb)$, $D_{ib}$, and $E_{ib}$ is not restricted to the above-described method, and various types of general parameter identification methods may be used.

According to the processing described above, learning of coefficients used to estimate the high frequency sub-band power is performed using a wide band teacher signal beforehand, whereby favorable output results can be obtained as to various input signals input in the frequency band extending device 10, and therefore, music signals can be played with greater sound quality.

Note that the coefficients $A_{ib}(kb)$ and $B_{ib}$ in Expression (2) described above can also be obtained with the coefficient learning method described above.

A coefficient learning processing is described above, having the premise that in the high frequency sub-band power estimating circuit 15 of the frequency band extending device 10, each of the estimating values of the high frequency sub-band powers are calculated with a linear combination of the four low frequency sub-band powers and the dip. However, the high frequency sub-band power estimating method in the high frequency sub-band power estimating circuit 15 is not restricted to the example described above, and for example, the feature amount calculating circuit 14 may calculate one or multiple feature amounts other than the dip (low frequency sub-band power temporal variation, slope, slope temporal variation, and dip temporal variation) to calculate the high frequency sub-band power, or linear combinations of multiple feature amounts of the multiple frames before and after the time frame J may be used, or non-linear functions may be used. That is to say, in coefficient learning processing, the coefficient estimating circuit 24 should be able to calculate (learn) the coefficients, with similar conditions as the conditions for the feature amounts, time frames, and functions used in the event of calculating the high frequency sub-band power with the high frequency sub-band power estimating circuit 15 of the frequency band extending device 10.

<2. Second Embodiment>

With a second embodiment, encoding processing and decoding processing is performed with a high frequency feature encoding method, with an encoding device and decoding device.

[Functional Configuration Example of Encoding Device]

Figure 11:
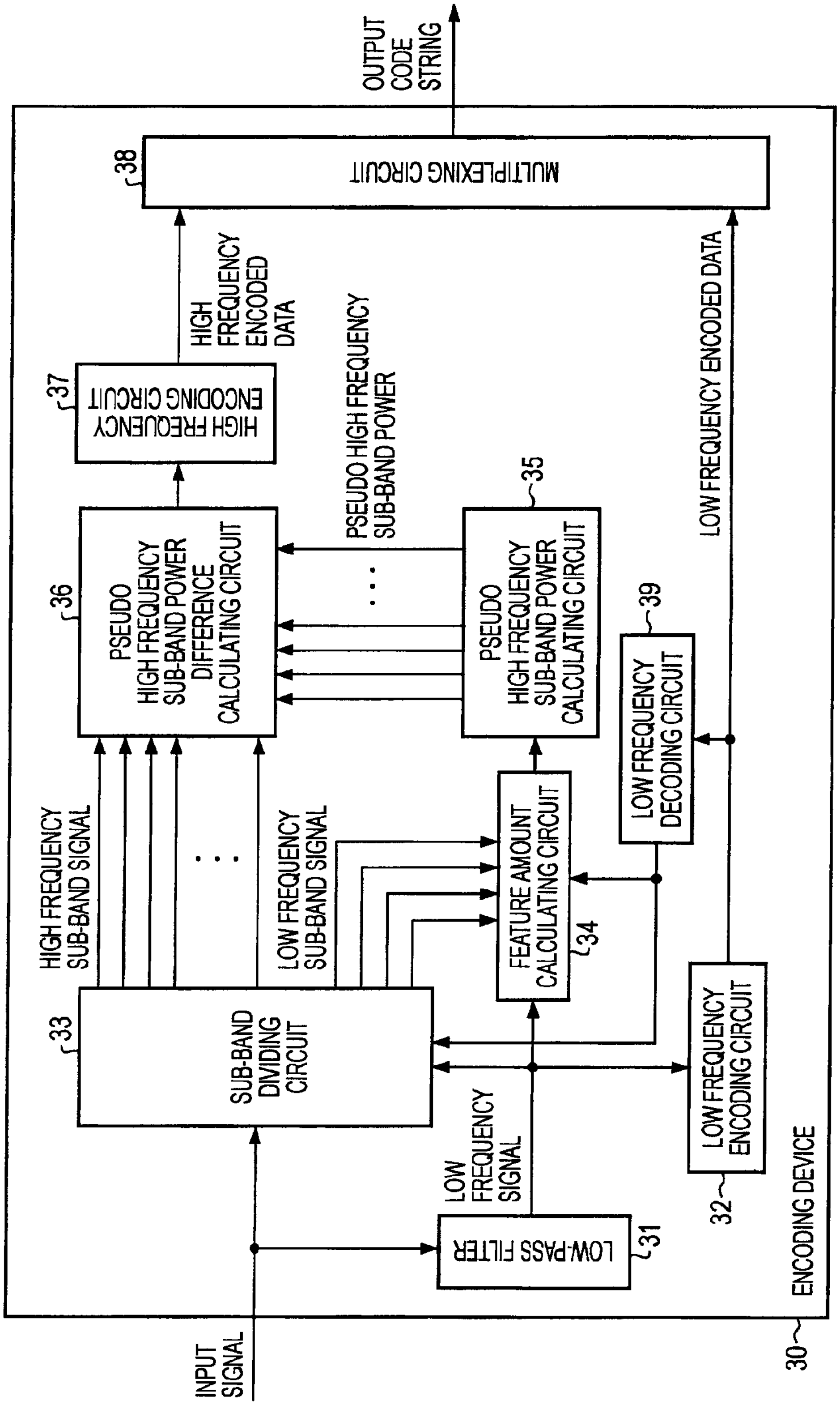
FIG. 11 is a block diagram illustrating a functional configuration example of an encoding device according to a second embodiment of the present invention.

FIG. 11 shows a functional configuration example of the encoding device to which the present invention is applied.

An encoding device 30 is made up of a low-pass filter 31, low frequency encoding circuit 32, sub-band dividing circuit 33, feature amount calculating circuit 34, pseudo high frequency sub-band power calculating circuit 35, pseudo high frequency sub-band power difference calculating circuit 36, high frequency encoding circuit 37, multiplexing circuit 38, and low frequency decoding circuit 39.

The low-pass filter 31 filters the input signal with a predetermined cutoff frequency, and supplies signals having a lower frequency than the cutoff frequency (hereafter called low frequency signals) to the low frequency encoding circuit 32, sub-band dividing circuit 33, and feature amount calculating circuit 34, as a post-filtering signal.

The low frequency encoding circuit 32 encodes the low frequency signal from the low-pass filter 31, and supplies the low frequency encoded data obtained as a result thereof to the multiplexing circuit 38 and low frequency decoding circuit 39.

The sub-band dividing circuit 33 divides the low frequency signal from the input signal and low-pass filter 31 into equal multiple sub-band signals having a predetermined bandwidth, and supply these to the feature amount calculating circuit 34 or pseudo high frequency sub-band power difference calculating circuit 36. More specifically, the sub-band dividing circuit 33 supplies the multiple sub-band signals obtained with low frequency signals as the input (hereafter called low frequency sub-band signals) to the feature amount calculating circuit 34. Also, the sub-band dividing circuit 33 supplies the sub-band signals having a frequency higher than the cutoff frequency set by the low-pass filter 31 (hereafter called high frequency sub-band signals), of the multiple sub-band signals obtained with the input signal as the input, to the pseudo high frequency sub-band power difference calculating circuit 36.

The feature amount calculating circuit 34 uses at least one of the multiple sub-band signals of the low frequency sub-band signals from the sub-band dividing circuit 33 or low frequency signals from the low-pass filter 31 to calculate one or multiple feature amounts, and supplies this to the pseudo high frequency sub-band power calculating circuit 35.

The pseudo high frequency sub-band power calculating circuit 35 generates a pseudo high frequency sub-band power, based on the one or multiple feature amounts from the feature amount calculating circuit 34, and supplies this to the pseudo high frequency sub-band power difference calculating circuit 36.

The pseudo high frequency sub-band power difference calculating circuit 36 calculates the later-described pseudo high frequency sub-band power difference, based on the high frequency sub-band signals from the sub-band dividing circuit 33 and the pseudo high frequency sub-band power from the pseudo high frequency sub-band power calculating circuit 35, and supplies this to the high frequency encoding circuit 37.

The high frequency encoding circuit 37 encodes the pseudo high frequency sub-band power difference from the pseudo high frequency sub-band power difference calculating circuit 36, and supplies the high frequency encoded data obtained as a result thereof to the multiplexing circuit 38.

The multiplexing circuit 38 multiplexes the low frequency encoded data from the low frequency encoding circuit 32 and the high frequency encoded data from the high frequency encoding circuit 37, and outputs this as an output code string.

The low frequency decoding circuit 39 decodes the low frequency encoded data from the low frequency encoding circuit 32 as appropriate, and supplies the decoded data obtained as a result thereof to the sub-band dividing circuit 33 and feature amount calculating circuit 34.

[Encoding Processing of Encoding Device]

Next, encoding processing with the encoding device 30 in FIG. 11 will be described with reference to the flowchart in FIG. 12.

In step S111, the low-pass filter 31 filters the input signal with a predetermined cutoff frequency, and supplies the low frequency signal serving as a post-filtering signal to the low frequency encoding circuit 32, sub-band dividing circuit 33, and feature amount calculating circuit 34.

In step S112, the low frequency encoding circuit 32 encodes the low frequency signal from the low-pass filter 31, and supplies the low frequency encoded data obtained as a result thereof to the multiplexing circuit 38.

Note that as for encoding of the low frequency signal in step S112, it is sufficient that an appropriate encoding format is selected according to the circuit scope to be found and encoding efficiency, and the present invention does not depend on this encoding format.

In step S113, the sub-band dividing circuit 33 equally divides the input signal and low frequency signal into multiple sub-band signals having a predetermined bandwidth. The sub-band dividing circuit 33 supplies the low frequency sub-band signals, obtained with the low frequency signal as input, to the feature amount calculating circuit 34. Also, of the multiple sub-band signals obtained with the input signal as input, the sub-band dividing circuit 33 supplies the high frequency sub-band signals having a band higher than a band-restricted frequency set by the low-pass filter 31 to the pseudo high frequency sub-band power difference calculating circuit 36.

In step S114, the feature amount calculating circuit 34 uses at least one of the multiple sub-band signals of the low frequency sub-band signals from the sub-band dividing circuit 33 or the low frequency signal from the low-pass filter 31 to calculate one or multiple feature amounts, and supplies this to the pseudo high frequency sub-band power calculating circuit 35. Note that the feature amount calculating circuit 34 in FIG. 11 has basically the same configuration and functionality as the feature amount calculating circuit 14 in FIG. 3, so the processing in step S114 is basically the same as the processing in step S4 of the flowchart in FIG. 4, so detailed description thereof will be omitted.

In step S115, the pseudo high frequency sub-band power calculating circuit 35 generates a pseudo high frequency sub-band power, based on one or multiple feature amounts from the feature amount calculating circuit 34, and supplies this to the pseudo high frequency sub-band power difference calculating circuit 36. Note that the pseudo high frequency sub-band power calculating circuit 35 in FIG. 11 has basically the same configuration and function of the high frequency sub-band power estimating circuit 15 in FIG. 3, and the processing in step S115 is basically the same as the processing in step S5 in the flowchart in FIG. 4, so detailed description will be omitted.

In step S116, the pseudo high frequency sub-band power difference calculating circuit 36 calculates the pseudo high frequency sub-band power difference, based on the high frequency sub-band signal from the sub-band dividing circuit 33 and the pseudo high frequency sub-band power from the pseudo high frequency sub-band power calculating circuit 35, and supplies this to the high frequency encoding circuit 37.

More specifically, the pseudo high frequency sub-band power difference calculating circuit 36 calculates the (high frequency) sub-band power, power(ib,J), in a certain time frame J, of the high frequency sub-band signal from the sub-band dividing circuit 33. Note that according to the present embodiment, all of the sub-bands of the low frequency sub-band signal and sub-bands of the high frequency sub-band signal are identified using the index ib. The calculating method of the sub-band power can be a method similar to the first embodiment, i.e. the method used for Expression (1) can be applied.

Next, the pseudo high frequency sub-band power difference calculating circuit 36 finds the difference (pseudo high frequency sub-band power difference) $power_{diff}(ib,J)$ between the high frequency sub-band power, power(ib,J), and the pseudo high frequency sub-band power, $power_{lh}(ib,J)$, from the pseudo high frequency sub-band power calculating circuit 35 in the time frame J. The pseudo high frequency sub-band power difference, $power_{diff}(ib,J)$, is found with Expression (14) below.

[Expression 14]

$$power_{diff}(ib,J)=power(ib,J)-power_{lh}(ib,J)$$
$$(J{*}FSIZE\leq n\leq(J+1)FSIZE-1,\ sb+1\leq ib\leq eb) \quad (14)$$

In Expression (14), index sb+1 represents a minimum frequency sub-band index in the high frequency sub-band signal. Also, index eb represents a maximum frequency sub-band index encoded in the high frequency sub-band signal.

Thus, the pseudo high frequency sub-band power difference calculated with the pseudo high frequency sub-band power difference calculating circuit 36 is supplied to the high frequency encoding circuit 37.

In step S117, the high frequency encoding circuit 37 encodes the pseudo high frequency sub-band power difference from the pseudo high frequency sub-band power difference calculating circuit 36, and supplies the high frequency encoded data obtained as a result thereof to the multiplexing circuit 38.

More specifically, the high frequency encoding circuit 37 determines to which cluster, of multiple clusters in a feature space of a preset pseudo high frequency sub-band power difference, should the vectorized pseudo high frequency sub-band power difference from the pseudo high frequency sub-band power difference calculating circuit 36 (hereafter called pseudo high frequency sub-band power difference vector) belong. Now, a pseudo high frequency sub-band power difference vector in a certain time frame J indicates an (eb-sb) dimension of vector which has values of pseudo high frequency sub-band power differences $power_{diff}(ib,J)$ for each index ib, as the elements for the vectors. Also, the feature space for the pseudo high frequency sub-band power difference similarly has an (eb-sb) dimension space.

In the feature space for the pseudo high frequency sub-band power difference, the high frequency encoding circuit 37 measures the distance between the various representative vectors of multiple preset clusters and the pseudo high frequency sub-band power difference vector, and find an index for the cluster with the shortest distance (hereafter called pseudo high frequency sub-band power difference ID), and supplies this to the multiplexing circuit 38 as high frequency encoded data.

In step S118, the multiplexing circuit 38 multiplexes the low frequency encoded data output from the low frequency encoding circuit 32 and the high frequency encoded data output from the high frequency encoding circuit 37, and outputs an output code string.

Now, regarding an encoding device for the high frequency feature encoding method, a technique is disclosed in Japanese Unexamined Patent Application Publication No. 2007-17908 in which a pseudo high frequency sub-band signal is generated from a low frequency sub-band signal, the pseudo high frequency sub-band signal and high frequency sub-band signal power are compared for each sub-band, power gain for each sub-band is calculated to match the pseudo high frequency sub-band signal power and the high frequency sub-band signal power, and this is included in a code string as high frequency feature information.

On the other hand, according to processing described above, in the event of decoding, only the pseudo high frequency sub-band power difference ID has to be included in the output code string as information for estimating the high frequency sub-band power. That is to say, in the case that the number of preset clusters is 64 for example, as information for decoding the high frequency signal with a decoding device, only 6-bit information has to be added to a code string for one time frame, and compared to the method disclosed in Japanese Unexamined Patent Application Publication No. 2007-17908, information amount to be included in the code string can be reduced, encoding efficiency can be improved, and therefore, music signals can be played with greater sound quality.

Also, with the above-described processing, if there is leeway in the calculating amount, the low-frequency decoding circuit 39 may input the low frequency signal obtained by decoding the low frequency encoded data from the low frequency encoding circuit 32 into the sub-band dividing circuit 33 and the feature amount calculating circuit 34. For the decoding processing by the decoding device, the feature amount is calculated from the low frequency signals obtained by having decoded the low frequency encoded data, and high frequency sub-band power is estimated based on the feature amount thereof. Therefore, with the encoding processing also, including the pseudo high frequency sub-band power difference ID that is calculated based on the feature amount calculated from the decoded low frequency signal in the code string enables estimation of high frequency sub-band power with higher precision in the decoding processing with the decoding device. Accordingly, music signals can be played with greater sound quality.

[Functional Configuration Example of Decoding Device]

Next, a functional configuration example of the decoding device corresponding to the encoding device 30 in FIG. 11 will be described with reference to FIG. 13.

The decoding device 40 is made up of a demultiplexing circuit 41, low frequency decoding circuit 42, sub-band dividing circuit 43, feature amount calculating circuit 44, high band decoding circuit 45, decoded high frequency sub-band power calculating circuit 46, decoded high frequency signal generating circuit 47, and synthesizing circuit 48.

The demultiplexing circuit 41 demultiplexes the input code string into high frequency encoded data and low frequency encoded data, and supplies the low frequency encoded data to the low frequency decoding circuit 42 and supplies the high frequency encoded data to the high frequency decoding circuit 45.

The low frequency decoding circuit 42 performs decoding of the low frequency encoded data from the demultiplexing circuit 41. The low frequency decoding circuit 42 supplies the low frequency signals obtained as a result of the decoding (hereafter called decoded low frequency signals) to the sub-band dividing circuit 43, feature amount calculating circuit 44, and synthesizing circuit 48.

The sub-band dividing circuit 43 equally divides the decoded low frequency signal from the low frequency decoding circuit 42 into multiple sub-band signals having a predetermined bandwidth, and supplies the obtained sub-band signals (decoded low frequency sub-band signal) to the feature amount calculating circuit 44 and decoded high frequency signal generating circuit 47.

The feature amount calculating circuit 44 uses at least one of multiple sub-band signals of the decoded low frequency sub-band signals from the sub-band dividing circuit 43 and the decoded low frequency signal from the low frequency decoding circuit 42 to calculate one or multiple feature amounts, and supplies this to the decoded high frequency sub-band power calculating circuit 46.

The high frequency decoding circuit 45 performs decoding of the high frequency encoded data from the demultiplexing circuit 41, and uses the pseudo high frequency sub-band power difference ID obtained as a result thereof to supply the coefficient (hereafter called decoded high frequency sub-band power estimating coefficient) for estimating the high frequency sub-band power prepared beforehand for each ID (index) to the decoded high frequency sub-band power calculating circuit 46.

The decoded high frequency sub-band power calculating circuit 46 calculates the decoded high frequency sub-band power, based on one or multiple feature amounts from the feature amount calculating circuit 44 and the decoded high frequency sub-band power estimating coefficient from the high frequency decoding circuit 45, and supplies this to the decoded high frequency signal generating circuit 47.

The decoded high frequency signal generating circuit 47 generates a decoded high frequency signal based on the decoded low frequency sub-band signal from the sub-band dividing circuit 43 and the decoded high frequency sub-band power from the decoded high frequency sub-band power calculating circuit 46, and supplies this to the synthesizing circuit 48.

The synthesizing circuit 48 synthesizes the decoded low frequency signal from the low frequency decoding circuit 42 and the decoded high frequency signal from the decoded high frequency signal generating circuit 47, and outputs as an output signal.

[Decoding Processing of Decoding Device]

Next, decoding processing with the decoding device in FIG. 13 will be described with reference to the flowchart in FIG. 14.

In step S131, the demultiplexing circuit 41 demultiplexes the input code string into high frequency encoded data and low frequency encoded data, supplies the low frequency encoded data to the low frequency decoding circuit 42, and supplies the high frequency encoded data to the high frequency decoding circuit 45.

In step S132, the low frequency decoding circuit 42 performs decoding of low frequency encoded data from the demultiplexing circuit 41, and supplies the decoded low frequency signal obtained as a result there to a sub-band dividing circuit 43, feature amount calculating circuit 44, and synthesizing circuit 48.

In step S133, the sub-band dividing circuit 43 divides the decoded low frequency signal from the low frequency decoding circuit 42 equally into multiple sub-band signals having predetermined bandwidths, and supplies the obtained decoded low frequency sub-band signal to the feature amount calculating circuit 44 and decoded high frequency signal generating circuit 47.

In step S134, the feature amount calculating circuit 44 calculates one or multiple feature amounts from at least one of the multiple sub-band signals of the decoded low frequency sub-band signals from the sub-band dividing circuit 43 and the decoded low frequency signals from the low frequency decoding circuit 42, and supplies this to the decoded high frequency sub-band power calculating circuit 46. Note that the feature amount calculating circuit 44 in FIG. 13 has basically the same configuration and functionality as the feature amount calculating circuit 14 in FIG. 3, and the processing in step S134 is basically the same as the processing in step S4 in the flowchart in FIG. 4, so detailed description thereof will be omitted.

In step S135, the high frequency decoding circuit 45 performs decoding of the high frequency encoded data from the demultiplexing circuit 41, and using the pseudo high frequency sub-band power difference ID obtained as a result thereof, supplies the decoded high frequency sub-band power estimating coefficients that are prepared for each ID (index) beforehand to the decoded high frequency sub-band power calculating circuit 46.

In step S136, the decoded high frequency sub-band power calculating circuit 46 calculates the decoded high frequency sub-band power, based on the one or multiple feature amounts from the feature amount calculating circuit 44 and decoded high frequency sub-band power estimating coefficient from the high frequency decoding circuit 45. Note that the decoded high frequency sub-band power calculating circuit 46 in FIG. 13 has basically the same configuration and functionality as the high frequency sub-band power estimating circuit 15 in FIG. 3, and the processing in step S136 is basically the same as the processing in step S5 in the flowchart in FIG. 4, so detailed description thereof will be omitted.

In step S137, the decoded high frequency signal generating circuit 47 outputs a decoded high frequency signal, based on the decoded low frequency sub-band signal from the sub-band dividing circuit 43 and the decoded high frequency sub-band power from the decoded high frequency sub-band power calculating circuit 46. Note that the decoded high frequency signal generating circuit 47 in FIG. 13 has basically the same configuration and functionality as the high frequency signal generating circuit 16 in FIG. 3, and the processing in step S137 is basically the same as the processing in step S6 of the flowchart in FIG. 4, so detailed descriptions thereof will be omitted.

In step S138, the synthesizing circuit 48 synthesizes the decoded low frequency signal from the low frequency decoding circuit 42 and the decoded high frequency signal from the decoded high frequency signal generating circuit 47, and outputs this as an output signal.

According to the processing described above, by using a high frequency sub-band power estimating coefficient in the event of decoding that corresponds to the features of the difference between the pseudo high frequency sub-band power calculated beforehand in the event of encoding and the actual high frequency sub-band power, precision of estimating the high frequency sub-band power in the event of decoding can be improved, and consequently, music signals can be played with greater sound quality.

Also, according to the processing described above, the only information for generating the high frequency signals included in a code string is the pseudo high frequency sub-band power difference ID, which is not much, so decoding processing can be performed efficiently.

Figure 13:
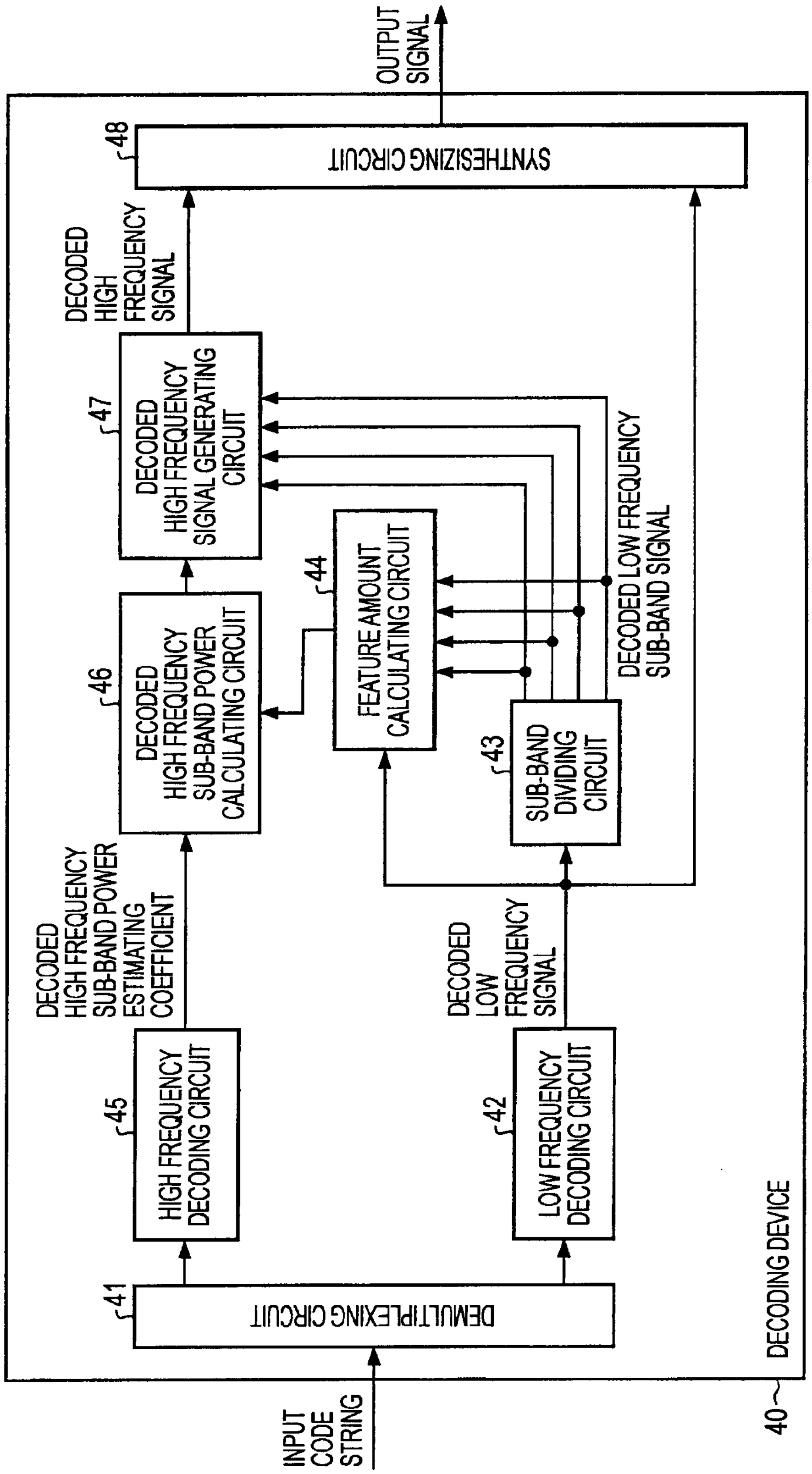
FIG. 13 is a block diagram illustrating a functional configuration example of the decoding device according to the second embodiment of the present invention.
Figure 14:
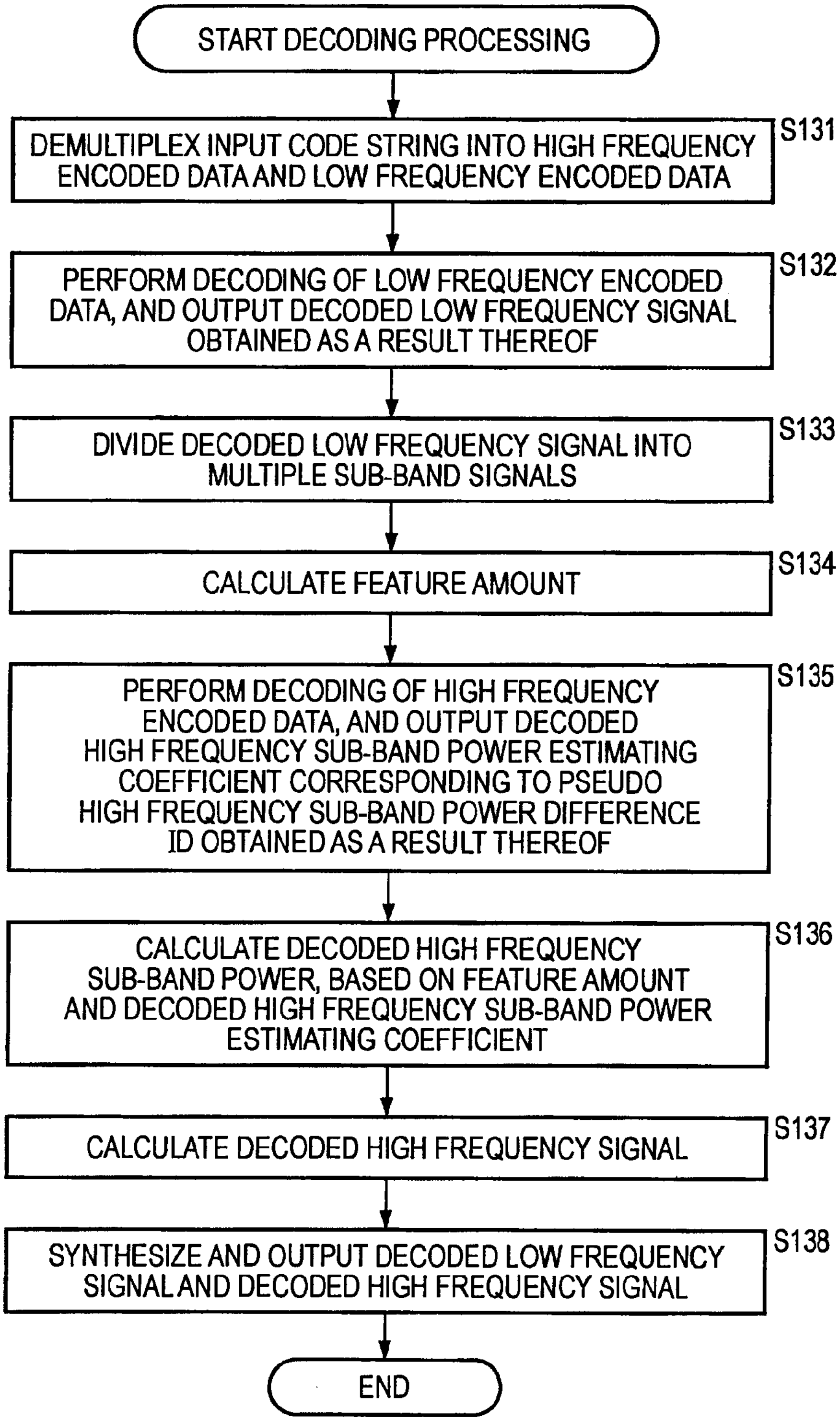
FIG. 14 is a flowchart describing an example of decoding processing by the decoding device in FIG. 13.

The above description has been made regarding encoding processing and decoding processing to which the present invention is applied, but representative vectors for each of the multiple clusters in a feature space of the pseudo high frequency sub-band power difference that is preset with the high frequency encoding circuit 37 of the encoding device 30 in FIG. 11, and a calculating method of the decoded high frequency sub-band power estimating coefficient output by the high frequency decoding circuit 45 of the decoding device 40 in FIG. 13 will be described below.

[Representative Vector of Multiple Clusters in Feature Space of Pseudo High Frequency Sub-Band Power Difference, and Calculating Method of Decoded High Frequency Sub-Band Power Estimating Coefficient Corresponding to Each Cluster]

As a method to find representative vectors of multiple clusters and the decoded high frequency sub-band power estimating coefficients of each cluster, coefficients that can precisely estimate the high frequency sub-band power in the event of decoding, according to the pseudo high frequency sub-band power difference vector calculated in the event of encoding, need to be prepared. Therefore, a technique is applied wherein learning is performed beforehand with a wide band teacher signal, and these are determined based on the learning results thereof.

[Functional Configuration Example of Coefficient Learning Device]

Figure 15:
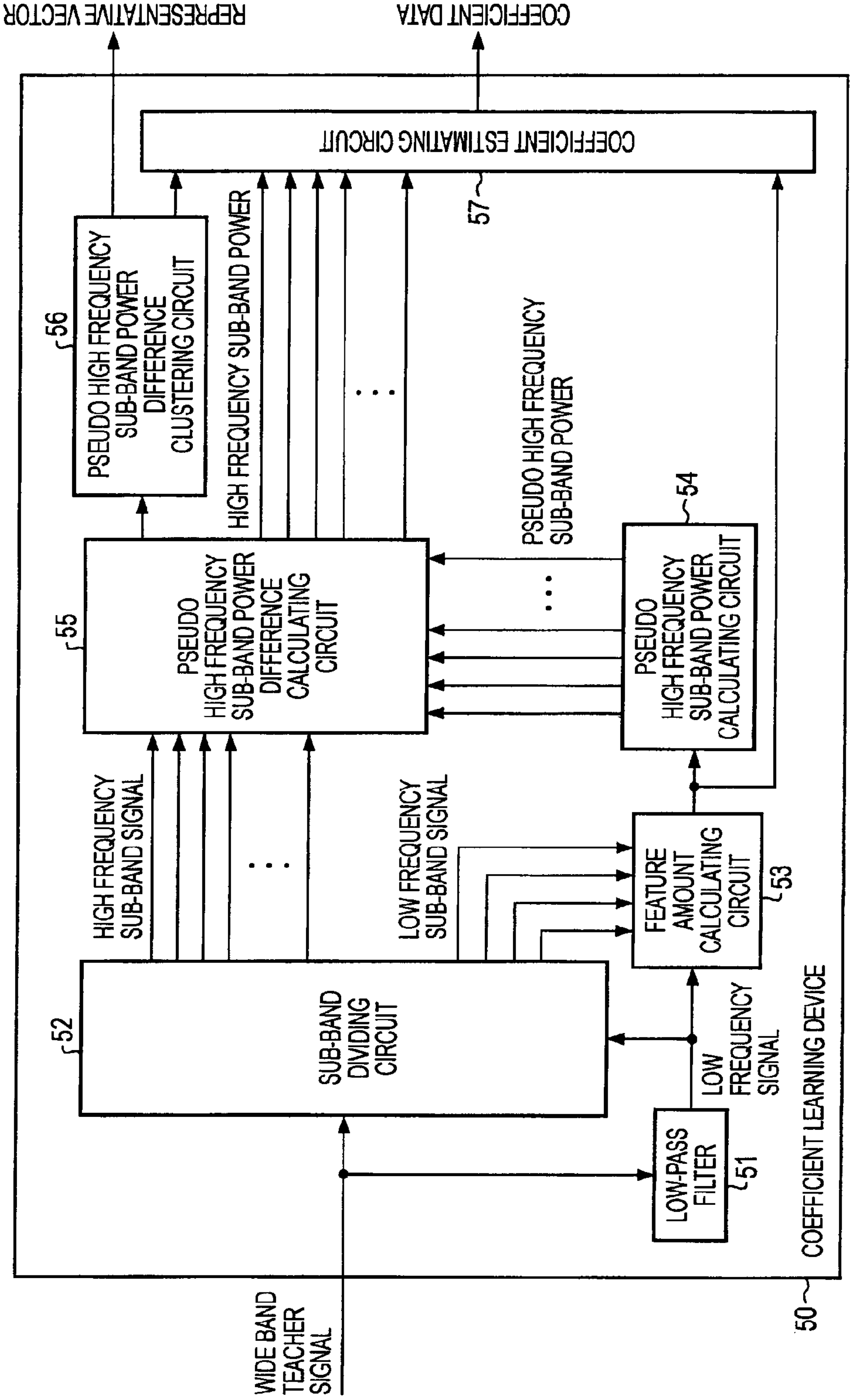
FIG. 15 is a block diagram illustrating a functional configuration example of a coefficient learning device to perform learning of representative vectors used in the high frequency encoding circuit of the encoding device in FIG. 11 and of decoded high frequency sub-band power estimating coefficients used in the high frequency decoding circuit of the decoding device in FIG. 13.

FIG. 15 shows a functional configuration example of a coefficient learning device that performs learning of the representative vectors of multiple clusters and the decoded high frequency sub-band power estimating coefficients for each cluster.

The signal components below a cutoff frequency set by the low-pass filter 31 of the encoding device 30, of the wide band teacher signal input in the coefficient learning device 50 in FIG. 15 is favorable when the input signal to the encoding device 30 passes through the low-pass filter 31 and is encoded by the low frequency encoding circuit 32, and further is a decoded low frequency signal decoded by the low frequency decoding circuit 42 of the decoding device 40.

The coefficient learning device 50 is made up of a low-pass filter 51, sub-band dividing circuit 52, feature amount calculating circuit 53, pseudo high frequency sub-band power calculating circuit 54, pseudo high frequency sub-band power difference calculating circuit 55, pseudo high frequency sub-band power difference clustering circuit 56, and coefficient estimating circuit 57.

Note that each of the low-pass filter 51, sub-band dividing circuit 52, feature amount calculating circuit 53, and pseudo high frequency sub-band power calculating circuit 54 of the coefficient learning device 50 in FIG. 15 have basically the same configuration and functionality as the respective low-pass filter 31, sub-band dividing circuit 33, feature amount calculating circuit 34, and pseudo high frequency sub-band power calculating circuit 35 in the encoding device 30 in FIG. 11, so description thereof will be omitted as appropriate.

That is to say, the pseudo high frequency sub-band power difference calculating circuit 55 has similar configuration and functionality as the pseudo high frequency sub-band power difference calculating circuit 36 in FIG. 11, but the calculated pseudo high frequency sub-band power difference is supplied to the pseudo high frequency sub-band power difference clustering circuit 56, and the high frequency sub-band power calculated in the event of calculating the pseudo high frequency sub-band power difference is supplied to the coefficient estimating circuit 57.

The pseudo high frequency sub-band power difference clustering circuit 56 clusters the pseudo high frequency sub-band power difference vectors obtained from the pseudo high frequency sub-band power difference from the pseudo high frequency sub-band power difference computing circuit 55, and calculates representative vectors for each cluster.

The coefficient estimating circuit 57 calculates high frequency sub-band power estimating coefficients for each cluster that has been clustered with the pseudo high frequency sub-band power difference clustering circuit 56, based on the high frequency sub-band power from the pseudo high frequency sub-band power difference circuit 55, and the one or multiple feature amounts from the feature amount calculating circuit 53.

[Coefficient Learning Processing of Coefficient Learning Device]

Next, coefficient learning processing with the coefficient learning device 50 in FIG. 15 will be described with reference to the flowchart in FIG. 16.

Figure 12:
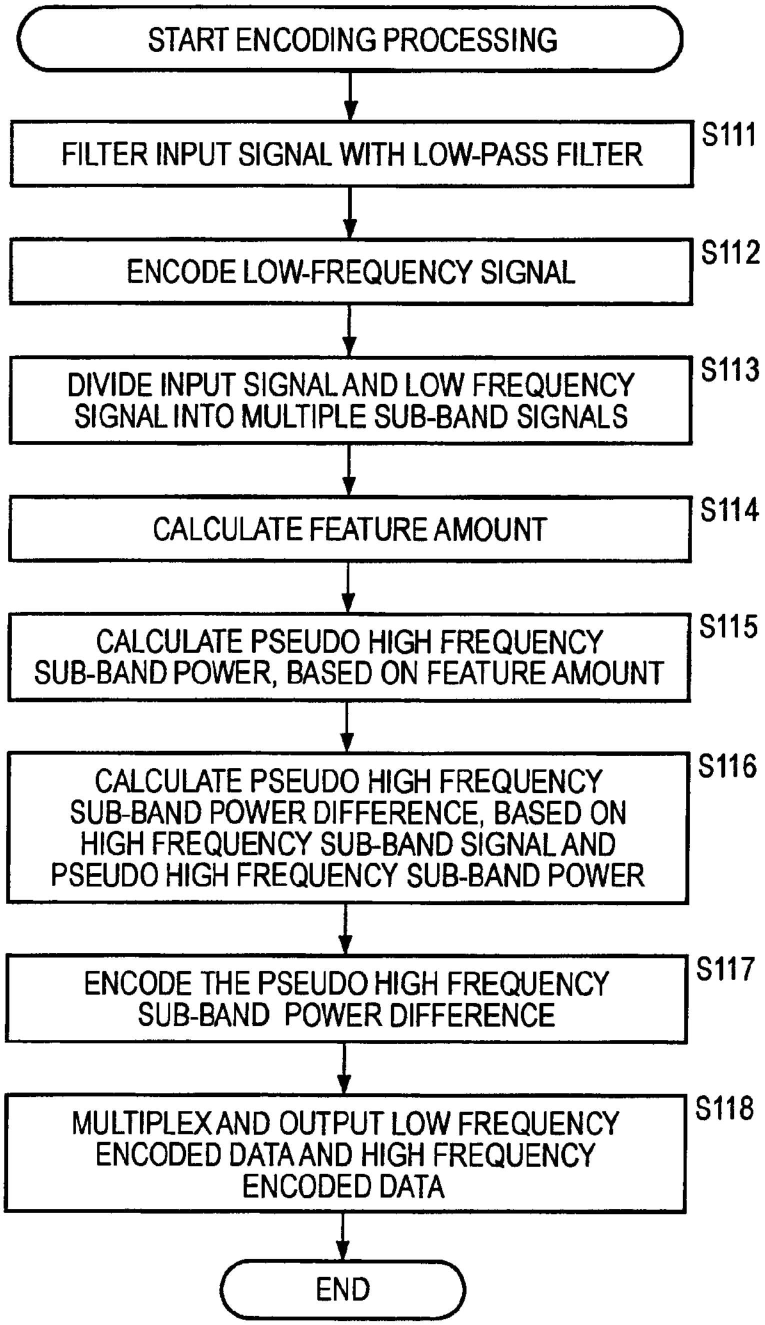
FIG. 12 is a flowchart describing an example of encoding processing by the encoding device in FIG. 11.
Figure 16:
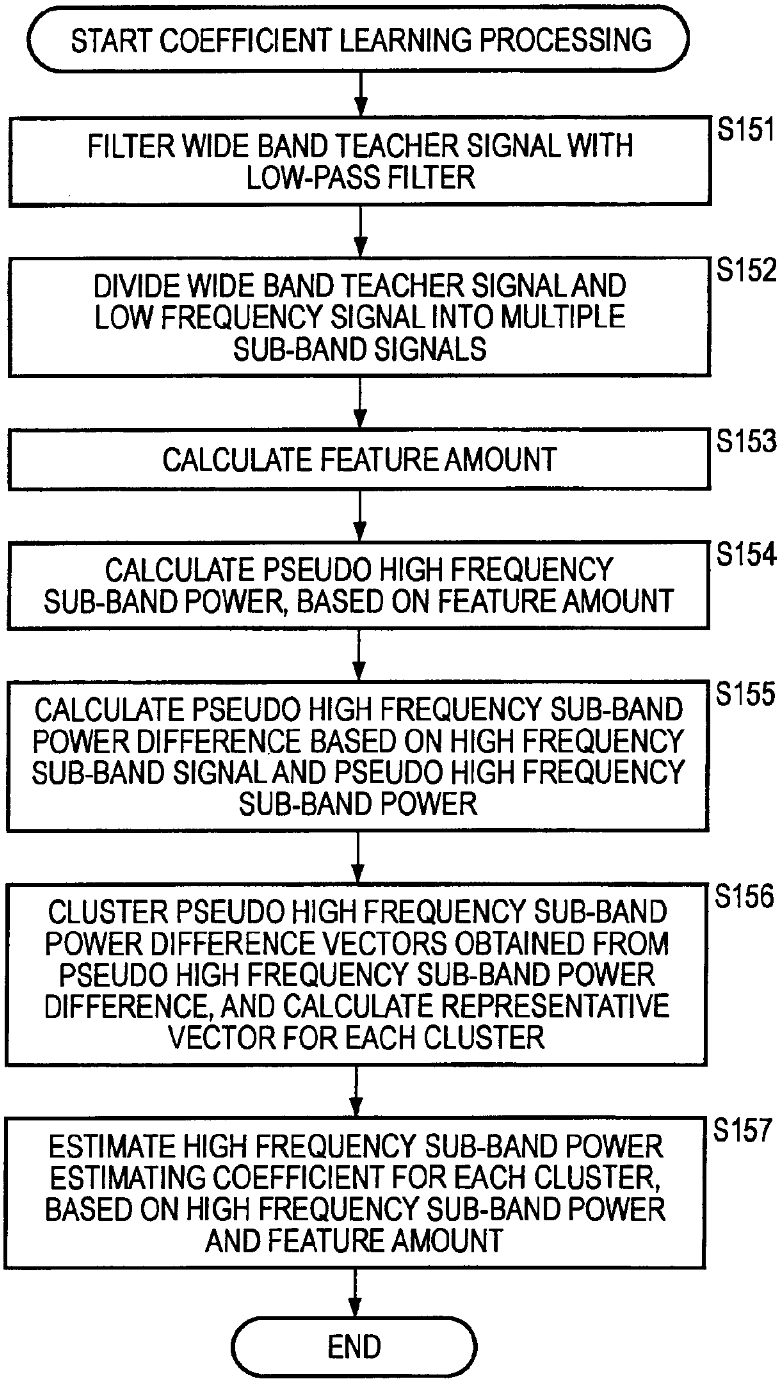
FIG. 16 is a flowchart describing an example of coefficient learning processing by the coefficient learning device in FIG. 15.

Note that the processing in steps S151 through S155 in the flowchart in FIG. 16 is similar to the processing in steps S111 and S113 through S116 in the flowchart in FIG. 12, other than the signal being input in the coefficient learning device 50 being a wide band teacher signal, so description thereof will be omitted.

That is to say, in step S156, the pseudo high frequency sub-band power difference clustering circuit 56 clusters multiple (a large amount of time frames) pseudo high frequency sub-band power difference vectors obtained from the pseudo high frequency sub-band power difference from the pseudo high frequency sub-band power difference calculating circuit 55 into 64 clusters, for example, and calculates representative vectors for each cluster. An example of a clustering method may be to use clustering by k-means, for example. The pseudo high frequency sub-band power difference clustering circuit 56 sets a center-of-gravity vector for each cluster, which is obtained as a result of performing clustering by k-means, as the representative vector for each cluster. Note that the method of clustering and number of clusters is not restricted to the descriptions above, and that other methods may be used.

Also, the pseudo high frequency sub-band power difference clustering circuit 56 uses a pseudo high frequency sub-band power difference vector obtained from the pseudo high frequency sub-band power difference from the pseudo high frequency sub-band power difference calculating circuit 55 in a time frame J to measure the distance from the 64 representative vectors, and determines an index CID(J) for the cluster to which the representative vector having the shortest distance belongs. Note that the index CID(J) takes integer values from 1 to the number of clusters (64 in this example). The pseudo high frequency sub-band power difference clustering circuit 56 thus outputs the representative vector, and supplies the index CID(J) to the coefficient estimating circuit 57.

In step S157, the coefficient estimating circuit 57 performs calculating of a decoded high frequency sub-band power estimating coefficient for each cluster, for each group having the same index CID(J) (belonging to the same cluster), of multiple combinations of the feature amount and (eb-sb) number of high frequency sub-band power supplied to the same time frame from the pseudo high frequency sub-band power difference calculating circuit 55 and feature amount calculating circuit 53. Note that the method for calculating coefficients with the coefficient estimating circuit 57 is similar to the method of the coefficient estimating circuit 24 of the coefficient learning device 20 in FIG. 9, but it goes without saying that another method may be used.

According to the processing described above, learning is performed for the representative vectors for each of multiple clusters in the feature space of the pseudo high frequency sub-band power difference preset in the high frequency encoding circuit 37 of the encoding device 30 in FIG. 11, and for the decoded high frequency sub-band power estimating coefficient output by the high frequency decoding circuit 45 of the decoding device 40 in FIG. 13 using a wide band teacher signal beforehand, whereby favorable output results as to various input signals that are input in the encoding device 30 and various input code strings input in the decoding device 40 can be obtained, and therefore, music signals can be played with greater sound quality.

Further, the coefficient data for calculating high frequency sub-band power in the pseudo high frequency sub-band power calculating circuit 35 of the encoding device 30 and the decoded high frequency sub-band power calculating circuit 46 of the decoding device 40 can be handled as follows with regard to signal encoding and decoding. That is to say, by using coefficient data that differs by the type of input signal, the coefficient thereof can be recorded at the beginning of the code string.

For example, by modifying the coefficient data according to signals for a speech or jazz and so forth, encoding efficiency can be improved.

Figure 17:
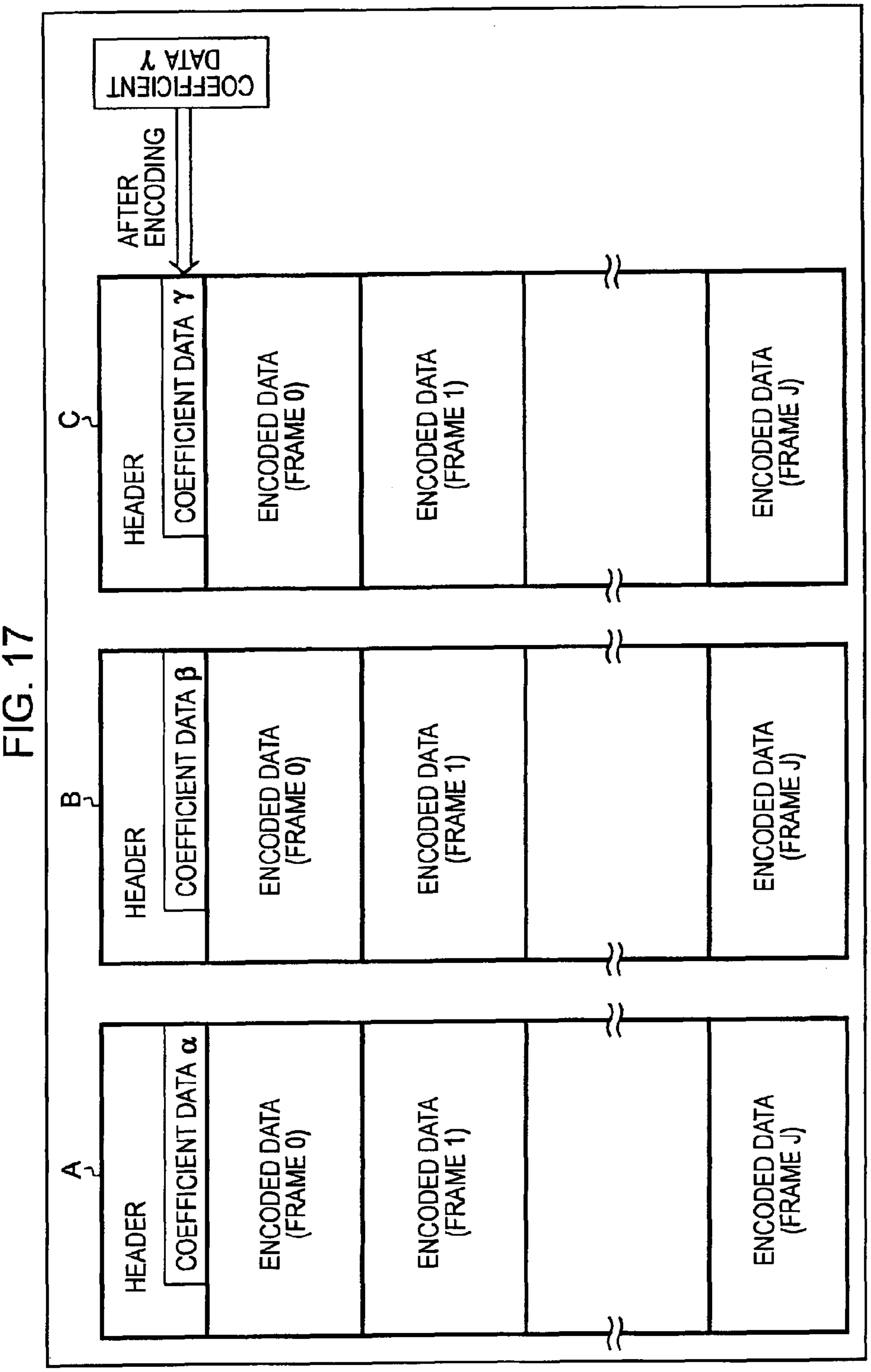
FIG. 17 is a diagram illustrating an example of a code string output by the encoding device in FIG. 11.

FIG. 17 shows a code string obtained in this way.

The code string A in FIG. 17 is that of an encoded speech, and coefficient data α, optimal for a speech, is recorded in the header.

Conversely, the code string B in FIG. 17 is that of encoded jazz, and coefficient data β, optimal for jazz, is recorded in the header.

Such multiple types of coefficient data may be prepared by learning with similar types of music signals beforehand, and coefficient data may be selected by the encoding device 30 with the genre information such as that recorded in the header of the input signal. Alternatively, the genre may be determined by performing waveform analysis of the signal, and thus select the coefficient data. That is to say, such genre analysis method for signals is not restricted in particular.

Also, if calculation time permits, the learning device described above may be built into the encoding device 30, processing performed using the coefficients of a dedicated signal thereof, and as shown in the code string C in FIG. 17, finally, the coefficient thereof may be recorded in the header.

Advantages of using this method will be described below.

There are many locations in one input signal wherein the forms of high frequency sub-band powers are similar. Using this feature which many input signals have, learning the coefficient for estimating the high frequency sub-band power, individually for each input signal, enables redundancy caused by the existence of similar locations of high frequency sub-band power to be reduced, and enables encoding efficiency to be increased. Also, high frequency sub-band power estimating can be performed with higher precision than can learning coefficients for estimating high frequency sub-band power statistically with multiple signals.

Also, as shown above, an arrangement may be made wherein coefficient data learned from the input signal in the event of encoding is inserted once into several frames.

<3. Third Embodiment>

[Functional Configuration Example of Encoding Device]

Note that according to the above description, the pseudo high frequency sub-band power difference ID is output as high frequency encoded data, from the encoding device 30 to the decoding device 40, but the coefficient index for obtaining the decoded high frequency sub-band power estimating coefficient may be set as the high frequency encoded data.

Figure 18:
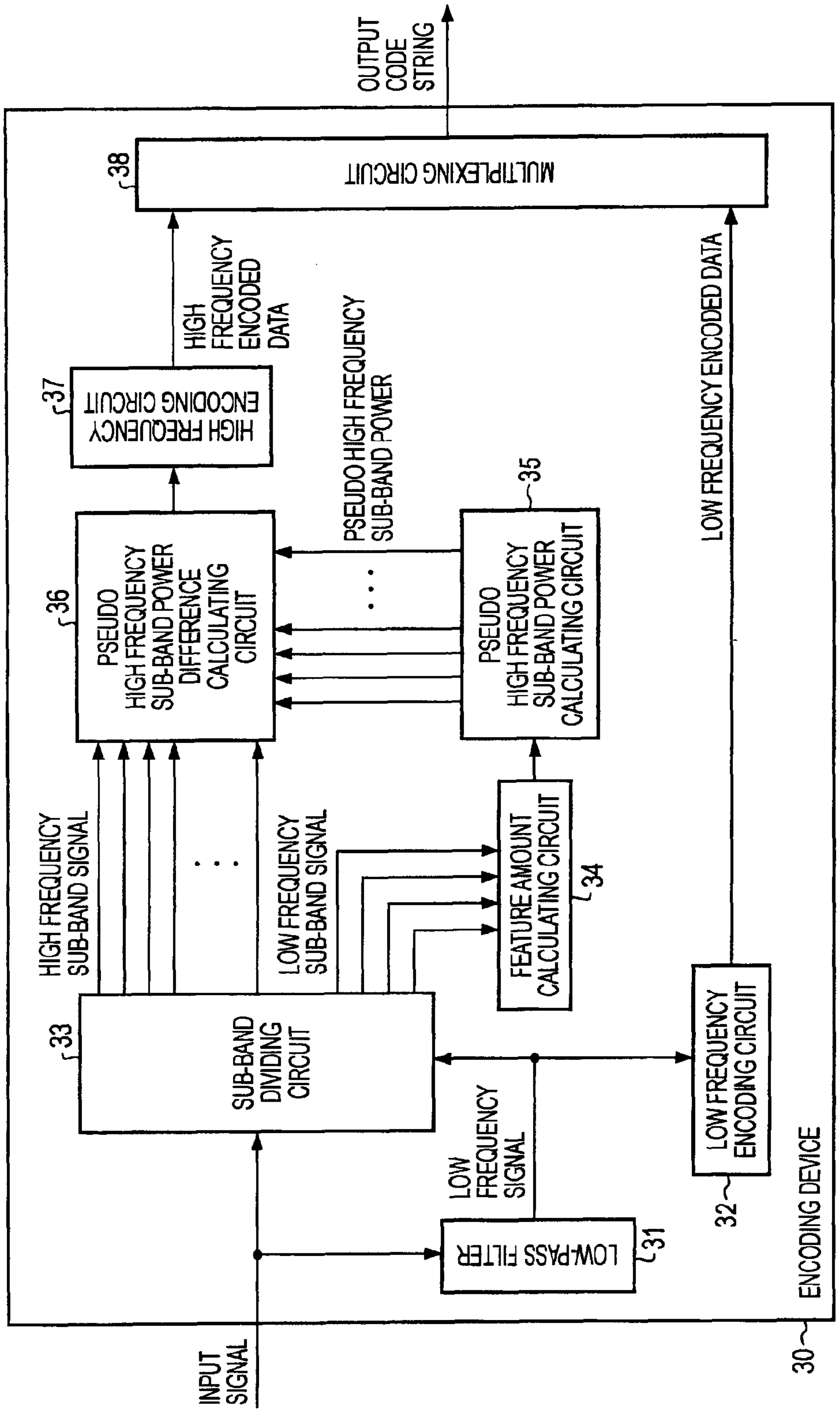
FIG. 18 is a block diagram illustrating a functional configuration example of an encoding device.

In such a case, the encoding device 30 is configured as shown in FIG. 18, for example. Note that in FIG. 18, the portions corresponding to the case in FIG. 11 has the same reference numerals appended thereto, and description thereof will be omitted as appropriate.

The encoding device 30 in FIG. 18 differs from the encoding device 30 in FIG. 11 in that the low frequency decoding circuit 39 is not provided, and in other points is the same.

With the encoding device 30 in FIG. 18, the feature amount calculating circuit 34 uses the low-frequency sub-band signal supplied from the sub-band dividing circuit 33 to calculate the low frequency sub-band power as feature amount, and supplies this to the pseudo high frequency sub-band power calculating circuit 35.

Also, multiple decoded high frequency sub-band power estimating coefficients found by regression analysis beforehand and the coefficient indices that identify such decoded high frequency sub-band power estimating coefficients are correlated and recorded in the pseudo high frequency sub-band power calculating circuit 35.

Specifically, multiple sets of the coefficient $A_{ib}(kb)$ and coefficient $B_{ib}$ for the various sub-band used to compute the above-described Expression (2) are prepared beforehand, as decoded high frequency sub-band power estimating coefficients. For example, these coefficients $A_{ib}(kb)$ and coefficient $B_{ib}$ are found beforehand with regression analysis using a least square method, with the low frequency sub-band power as explanatory variables, and the high frequency sub-band power as an explained variable. In the regression analysis, an input signal made up of low frequency sub-band signals and high frequency sub-band signals are used as the wide band teacher signal.

The pseudo high frequency sub-band power calculating circuit 35 uses the decoded high frequency sub-band power estimating coefficient and the feature amount from the feature amount calculating circuit 34 for each recorded decoded high frequency sub-band power estimating coefficient to calculate the pseudo high frequency sub-band power of each high frequency side sub-band, and supplies these to the pseudo high frequency sub-band power difference calculating circuit 36.

The pseudo high frequency sub-band power difference calculating circuit 36 compares the high frequency sub-band power obtained from the high frequency sub-band signal supplied from the sub-band dividing circuit 33 and the pseudo high frequency sub-band power from the pseudo high frequency sub-band power calculating circuit 35.

As a result of the comparison, of the multiple decoded high frequency sub-band power estimating coefficients, the pseudo high frequency sub-band power difference calculating circuit 36 supplies, to the high frequency encoding circuit 37, a coefficient index of the decoded high frequency sub-band power estimating coefficient having obtained the pseudo high frequency sub-band power nearest the high frequency sub-band power. In other words, a coefficient index of the decoded high frequency sub-band power estimating coefficient, for which a high frequency signal of the input signal to be realized at time of decoding, i.e. a decoded high frequency signal nearest the true value is obtained, is selected.

[Encoding Processing of Encoding Device]

Figure 19:
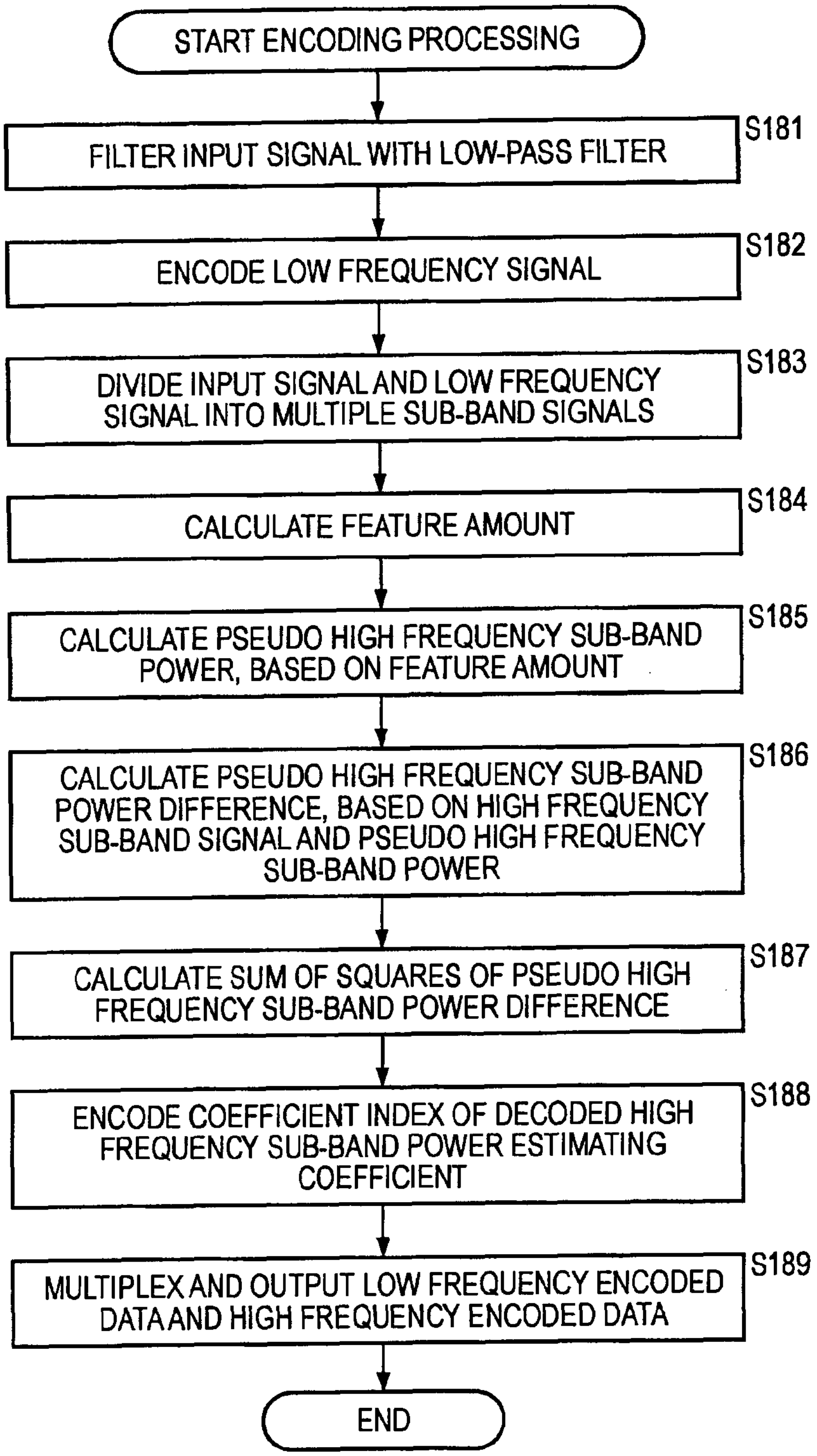
FIG. 19 is a flowchart describing encoding processing.

Next, encoding processing performed by the encoding device 30 in FIG. 18 will be described with reference to the flowchart in FIG. 19. Note that the processing in step S181 through step S183 is similar to step S111 through step S113 in FIG. 12, so description thereof will be omitted.

In step S184, the feature amount calculating circuit 34 uses the low frequency sub-band signal from the sub-band dividing circuit 33 to calculate the feature amount, and supplies this to the pseudo high frequency sub-band power calculating circuit 35.

Specifically, the feature amount calculating circuit 34 performs the computation in Expression (1) described above to calculate, as the feature amount, the low frequency sub-band power, power(ib,J), of frame J (where $0 \le J$) for each sub-band ib (where $sb-3 \le ib \le sb$) at the low frequency side. That is to say, the low frequency sub-band power, power(ib,J), is calculated by taking the root mean square of the sample values for each sample of the low frequency sub-band signals making up the frame J as a logarithm.

In step S185, the pseudo high frequency sub-band power calculating circuit 35 calculates a pseudo high frequency sub-band power, based on the feature amount supplied from the feature amount calculating circuit 34, and supplies this to the pseudo high frequency sub-band power difference calculating circuit 36.

For example, the pseudo high frequency sub-band power calculating circuit 35 uses the coefficient $A_{ib}(kb)$ and coefficient $B_{ib}$ that are recorded beforehand as decoded high frequency sub-band power estimating coefficient and the low frequency sub-band power, power (kb,J) (where $sb-3 \le kb \le sb$), to perform the computation in Expression (2) described above, and calculates the pseudo high frequency sub-band power, $power_{est}(ib,J)$.

That is to say, the coefficient $A_{ib}(kb)$ for each sub-band is multiplied by the low frequency sub-band power, power(kb, J), for each low frequency side sub-band, supplied as the feature amount, and further the coefficient $B_{ib}$ is added to the sum of the low frequency sub-band powers multiplied by the coefficients, and becomes the pseudo high frequency sub-band power, $power_{est}(ib,J)$. The pseudo high frequency sub-band power is calculated for each high frequency side sub-band wherein the index is sb+1 through eb.

Also, the pseudo high frequency sub-band power calculating circuit 35 performs calculation of pseudo high frequency sub-band power for each decoded high frequency sub-band power estimating coefficient recorded beforehand. For example, let us say that the coefficient index is 1 through K (where $2 \le K$), and K decoded high frequency sub-band power estimating coefficients are prepared beforehand. In this case, for each of K decoded high frequency sub-band power estimating coefficients, the pseudo high frequency sub-band powers are calculated for each sub-band.

In step S186, the pseudo high frequency sub-band power difference calculating circuit 36 calculates the pseudo high frequency sub-band power difference, based on the high frequency sub-band signal from the sub-band dividing circuit 33 and the pseudo high frequency sub-band power from the pseudo high frequency sub-band power calculating circuit 35.

Specifically, the pseudo high frequency sub-band power difference calculating circuit 36 performs computation similar to that in Expression (1) described above for the high frequency sub-band signals from the sub-band dividing circuit 33, and calculates the high frequency sub-band power, power(ib,J) in frame J. Note that according to the present embodiment, all of the sub-bands of the low frequency sub-band signals and sub-bands of the high frequency sub-band signals are identified using an index ib.

Next, the pseudo high frequency sub-band power difference calculating circuit 36 performs calculation similar to that in Expression (14) described above, and finds the difference between the high frequency sub-band power, power(ib,J) in frame J, and the pseudo high frequency sub-band power, $power_{est}(ib,J)$. Thus, for each decoded high frequency sub-band power estimating coefficient, a pseudo high frequency sub-band power difference, $power_{diff}(ib,J)$, is obtained for each high frequency side sub-band wherein the index is sb+1 through eb.

In step S187, the pseudo high frequency sub-band power difference calculating circuit 36 calculates the following Expression (15) for each decoded high frequency sub-band power estimating coefficient, and calculates the square sum of the pseudo high frequency sub-band power difference.

[Expression 15]

$$E(J, id) = \sum_{ib=sb+1}^{eb} \{power_{diff}(ib, J, id)\}^2 \tag{15}$$

Note that in Expression (15), the sum of squared differences E(J, id) shows the square sum of the pseudo high frequency sub-band power difference of frame J, found for the decoded high frequency sub-band power estimating coefficient wherein the coefficient index is id. Also, in Expression (15), $power_{diff}(ib,J,id)$ represents the pseudo high frequency sub-band power difference $power_{diff}(ib,J)$ of frame J of the sub-band wherein the index is ib, which is found for the decoded high frequency sub-band power estimating coefficient wherein the coefficient index is id. The sum of squared differences E(J, id) is calculated for each of K decoded high frequency sub-band power estimating coefficients.

The sum of squared differences E(J, id) thus obtained shows the degree of similarity between the high frequency sub-band power calculated from the actual high frequency signal and the pseudo high frequency sub-band power calculated using the decoded high frequency sub-band power estimating coefficient wherein the coefficient index is id.

That is to say, the error of estimation values as to the true value of the high frequency sub-band power is indicated. Accordingly, the smaller the sum of squared differences E(J, id) is, the closer to the actual high frequency signal is the decoded high frequency signal obtained by the computation using the decoded high frequency sub-band power estimating coefficient. In other words, the decoded high frequency sub-band power estimating coefficient having a minimal sum of squared differences E(J, id) can be said to be the optimal estimating coefficient for frequency band extending processing that is performed at the time of decoding an output code string.

Thus, the pseudo high frequency sub-band power difference calculating circuit 36 selects the sum of squared differences of the K sums of squared differences E(J,id) of which the value is the smallest, and supplies the coefficient index indicating the decoded high frequency sub-band power estimating coefficient corresponding to the sum of squared differences thereof, to the high frequency encoding circuit 37.

In step S188, the high frequency encoding circuit 37 encodes the coefficient index supplied from the pseudo high frequency sub-band power difference calculating circuit 36, and supplies the high frequency encoded data obtained as a result thereof to the multiplexing circuit 38.

For example, in step S188, entropy encoding or the like is performed as to the coefficient index. Thus, the information amount of high frequency encoded data output to the decoding device 40 can be compressed. Note that the high frequency encoded data may be any sort of information as long as the information can obtain an optimal decoded high frequency sub-band power estimating coefficient, and for example, the coefficient index may be used as high frequency encoded data, without change.

In step S189, the multiplexing circuit 38 multiplexes the low frequency encoded data supplied from the low frequency encoding circuit 32 and the high frequency encoded data supplied from the high frequency encoding circuit 37, outputs the output code string obtained as a result thereof, and ends the encoding processing.

Thus, by outputting the high frequency encoded data, obtained by encoding the coefficient index, as output code string, together with the low frequency encoded data, the decoding device 40 that receives the input of this output code string can obtain the decoded high frequency sub-band power estimating coefficient that is optimal for frequency band extending processing. Thus, signals with greater sound quality can be obtained.

[Functional Configuration Example of Decoding Device]

Figure 20:
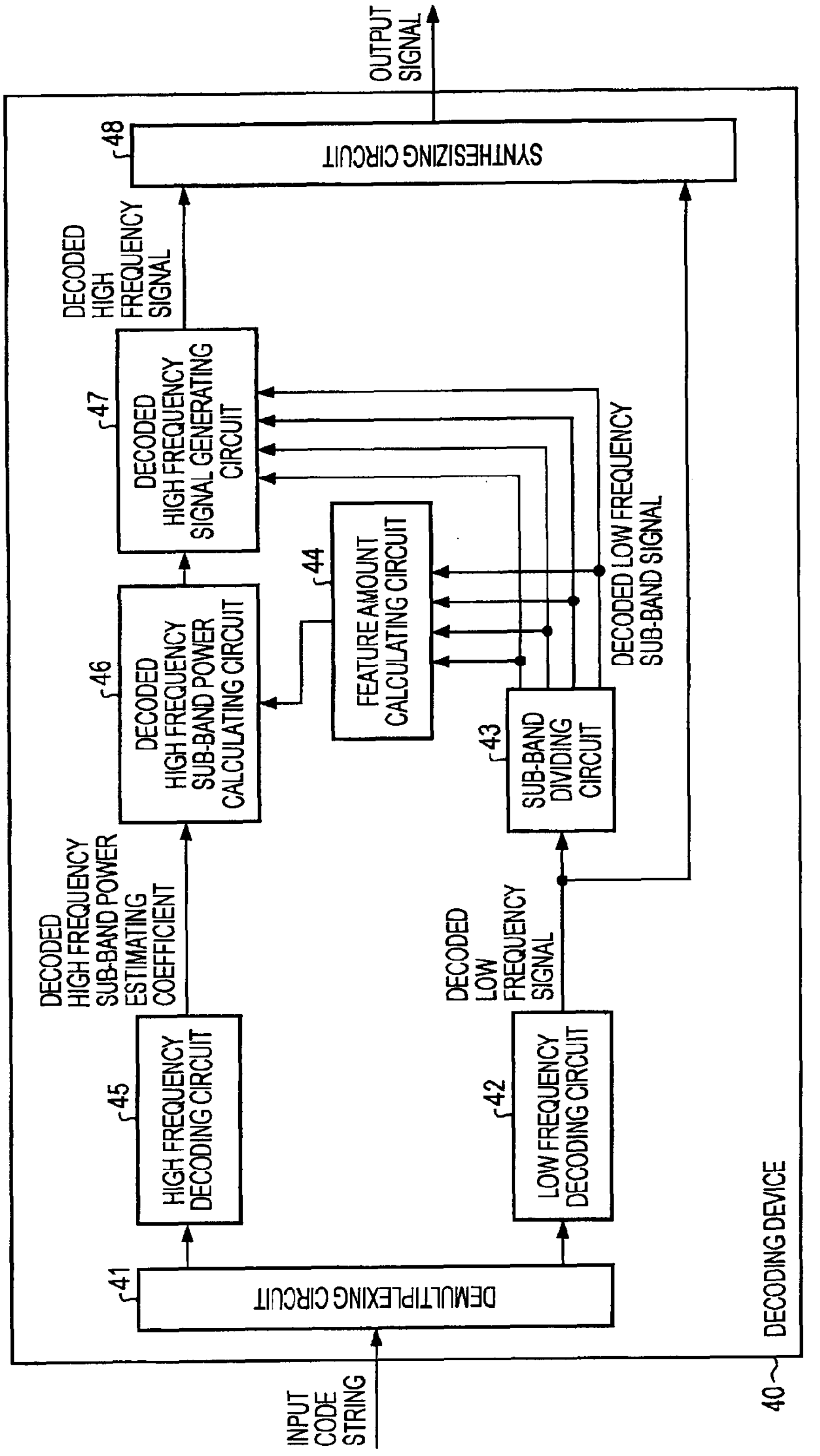
FIG. 20 is a block diagram illustrating a functional configuration example of a decoding device.

Also, the decoding device 40 to input, as an input code string, and decode, the output code string output from the encoding device 30 in FIG. 18, is configured as shown in FIG. 20, for example. Note that in FIG. 20, the portions corresponding to the case in FIG. 13 have the same reference numerals appended thereto, and description thereof will be omitted.

The decoding device 40 in FIG. 20 is the same as the decoding device 40 in FIG. 13, from the point of being made up of the demultiplexing circuit 41 through the synthesizing circuit 48, but differs from the decoding device 40 in FIG. 13 from the point that the decoded low frequency signal from the low frequency decoding circuit 42 is not supplied to the feature amount calculating circuit 44.

At the decoding device 40 in FIG. 20, the high frequency decoding circuit 45 records beforehand the same decoded high frequency sub-band power estimating coefficient as the decoded high frequency sub-band power estimating coefficient recorded by the pseudo high frequency sub-band power calculating circuit 35 in FIG. 18. That is to say, a set of the coefficient $A_{ib}(kb)$ and coefficient $B_{ib}$ serving as the decoded high frequency sub-band power estimating coefficient found by the regression analysis beforehand is correlated to the coefficient index and recorded.

The high frequency decoding circuit 45 decodes the high frequency encoded data supplied from the demultiplexing circuit 41, and supplies the decoded high frequency sub-band power estimating coefficient shown with the coefficient index obtained as a result thereof to the decoded high frequency sub-band power calculating circuit 46.

[Decoding Processing of Decoding Device]

Figure 21:
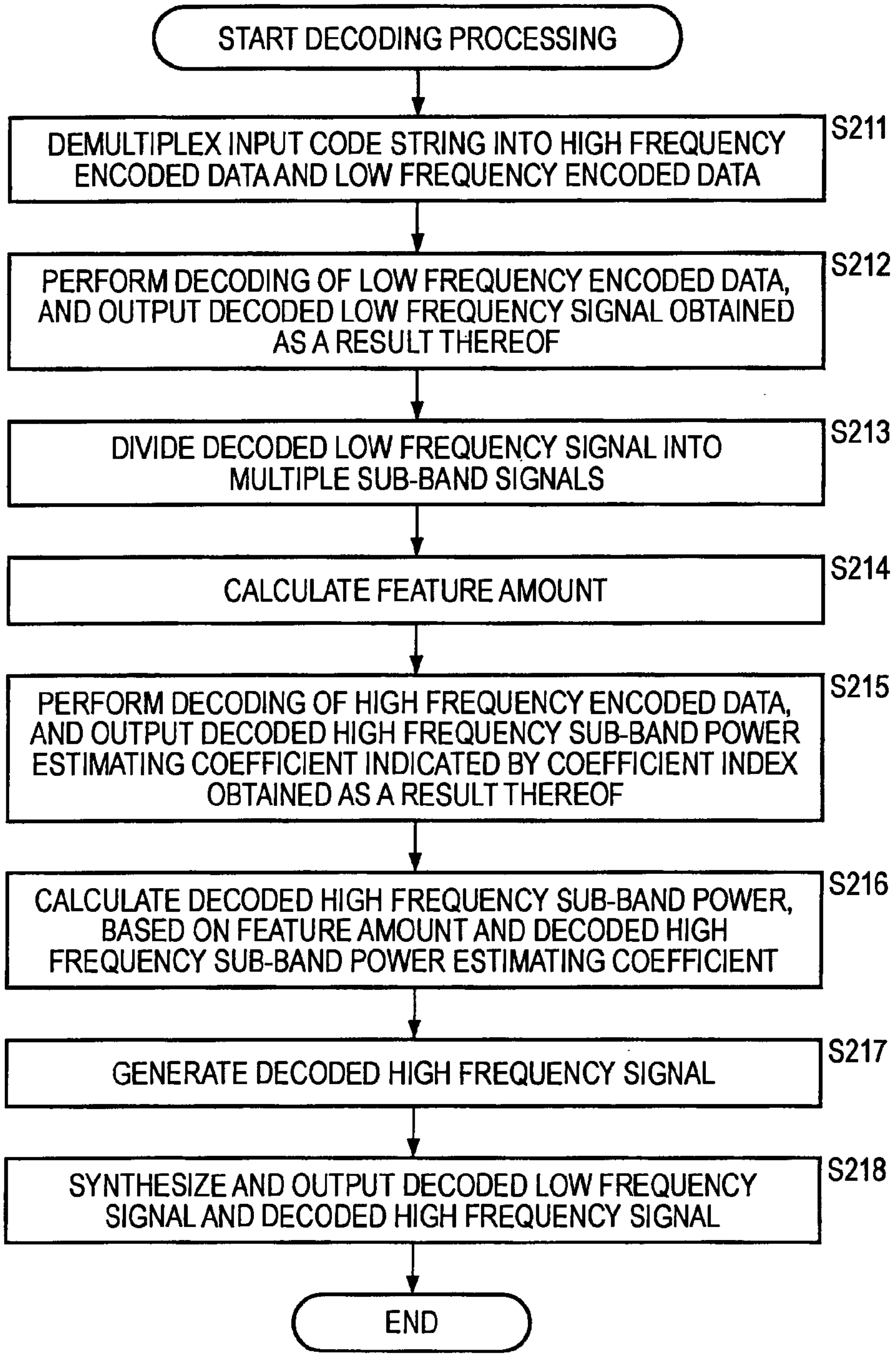
FIG. 21 is a flowchart describing decoding processing.

Next, decoding processing performed with the decoding device 40 in FIG. 20 will be described with reference to the flowchart in FIG. 21.

The decoding processing is started upon the output code string output from the encoding device 30 being supplied as an input code string to the decoding device 40. Note that the processing in step S211 through step S213 is similar to the processing in step S131 through step S133 in FIG. 14, so description thereof will be omitted.

In step S214, the feature amount calculating circuit 44 uses the decoded low frequency sub-band signal from the sub-band dividing circuit 43 to calculate the feature amount, and supplies this to the decoded high frequency sub-band power calculating circuit 46. Specifically, the feature amount calculating circuit 44 performs computation of the above-described Expression (1), and calculates the low frequency sub-band power, power(ib,J) of the frame J (where $0 \le J$) as the feature amount, for the various low frequency side sub-bands ib.

In step S215, the high frequency decoding circuit 45 performs decoding of the high frequency encoded data supplied from the demultiplexing circuit 41, and supplies the decoded high frequency sub-band power estimating coefficient shown by the coefficient index obtained as a result thereof to the decoded high frequency sub-band power calculating circuit 46. That is to say, of the multiple decoded high frequency sub-band power estimating coefficients recorded beforehand in the high frequency decoding circuit 45, the decoded high frequency sub-band power estimating coefficient shown in the coefficient index obtained by decoding is output.

In step S216, the decoded high frequency sub-band power calculating circuit 46 calculates decoded high frequency sub-band power, based on the feature amount supplied from the feature amount calculating circuit 44 and the decoded high frequency sub-band power estimating coefficient supplied from the high frequency decoding circuit 45, and supplies this to the decoded high frequency signal generating circuit 47.

That is to say, the decoded high frequency sub-band power calculating circuit 46 uses the coefficients $A_{ib}(kb)$ and $B_{ib}$ serving as the decoded high frequency sub-band power estimating coefficients, and the low frequency sub-band power, power(kb,J), (where $sb-3 \le kb \le sb$) as the feature amount, to perform the computation in the above-described Expression (2), and calculates the decoded high frequency sub-band power. Thus, a decoded high frequency sub-band power is obtained for each high frequency side sub-band wherein the index is sb+1 through eb.

In step S217, the decoded high frequency signal generating circuit 47 generates a decoded high frequency signal, based on the decoded low frequency sub-band signal supplied from the sub-band dividing circuit 43 and the decoded high frequency sub-band power supplied from the decoded high frequency sub-band power calculating circuit 46.

Specifically, the decoded high frequency signal generating circuit 47 performs the computation in the above-described Expression (1), using the decoded low frequency sub-band signal, and calculates the low frequency sub-band power for each low frequency side sub-band. The decoded high frequency signal generating circuit 47 then uses the obtained low frequency sub-band power and decoded high frequency sub-band power to perform computation of the above-described Expression (3), and calculates a gain amount G(ib,J) for each high frequency side sub-band.

Further, the decoded high frequency signal generating circuit 47 uses the gain amount G(ib,J) and the decoded low frequency sub-band signal to perform computation of the above-described Expression (5) and Expression (6), and generates a high frequency sub-band signal x3(*ib,n*) for each high frequency side sub-band.

That is to say, the decoded high frequency signal generating circuit 47 subjects the decoded low frequency sub-band signal x(ib,n) to amplitude adjustment, according to the ratio of the low frequency sub-band power and decoded high frequency sub-band power, and as a result thereof, further subjects the obtained decoded low frequency sub-band signal x2(*ib,n*) to frequency modulation. Thus, the signal of the low frequency side sub-band frequency component is converted to a frequency component signal of the high frequency side sub-band, and a high frequency sub-band signal x3(*ib,n*) is obtained.

The processing that thus obtains the high frequency sub-band signals for each sub-band is as described below in greater detail.

Let us say that four sub-bands arrayed continuously in a frequency region is called a band block, and a frequency band is divided so that one band block (hereafter particularly called low frequency block) is made up of four sub-bands wherein the indices on the low frequency side are sb through sb−3. At this time, for example, the band made up of sub-bands wherein the indices on the high frequency side are sb+1 through sb+4 is considered one band block. Note that hereafter, a band block on the high frequency side, i.e. made up of sub-bands wherein the indices are sb+1 or greater, is particularly called a high frequency block.

Now, let us focus on one sub-band that makes up a high frequency block, and generate a high frequency sub-band signal of the sub-band thereof (hereafter called focus sub-band). First, the decoded high frequency signal generating circuit 47 identifies the sub-band of the low frequency block which is in the same position relation as the position of the sub-band of interest in the high frequency block.

For example, if the index of the sub-band of interest is sb+1, the sub-band of interest is a band having the lowest frequency of the high frequency block, whereby a low frequency block sub-band in the same position relation as the sub-band of interest becomes a sub-band wherein the index is sb−3.

Thus, upon the sub-band of the low frequency block in the same position relation as the sub-band of interest having been identified, the low frequency sub-band power and decoded low frequency sub-band signal of the sub-band thereof, and the decoded high frequency sub-band power of the sub-band of interest, are used to generate the high frequency sub-band signal of the sub-band of interest.

That is to say, the decoded high frequency sub-band power and low frequency sub-band power are substituted in the Expression (3), and a gain amount according to the ratio of the powers thereof is calculated. The calculated gain amount is multiplied by the decoded low frequency sub-band signal, and further the decoded low frequency sub-band signal which has been multiplied by the gain amount is subjected to frequency modulation with the computation in Expression (6), and becomes the high frequency sub-band signal of the sub-band of interest.

With the processing above, a high frequency sub-band signal is obtained for each high frequency side sub-band. Subsequently, the decoded high frequency signal generating circuit 47 further performs computation in Expression (7) described above, finds the sum of the obtained various high frequency sub-band signals, and generates the decoded high frequency signal. The decoded high frequency signal generating circuit 47 supplies the obtained decoded high frequency signal to the synthesizing circuit 48, and the processing is advanced to step S217 through step S218.

In step S218, the synthesizing circuit 48 synthesizes the decoded low frequency signal from the low frequency decoding circuit 42 and the decoded high frequency signal form the decoded high frequency signal generating circuit 47, and outputs this as an output signal. Subsequently, the decoding processing is then ended.

As described above, according to the decoding device 40, a coefficient index is obtained from the high frequency encoded data which is obtained by demultiplexing the input code string, and the decoded high frequency sub-band power estimating coefficient shown by the coefficient index thereof is used to calculate decoded high frequency sub-band power, whereby the estimating precision for the high frequency sub-band power can be improved. Thus, music signals can be played with greater sound quality.

<4. Fourth Embodiment>

[Encoding Processing of Encoding Device]

Also, an example is described above of a case wherein only the coefficient index is included in the high frequency encoded data, but other information may be included.

For example, if the coefficient index is included in the high frequency encoded data, the decoded high frequency sub-band power estimating coefficient, which obtain the decoded high frequency sub-band power nearest the high frequency sub-band power of the actual high frequency signal can be known at the decoding device 40 side.

However, a difference of roughly the same value as the pseudo high frequency sub-band power difference, $power_{diff}$ (ib,J), calculated with the pseudo high frequency sub-band power difference calculating circuit 36, occurs in the actual high frequency sub-band power (true value) and the decoded high frequency sub-band power (estimated value) obtained at the decoding device 40 side.

Now, if not only the coefficient index, but also pseudo high frequency sub-band power difference of each sub-band is included in the high frequency encoded data, the general error of the decoded high frequency sub-band power as to the actual high frequency sub-band power can be known at the decoding device 40 side. Thus, the estimation precision for the high frequency sub-band power can be further improved, using this error.

Figure 22:
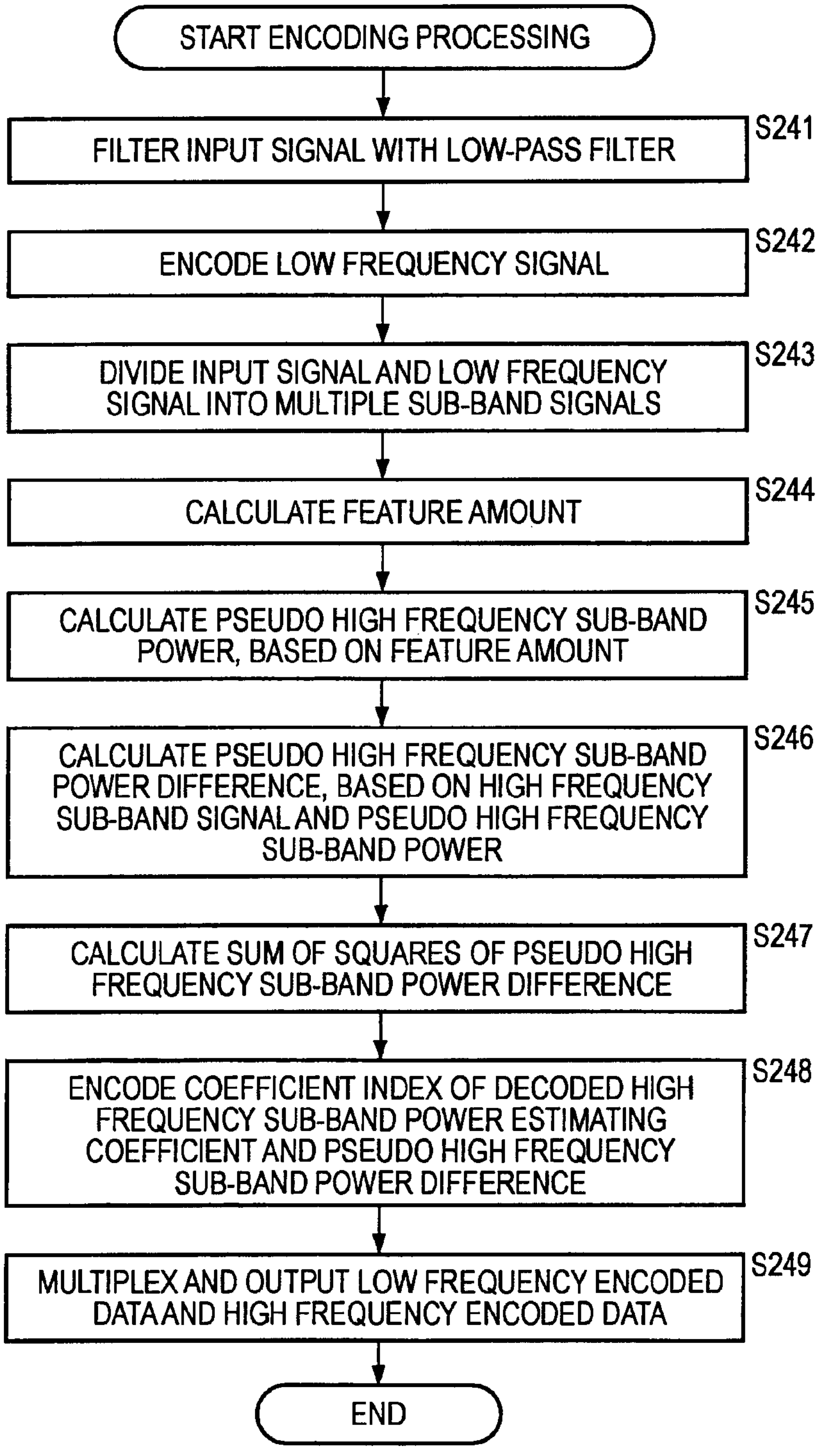
FIG. 22 is a flowchart describing encoding processing.
Figure 23:
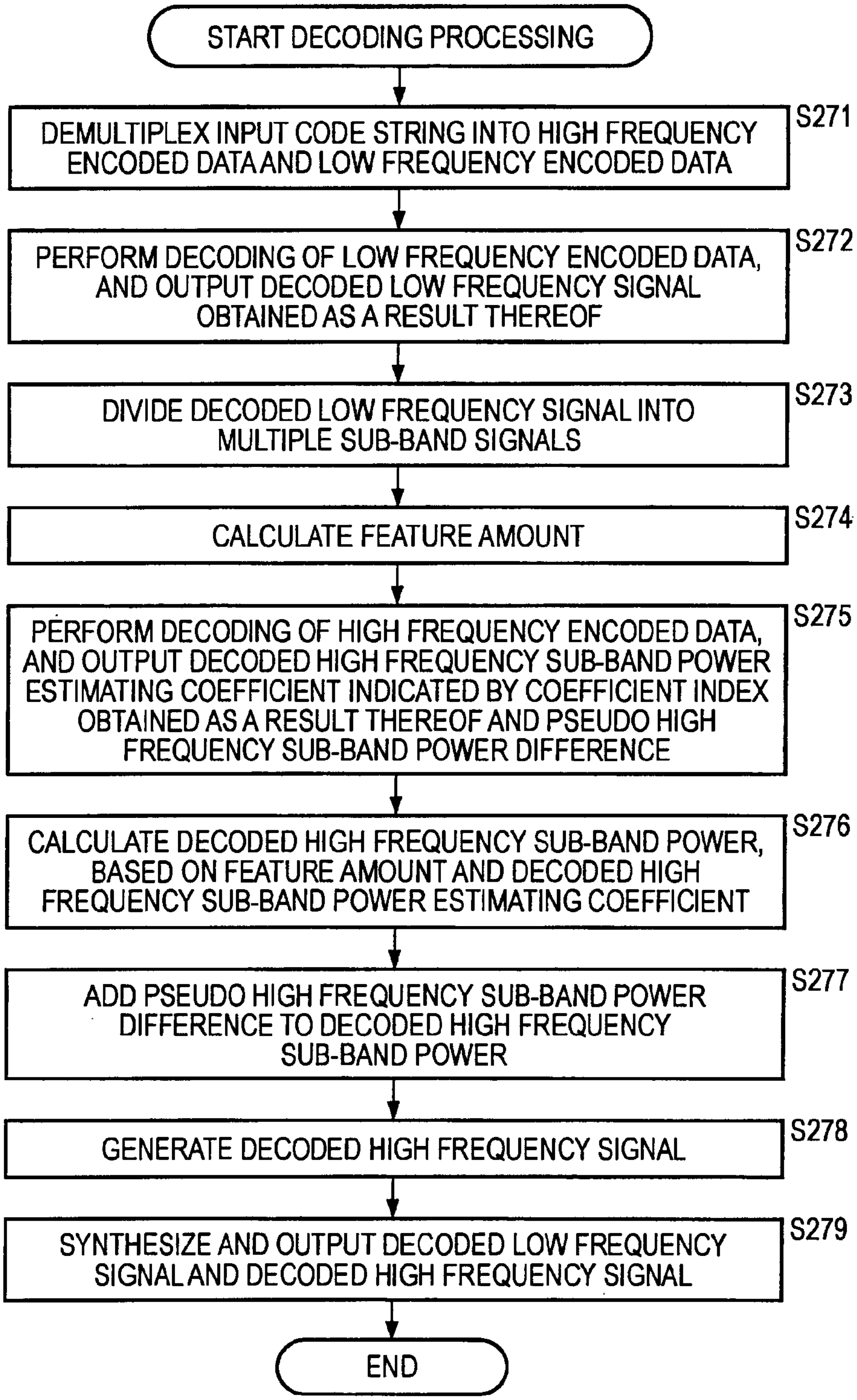
FIG. 23 is a flowchart describing decoding processing.

The encoding processing and decoding processing in the case of a pseudo high frequency sub-band power difference being included in the high frequency encoded data will be described below with reference to the flowcharts in FIG. 22 and FIG. 23.

First, encoding processing performed with the encoding device 30 in FIG. 18 will be described with reference to the flowchart in FIG. 22. Note that the processing in step S241 through step S246 is similar to the processing in step S181 through step S186 in FIG. 19, so description thereof will be omitted.

In step S247, the pseudo high frequency sub-band power difference calculating circuit 36 performs computation of the above-described Expression (15), and calculates the sum of squared difference E(J,id) for each decoded high frequency sub-band power estimating coefficient.

The pseudo high frequency sub-band power difference calculating circuit 36 selects a sum of squared differences that has the smallest value of the sums of squared differences (J,id), and supplies, to the high frequency encoding circuit 37, the coefficient index showing the decoded high frequency sub-band power estimating coefficient corresponding to the sum of squared differences thereof.

Further, the pseudo high frequency sub-band power difference calculating circuit 36 supplies the pseudo high frequency sub-band power difference $power_{diff}(ib,J)$ for each sub-band, found for the decoded high frequency sub-band power estimating coefficient corresponding to the selected sum of squared differences, to the high frequency encoding circuit 37.

In step S248, the high frequency encoding circuit 37 encodes the coefficient index and pseudo high frequency sub-band power difference, supplied from the pseudo high frequency sub-band power difference calculating circuit 36, and supplies the high frequency encoded data obtained as a result thereof to the multiplexing circuit 38.

Thus, the pseudo high frequency sub-band power difference for each sub-band at the high frequency side, wherein the index is sb+1 through eb, i.e. the estimating error on the high frequency sub-band power, is supplied as high frequency encoded data to the decoding device 40.

Upon the high frequency encoded data having been obtained, subsequently, the processing in step S249 is performed and encoding processing is ended, but the processing in step S249 is similar to the processing in step S189 in FIG. 19 so description thereof will be omitted.

As described above, when the pseudo high frequency sub-band power difference is included in the high frequency encoded data, the estimating precision of the high frequency sub-band power can be further improved at the decoding device 40, and music signals with greater sound quality can be obtained.

[Decoding Processing of Decoding Device]

Next, the decoding processing performed with the decoding device 40 in FIG. 20 will be described with reference to the flowchart in FIG. 23. Note that the processing in step S271 through step S274 is similar to the processing in step S211 through step S214 in FIG. 21, so description thereof will be omitted.

In step S275, the high frequency decoding circuit 45 performs decoding of the high frequency encoded data supplied from the demultiplexing circuit 41. The high frequency decoding circuit 45 then supplies the decoded high frequency sub-band power estimating coefficient indicated by the coefficient index obtained by decoding, and the pseudo high frequency sub-band power difference of each sub-band obtained by decoding, to the decoded high frequency sub-band power calculating circuit 46.

In step S276, the decoded high frequency sub-band power calculating circuit 46 calculates the decoded high frequency sub-band power, based on the feature amount supplied from the feature amount calculating circuit 44 and the decoded high frequency sub-band power estimating coefficient supplied from the high frequency decoding circuit 45. Note that in step S276, processing similar to that in step S216 in FIG. 21 is performed.

In step S277, the decoded high frequency sub-band power calculating circuit 46 adds the pseudo high frequency sub-band power difference supplied from the high frequency decoding circuit 45 to the decoded high frequency sub-band power, sets this as the final decoded high frequency sub-band power, and supplies this to the decoded high frequency signal generating circuit 47. That is to say, to the decoded high frequency sub-band power for each calculated sub-band is added the pseudo high frequency sub-band power difference of the same sub-band.

Subsequently, processing in step S278 and step S279 is performed and the decoding processing is ended, but the processing herein is the same as that in step S217 and step S218 in FIG. 21, so description thereof will be omitted.

As described above, the decoding device 40 obtains the coefficient index and pseudo high frequency sub-band power difference from the high frequency encoded data obtained by the demultiplexing of the input code string. The decoding device 40 then calculates the decoded high frequency sub-band power, using the decoded high frequency sub-band power estimating coefficient indicated by the coefficient index and the pseudo high frequency sub-band power difference. Thus, estimation precision of the high frequency sub-band power can be improved, and music signals can be played with greater sound quality.

Note that the difference in estimated values of the high frequency sub-band power occurring between the encoding device 30 and decoding device 40, i.e. the difference in the pseudo high frequency sub-band power and decoded high frequency sub-band power (hereafter called intra-device estimation difference) may be considered.

In such a case, for example, the pseudo high frequency sub-band power difference serving as the high frequency encoded data may be corrected with the intra-device estimation difference, or the intra-device estimation difference may be included in the high frequency encoded data, and the pseudo high frequency sub-band power difference may be corrected by the intra-device estimation difference at the decoding device 40 side. Further, the intra-device estimation difference may be recorded beforehand at the decoding device 40 side, where the decoding device 40 adds the intra-device estimation difference to the pseudo high frequency sub-band power difference, and performs corrections. Thus, a decoded high frequency signal closer to the actual high frequency signal can be obtained.

<5. Fifth Embodiment>

Note that the encoding device 30 in FIG. 18 is described such that the pseudo high frequency sub-band power difference calculating circuit 36 selects, as the sum of squared differences E(J,id) as an indicator, an optimal sum of squared differences from multiple coefficient indices, but an indicator different from a sum of squared differences may be used to select the coefficient index.

For example, an evaluation value that considers the square mean value, maximum value, and mean value and so forth of the residual difference between the high frequency sub-band power and pseudo high frequency sub-band power may be used as the indicator to select the coefficient index. In such a case, the encoding device 30 in FIG. 18 performs encoding processing shown in the flowchart in FIG. 24.

Figure 24:
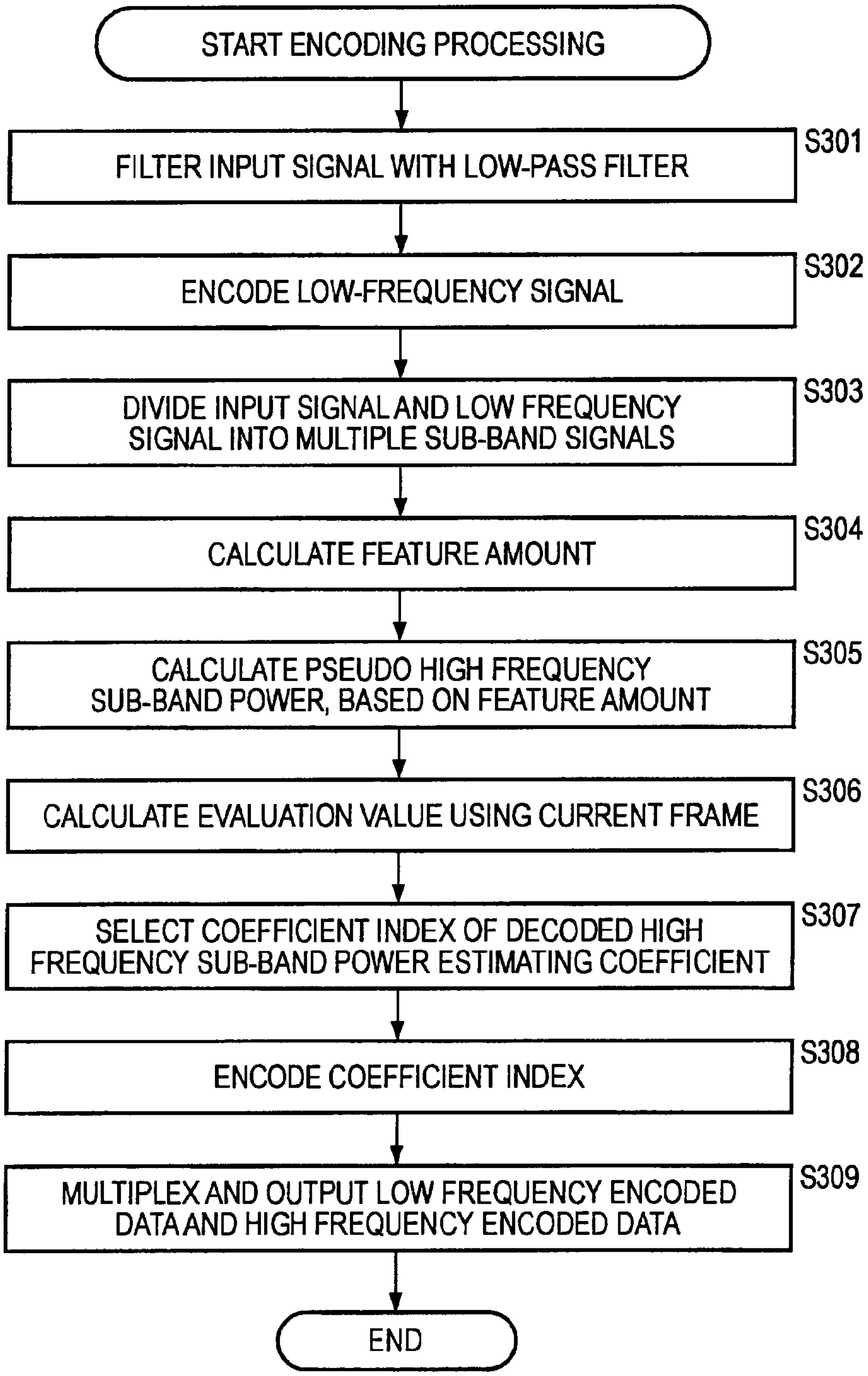
FIG. 24 is a flowchart describing encoding processing.

The encoding processing with the encoding device 30 will be described below with reference to the flowchart in FIG. 24. Note that the processing in step S301 through step S305 is similar to the processing in step S181 through step S185 in FIG. 19, so description thereof will be omitted. Upon the processing in step S301 through step S305 having been performed, the pseudo high frequency sub-band power for each sub-band is calculated for each of K decoded high frequency sub-band power estimating coefficients.

In step S306, the pseudo high frequency sub-band power difference calculating circuit 36 calculates an evaluation value Res(id,J) using the current frame J which is subject to processing, for each of K decoded high frequency sub-band power estimating coefficients.

Specifically, the pseudo high frequency sub-band power difference calculating circuit 36 uses the high frequency sub-band signal for each sub-band supplied from the sub-band dividing circuit 33 to perform computation similar to that in the above-described Expression (1), and calculates the high frequency sub-band power, power(ib,J) in frame J. Note that according to the present embodiment, all of the sub-bands of the low frequency sub-band signals and the sub-bands of the high frequency sub-band signals are identified using the index ib.

Upon the high frequency sub-band power, power(ib,J) having been obtained, the pseudo high frequency sub-band power difference calculating circuit 36 calculates the following Expression (16), and calculates the residual mean square value $Res_{std}$(id,J).

[Expression 16]

$$Res_{std}(id, J) = \sum_{ib=sb+1}^{eb} \{\text{power}(ib, J) - power_{est}(ib, id, J)\}^2 \tag{16}$$

That is to say, for each sub-band at the high frequency side wherein the index is sb+1 through eb, the difference of the high frequency sub-band power, power(ib,J) of the frame J and the pseudo high frequency sub-band power, $power_{est}$(ib,id,J) is found, and the square sum of the difference thereof becomes the residual mean square value $Res_{std}$(id,J). Note that the pseudo high frequency sub-band power, $power_{est}$(ib,id,J), represents a pseudo high frequency sub-band power of the frame J of a sub-band wherein the index is ib, which is found for a decoded high frequency sub-band power estimating coefficient wherein the coefficient index is id.

Next, the pseudo high frequency sub-band power difference calculating circuit 36 calculates the following Expression (17), and calculates the residual maximum value $Res_{max}$(id,j).

[Expression 17]

$$\text{Res}_{max}(id,J)=\max_{ib}\{|\text{power}(ib,J)-\text{power}_{est}(ib,id,J)|\} \tag{17}$$

Note that in Expression (17), $\max_{ib}\{|\text{Power}(ib,J)-\text{power}_{est}(ib,id,J)|\}$ represents the greater of the absolute values of the difference between the high frequency sub-band power, power(ib,J), of each sub-band wherein the index is sb+1 through eb, and the pseudo high frequency sub-band power, $power_{est}$(ib,id,J). Accordingly, the maximum value of the absolute values of the difference between the high frequency sub-band power, power(ib,J), in frame J and the pseudo high frequency sub-band power, $power_{est}$(ib,id,J), becomes the residual maximum value $Res_{max}$(id,J).

Also, the pseudo high frequency sub-band power difference calculating circuit 36 calculates the next Expression (18), and calculates the residual mean value $Res_{ave}$(id,J).

[Expression 18]

$$Res_{ave}(id, J) = \left| \left( \sum_{ib=sb+1}^{eb} \{\text{power}(ib, J) - power_{est}(ib, id, J)\} \right) \Big/ (eb - sb) \right| \tag{18}$$

That is to say, for each sub-band at the high frequency side wherein the index is sb+1 through eb, the difference between the high frequency sub-band power, power (ib,J) of frame J, and the pseudo high frequency sub-band power, $power_{est}$(ib,id,J) is found, and the sum total of these differences is found. The absolute value of the values obtained by dividing the obtained sum of differences by the number of sub-bands (eb-sb) at the high frequency side becomes the residual mean value $Res_{ave}$(id,J). The residual mean value $Res_{ave}$(id, J) herein represents the size of the mean values of the estimated difference of various sub-bands of which the sign has been taken into consideration.

Further, upon obtaining the residual mean square value $Res_{std}$(id,J), residual maximum value $Res_{max}$(id,J), and residual mean value $Res_{ave}$(id,J), the pseudo high frequency sub-band power difference calculating circuit 36 calculates the following Expression (19), and calculates a final evaluation value Res(id,J).

[Expression 19]

$$\text{Res}(id,J)=\text{Res}_{std}(id,J)+W_{max}\times\text{Res}_{max}(id,J)+W_{ave}\times\text{Res}_{ave}(id,J) \tag{19}$$

That is to say, the residual mean square value $Res_{std}$(id,J), residual maximum value $Res_{max}$(id,J), and residual mean value $Res_{ave}$(id,J) are added with weighting, and become a final evaluation value Res(id,J). Note that in Expression (19), the $W_{max}$ and $W_{ave}$ are preset weightings, and for example may be $W_{max}$=0.5, $W_{ave}$=0.5 or the like.

The pseudo high frequency sub-band power difference calculating circuit 36 performs the above-described processing, and calculates the evaluation value Res(id,J) for each of K decoded high frequency sub-band power estimating coefficients, i.e. for each of K coefficient indices id.

In step S307, the pseudo high frequency sub-band power difference calculating circuit 36 selects a coefficient index id, based on the evaluation value Res(id,J) for each found coefficient index id.

The evaluation value Res(id,J) obtained with the above processing indicates the degree of similarity between the high frequency sub-band power calculated from the actual high frequency signal, and the pseudo high frequency sub-band power calculated using the decoded high frequency sub-band power estimating coefficient wherein the coefficient index is id. That is to say, this shows the size in high frequency component estimating error.

Accordingly, the smaller that the evaluation value Res(id, J) is, a decoded high frequency signal will be obtained that is closer to the actual high frequency signal, due to computation using the decoded high frequency sub-band power estimating coefficient. Thus, the pseudo high frequency sub-band power difference calculating circuit 36 selects an evaluation value wherein, of the K evaluation values Res (id,J), the value is minimum, and supplies, to the high frequency encoding circuit 37, the coefficient index indicating the decoded high frequency sub-band power estimating coefficient corresponding to the evaluation value thereof.

Upon the coefficient index being output to the high frequency encoding circuit 37, subsequently the processing in step S308 and step S309 are performed and the encoding processing is ended, but this processing is similar to that in step S188 and step S189 in FIG. 19, so description thereof will be omitted.

As shown above, with the encoding device 30, the evaluation value Res(id,J) calculated from the residual mean square value $Res_{std}$(id,J), residual maximum value $Res_{max}$(id,J), and residual mean value Resave(id,J) is used, and an optimal coefficient index for the decoded high frequency sub-band power estimating coefficient is selected.

By using the evaluation value Res(id,J), estimation precision of the high frequency sub-band power can be evaluated using more evaluation scales as compared to the case of using the sum of squared differences, whereby an more proper decoded high frequency sub-band power estimating coefficient can be selected. Thus, with the decoding device 40 which receives input of the output code string, a decoded high frequency sub-band power estimating coefficient that is optimal for the frequency band extending processing can be obtained, and signals with greater sound quality can be obtained.

<Modification 1>

Also, by performing the encoding processing described above for each input signal frame, coefficient indices that differ for each consecutive frame may be selected at a constant region having little temporal variance of the high frequency sub-band power for each high frequency side sub-band of the input signal.

That is to say, with consecutive frames that make up a constant region of the input signal, the high frequency sub-band power is approximately the same value of each frame, so for these frames the same coefficient index should be selected continuously. However, in segments of these consecutive frames, the coefficient index selected by frame can change, and consequently, the high frequency component of audio played at the decoding device 40 side can cease to be constant. Discomfort from a listening perspective can occur from the played audio.

Now, in the case of selecting a coefficient index with the encoding device 30, estimation results of the high frequency component with the frame that is temporally previous may also be considered. In such a case, the encoding device 30 in FIG. 18 performs the encoding processing shown in the flowchart in FIG. 25.

Figure 25:
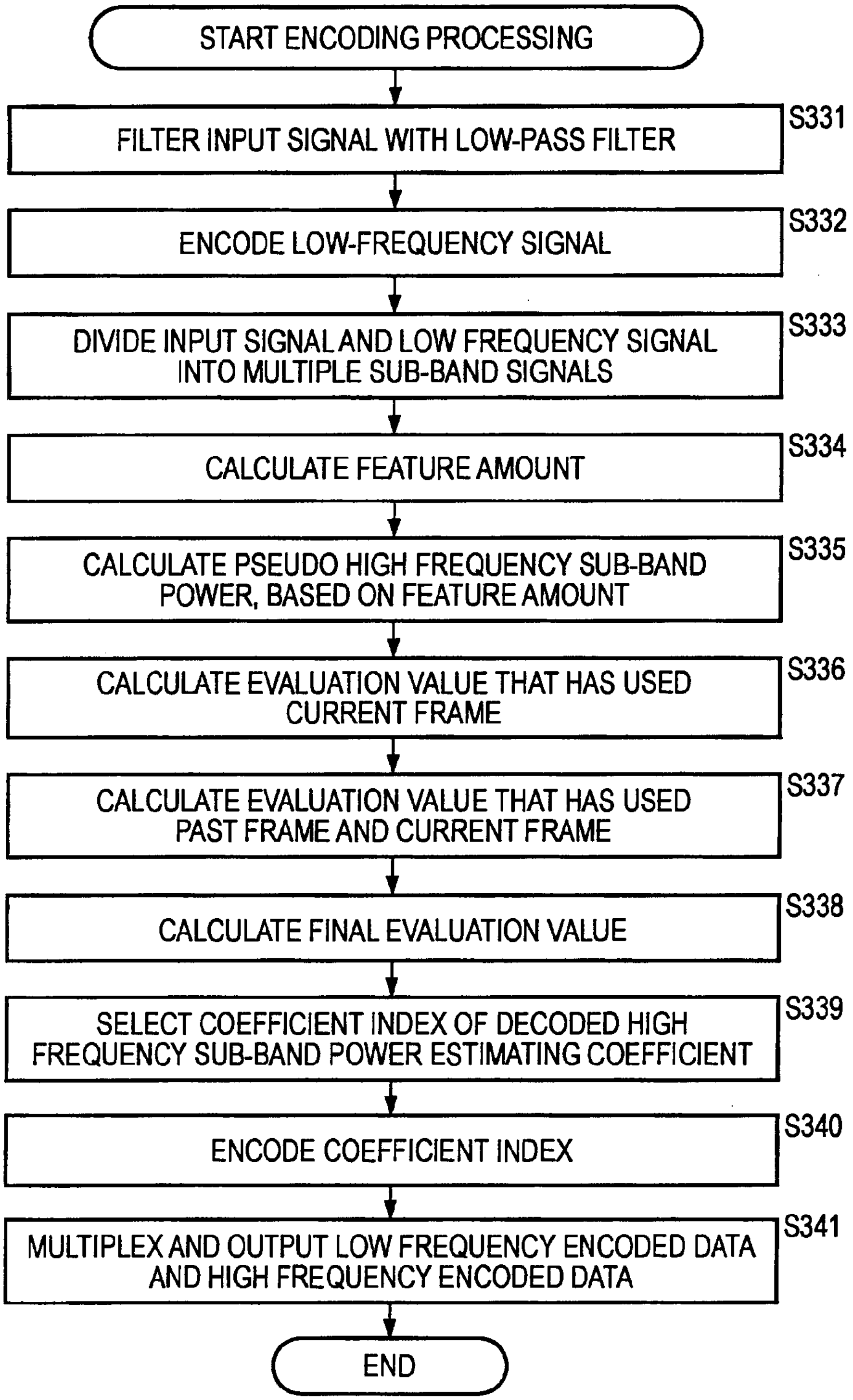
FIG. 25 is a flowchart describing encoding processing.

The encoding processing with the encoding device 30 will be described below with reference to the flowchart in FIG. 25. Note that the processing in step S331 through step S336 is similar to the processing in step S301 through step S306 in FIG. 24, so description thereof will be omitted.

In step S337, the pseudo high frequency sub-band power difference calculating circuit 36 calculates the evaluation value ResP(id,J) that uses a past frame and current frame.

Specifically, the pseudo high frequency sub-band power difference calculating circuit 36 records the pseudo high frequency sub-band power for each sub-band, obtained using the decoded high frequency sub-band power estimating coefficient of the coefficient index finally selected for the frame (J−1) that is temporally one frame prior to the frame J to be processed. Now, the finally selected coefficient index is the coefficient index that is encoded by the high frequency encoding circuit 37 and output by the decoding device 40.

Hereafter, we will say that the coefficient index id selected particularly in the frame (J−1) is $id_{selected}$(J−1). Also, the description will be continued where the pseudo high frequency sub-band power of the sub-band having the index of ib (where sb+1≤ib≤eb), obtained using the decoded high frequency sub-band power estimating coefficient of the coefficient index $id_{selected}$(J−1), as $power_{est}$(ib,$id_{selected}$(J−1)) J−1).

The pseudo high frequency sub-band power difference calculating circuit 36 first calculates the next Expression (20), and calculates an estimated residual mean square value $ResP_{std}$(id,J).

[Expression 20]

$$ResP_{std}(id, J) = \sum_{ib=sb+1}^{eb} \{power_{est}(ib, id_{selected}(J-1), J-1) - power_{est}(ib, id, J)\}^2 \quad (20)$$

That is to say, for each sub-band at the high frequency side wherein the index is sb+1 through eb, the difference is found between the pseudo high frequency sub-band power, $power_{est}$(ib,$id_{selected}$(J−1)) J−1) of the frame (J−1) and the pseudo high frequency sub-band power, $power_{est}$(ib,id,J) of the frame J. The square sum of the difference thereof then becomes the estimated residual mean square value $ResP_{std}$(id,J). Note that the pseudo high frequency sub-band power, $power_{est}$(ib,id,J), represents the pseudo high frequency sub-band power of the frame J of a sub-band wherein the index is ib, which is found for the decoded high frequency sub-band power estimating coefficient wherein the coefficient index is id.

The estimated residual mean square value $ResP_{std}$ (id,J) herein is a sum of squared differences of the pseudo high frequency sub-band power between temporally consecutive frames, whereby the smaller the estimated residual mean square value $ResP_{std}$ (id,J) is, the less temporal change there will be in the high frequency component estimated value.

Next, the pseudo high frequency sub-band power difference calculating circuit 36 calculates the following Expression (21), and calculates an estimated residual maximum value $ResP_{max}$(id,J).

[Expression 21]

$$ResP_{max}(id,J)=\max_{ib}\{|power_{est}(ib,id_{selected}(J-1),J-1)-power_{est}(ib,id,J)|\} \quad (21)$$

Note that in Expression (21), $\max_{ib}\{|power_{est}$ (ib, $id_{selected}$(J−1), J−1)−$power_{est}$ (ib,id,J)|} represents the greater of the absolute values of the difference between the pseudo high frequency sub-band power, $power_{est}$(ib,$id_{selected}$(J−1),J−1) of each sub-band wherein the index is sb+1 through eb, and the pseudo high frequency sub-band power, $power_{est}$(ib,id,J). Accordingly, the maximum value of the absolute values of the difference in the pseudo high frequency sub-band power between temporally consecutive frames becomes the estimated residual maximum value $ResP_{max}$(id,J).

The smaller that the value of the estimated residual maximum value $ResP_{max}$(id,J) is, the closer the estimation results will be of the high frequency components between consecutive frames.

Upon the estimated residual maximum value $ResP_{max}$(id,J) having been obtained, next the pseudo high frequency sub-band power difference calculating circuit 36 calculates the following Expression (22), and calculates an estimated residual mean value $ResP_{ave}$(id,J).

[Expression 22]

$$ResP_{ave}(id, J) = \left| \left( \sum_{ib=sb+1}^{eb} \{power_{est}(ib, id_{selected}(J-1), J-1) - power_{est}(ib, id, J)\} \right) \Big/ (eb - sb) \right| \tag{22}$$

That is to say, for each sub-band at the high frequency side wherein the index is sb+1 through eb, the difference is found between the pseudo high frequency sub-band power, $power_{est}(ib,id_{selected}(J-1),J-1)$ of the frame (J−1) and the pseudo high frequency sub-band power, $power_{est}(ib,id,J)$ of the frame J. The absolute value of the value obtained by dividing the sum of differences in the various sub-bands by the number of sub-bands at the high frequency side (eb-sb) becomes the estimated residual mean value $ResP_{ave}(id,J)$. The estimated residual mean value $ResP_{ave}$ (id,J) herein represents the mean size of the difference in the estimated values of the sub-bands between frames of which the sign is taken into consideration.

Further, upon obtaining the estimated residual mean square value $ResP_{std}(id,J)$, estimated residual maximum value $ResP_{max}(id,J)$, and estimated residual mean value $ResP_{ave}(id,J)$, the pseudo high frequency sub-band power difference calculating circuit 36 calculates the following Expression (23), and calculates the evaluation value ResP (id,J).

[Expression 23]

$$ResP(id,J) = ResP_{std}(id,J) + W_{max} \times ResP_{max}(id,J) + W_{ave} \times ResP_{ave}(id,J) \tag{23}$$

That is to say, the estimated residual mean square value $ResP_{std}(id,J)$, estimated residual maximum value $ResP_{max}$ (id,J), and estimated residual mean value $ResP_{ave}(id,J)$ are added with weighting, and become the evaluation value ResP(id,J). Note that in Expression (23), the $W_{max}$ and $W_{ave}$ are preset weightings, and for example may be $W_{max}=0.5$, $W_{ave}=0.5$ or the like.

Thus, upon the evaluation value ResP(id,J) which uses a past frame and current frame having been calculated, the processing is advanced from step S337 to step S338.

In step S338, the pseudo high frequency sub-band power difference calculating circuit 36 calculates the following Expression (24), and calculates a final evaluation value $Res_{all}(id,J)$.

[Expression 24]

$$Res_{all}(id,J) = Res(id,J) + W_p(J) \times ResP(id,J) \tag{24}$$

That is to say, the found evaluation value Res(id,J) and evaluation value ResP(id,J) are added with weighting. Note that in Expression (24), $W_p(J)$ is a weight that is defined by the following Expression (25), for example.

[Expression 25]

$$W_p(J) = \begin{cases} \dfrac{-power_r(J)}{50} + 1 & (0 \le power_r(J) \le 50) \\ 0 & \text{(otherwise)} \end{cases} \tag{25}$$

Also, the $power_r(J)$ in Expression (25) is a value defined by the following Expression (26).

[Expression 26]

$$power_r(J) = \sqrt{\left( \sum_{ib=sb+1}^{eb} \{\text{power}(ib, J) - \text{power}(ib, J-1)\}^2 \right) \Big/ (eb - sb)} \tag{26}$$

The $power_r(J)$ herein represents the average of the differences in the high frequency sub-band power of the frame (J−1) and frame J. Also, from Expression (25), when $W_p(J)$ is a value in a predetermined range where $power_r(J)$ is near 0, $W_p(J)$ becomes a value closer to 1 as $power_r(J)$ becomes smaller, and becomes 0 when $power_r(J)$ is a value greater than the predetermined range.

Now, in the case that the $power_r(J)$ is a value within the predetermined range near 0, the average of difference of the high frequency sub-band power between consecutive frames becomes small by a certain amount. In other words, temporal variation of the high frequency components of the input signal is small, whereby the current frame of the input signal is a constant region.

The more steady the high frequency components of the input signal are, the closer that the weighting $W_p(J)$ is a value that becomes closer to 1, and conversely, the more the high frequency components are not steady, the closer the value becomes to 0. Accordingly, with the evaluation value $Res_{all}(id,J)$ shown in Expression (24), the less temporal variation in the input signal high frequency components, the greater the contributing ratio of the evaluation value ResP (id,J), wherein the comparison result from the estimation results of the high frequency components with the immediately preceding frame serve as the evaluation scale, becomes.

Consequently, with the constant region of the input signal, a decoded high frequency sub-band power estimating coefficient, which can obtain estimation results near the high frequency components in the immediately preceding frame, is selected, and audio can be played more naturally with high sound quality at the decoding device 40 side. Conversely, with a non-constant region of the input signal, the item for evaluation value ResP(id,J) in the evaluation value $Res_{all}$ (id,J) becomes 0, and a decoded high frequency signal that is closer to the actual high frequency signal is obtained.

The pseudo high frequency sub-band power difference calculating circuit 36 performs the processing above, and calculates an evaluation value $Res_{all}(id,J)$ for each of K decoded high frequency sub-band power estimating coefficients.

In step S339, the pseudo high frequency sub-band power difference calculating circuit 36 selects a coefficient index id, based on the evaluation value $Res_{all}(id,J)$ for each decoded high frequency sub-band power estimating coefficients that is found.

The evaluation value $Res_{all}(id,J)$ obtained with the processing above linearly combines the evaluation value Res (id,J) and the evaluation value ResP(id,J), using weighting. As described above, the smaller the value of the evaluation value Res(id,J) is, a decoded high frequency signal can be obtained that is closer to the actual high frequency signal. Also, the smaller the value of the evaluation value ResP(id, J) is, a decoded high frequency signal can be obtained that is closer to the decoded high frequency signal of the immediately preceding frame.

Accordingly, the smaller the evaluation value $Res_{all}(id,J)$ is, the more proper decoded high frequency signal can be obtained. Thus, of the K evaluation values $Res_{all}(id,J)$, the pseudo high frequency sub-band power difference calculating circuit 36 selects an evaluation value having the smallest value, and supplies the coefficient index indicating the decoded high frequency sub-band power estimating coefficient corresponding to the evaluation value thereof, to the high frequency encoding circuit 37.

Upon the coefficient index having been selected, subsequently the processing in step S340 and step S341 is performed and the encoding processing is ended, but the processing herein is similar to step S308 and step S309 in FIG. 24, so description thereof will be omitted.

As shown above, with the encoding device 30, the evaluation value $Res_{all}$(id,J) that is obtained by linearly combining the evaluation value Res(id,J) and the evaluation value ResP(id,J) is used, and an optimal coefficient index of the decoded high frequency sub-band power estimating coefficient is selected.

By using the evaluation value $Res_{all}$(id,J), similar to the case of using the evaluation value Res(id,J), a more proper decoded high frequency sub-band power estimating coefficient can be selected by more evaluation scales. Additionally, by using the evaluation value $Res_{all}$(id,J), temporal variations in the constant region of the high frequency components of the signal to be played can be suppressed at the decoding device 40 side, and a signal with greater sound quality can be obtained.

<Modification 2>

Now, with the frequency band extending processing, if a higher sound quality for audio is to be obtained, the more the sub-bands at the low frequency side become important from the listening perspective. That is to say, of the various sub-bands on the high frequency side, the higher the estimating precision of the sub-band nearer the low frequency side is, the greater is the audio quality that can be played.

Now, in the case that an evaluation value is calculated for each decoded high frequency sub-band power estimating coefficient, the sub-bands on the far low frequency side may be weighted. In such a case, the encoding device 30 in FIG. 18 performs encoding processing shown in the flowchart in FIG. 26.

Figure 26:
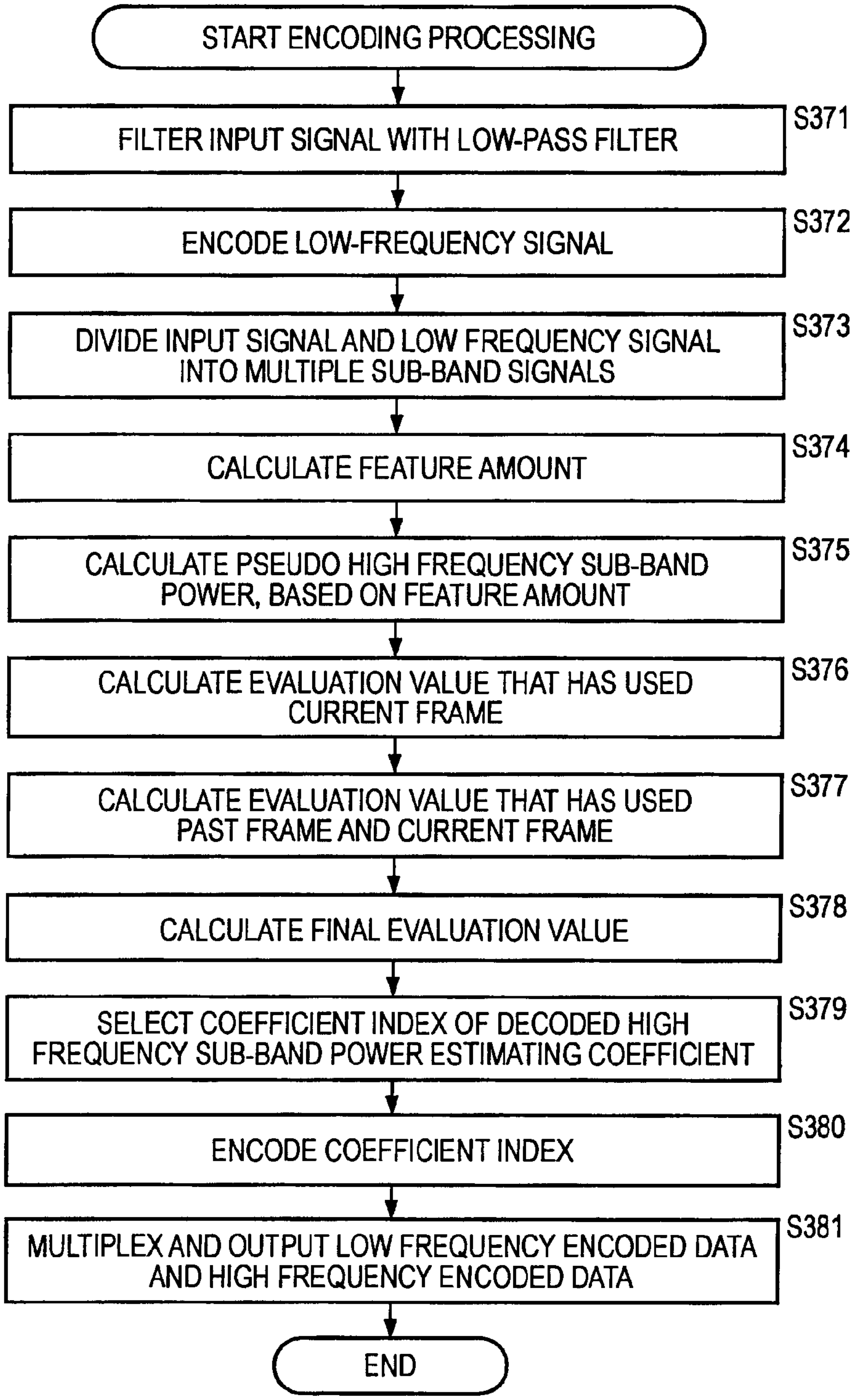
FIG. 26 is a flowchart describing encoding processing.

Encoding processing by the encoding device 30 will be described below with reference to the flowchart in FIG. 26. Note that the processing in step S371 through step S375 is similar to the processing in step S331 through step S335 in FIG. 25, so description thereof will be omitted.

In step S376, the pseudo high frequency sub-band power difference calculating circuit 36 calculates an evaluation value $ResW_{band}$(id,J) using a current frame J to be processing, for each of K decoded high frequency sub-band power estimating coefficients.

Specifically, the pseudo high frequency sub-band power difference calculating circuit 36 uses the high frequency sub-band signal of the various sub-band supplied from the sub-band dividing circuit 33 to perform computation similar to that in the above-described Expression (1), and calculates the high frequency sub-band power, power(ib,J) in the frame J.

Upon the high frequency sub-band power, power(ib,J) having been obtained, the pseudo high frequency sub-band power difference calculating circuit 36 calculates the following Expression (27), and calculates a residual mean value $Res_{std}W_{band}$ (id,J).

[Expression 27]

$$Res_{std}W_{band}(id, J) = \sum_{ib=sb+1}^{eb} \{W_{band}(ib) \times \{\text{power}(ib, J) - power_{est}(ib, id, J)\}\}^2 \quad (27)$$

That is to say, for each high frequency side sub-band wherein the index is sb+1 through eb, the difference between the high frequency sub-band power, power(ib,J) of the frame J and the pseudo high frequency sub-band power, $power_{est}$ (ib,id,J) is found, and weighting $W_{band}$(ib) for each sub-band is multiplied by the difference thereof. The square sum of the difference which is multiplied by the weighting $W_{band}$(ib) becomes the residual mean square value $Res_{std}W_{band}$ (id,J).

Now, the weighting $W_{band}$(ib) (wherein sb+1 ib eb) is defined by the following Expression (28), for example. The closer to the low frequency side the sub-band is, the greater the value of the weighting $W_{band}$(ib) becomes.

[Expression 28]

$$W_{band}(ib) = \frac{-3 \times ib}{7} + 4 \quad (28)$$

Next, the pseudo high frequency sub-band power difference calculating circuit 36 calculates the residual maximum value $Res_{max}W_{band}$(id,J). Specifically, the maximum value of the absolute value of those which have had the weighting $W_{band}$(ib) multiplied by the difference of the high frequency sub-band power, power(ib,J), of the various sub-band wherein the index is sb+1 through eb and the pseudo high frequency sub-band power, $power_{est}$(ib,id,J), becomes the residual maximum value $Res_{max}W_{band}$(id,J).

Also, the pseudo high frequency sub-band power difference calculating circuit 36 calculates the residual mean value $Res_{ave}W_{band}$ (id,J).

Specifically, for each sub-band wherein the index is sb+1 through eb, the differences between the high frequency sub-band power, power(ib,J) and pseudo high frequency sub-band power, $power_{est}$(ib,id,J) are found and multiplied by the weighting $W_{band}$(ib), and the sum total of differences multiplied by the weighting $W_{band}$(ib) is found. The absolute value of the value obtained by dividing the sum total of differences obtained by the number of sub-bands (eb-sb) at the high frequency side is the residual mean value $Res_{ave}W_{band}$ (id,J).

Further, the pseudo high frequency sub-band power difference calculating circuit 36 calculates the evaluation value $ResW_{band}$ (id,J). That is to say, the sum of the residual mean square value $Res_{std}W_{band}$(id,J) residual maximum value $Res_{max}W_{band}$(id,J) which has been multiplied by the weighting $W_{max}$, and the residual mean value $Res_{ave}W_{band}$ (id,J) which has been multiplied by the weighting $W_{ave}$, is the evaluation value $ResW_{band}$(id,J).

In step S377, the pseudo high frequency sub-band power difference calculating circuit 36 calculates the evaluation value $ResPW_{band}$ (id,J) that uses a past frame and current frame.

Specifically, the pseudo high frequency sub-band power difference calculating circuit 36 records the pseudo high frequency sub-band power for each sub band, obtained using the decoded high frequency sub-band power estimating coefficient of the coefficient index finally selected, for a frame (J−1) which is temporally one frame preceding the frame J to be processed.

The pseudo high frequency sub-band power difference calculating circuit 36 first calculates an estimated residual mean square value $ResP_{std}W_{band}(id,J)$. That is to say, for each sub-band at the high frequency side wherein the index is sb+1 through eb, the differences between the pseudo high frequency sub-band power, $power_{est}(ib,id_{selected}(J-1),J-1)$, and pseudo high frequency sub-band power, $power_{est}(ib,id,J)$, are found and multiplied by the weighting $W_{band}(ib)$. The square sum of the differences multiplied by the weighting $W_{band}$ (ib) is the estimated residual mean square value $ResP_{std}W_{band}(id,J)$.

Next, the pseudo high frequency sub-band power difference calculating circuit 36 calculates an estimated residual maximum value $ResP_{max}W_{band}(id,J)$ Specifically, that which is the maximum value of the absolute values obtained by multiplying the weighting $W_{band}(ib)$ by the differences between the pseudo high frequency sub-band power, $power_{est}(ib,id_{selected}(J-1),J-1)$ for each sub-band wherein the index is sb+1 through eb, and the pseudo high frequency sub-band power, $power_{est}(ib,id,J)$, is taken as the estimated residual maximum value $ResP_{max}W_{band}(id,J)$.

Next, the pseudo high frequency sub-band power difference calculating circuit 36 calculates an estimated residual mean value $ResP_{ave}W_{band}$ (id,J). Specifically, the differences between the pseudo high frequency sub-band power, $power_{est}(ib,id_{selected}(J-1),J-1)$ for each sub-band wherein the index is sb+1 through eb, and the pseudo high frequency sub-band power, $power_{est}(ib,id,J)$, are found, and multiplied by the weighting $W_{band}$ (ib). The absolute value of the value obtained by dividing the sum total of differences that are multiplied by the weighting $W_{band}(ib)$ by the number of sub-bands (eb-sb) at the high frequency side is the estimated residual mean value $ResP_{ave}W_{band}(id,J)$.

Further, the pseudo high frequency sub-band power difference calculating circuit 36 finds the sum of the estimated residual mean square value $ResP_{std}W_{band}(id,J)$, estimated residual maximum value $ResP_{max}W_{band}(id,J)$ that has been multiplied by the weighting $W_{max}$, and estimated residual mean value $ResP_{ave}W_{band}(id,J)$ that has been multiplied by the weighting $W_{ave}$ is taken as the evaluation value $ResPW_{band}$ (id,J).

In step S378, the pseudo high frequency sub-band power difference calculating circuit 36 adds the evaluation value $ResW_{band}$ (id,J) and the evaluation value $ResPW_{band}$ (id,J) that has been multiplied by the weighting $W_p(J)$ in Expression (25), and calculates a final evaluation value $Res_{all}W_{band}$ (id,J). The evaluation value $Res_{all}W_{band}(id,J)$ herein is calculated for each of K decoded high frequency sub-band power estimating coefficients.

Subsequently, the processing in step S379 through step S381 is performed and the encoding processing is ended, but the processing herein is similar to the processing in step S339 through step S341 in FIG. 25, so description thereof will be omitted. Note that in step S379, of the K coefficient indices, that which has the smallest evaluation value $Res_{all}W_{band}(id,J)$ is selected.

Thus, each sub-band is weighted so that the weighting will be placed farther towards a sub-band at the low band side, whereby audio with higher sound quality can be obtained at the decoding device 40 side.

Note that with the above description, selection of the decoded high frequency sub-band power estimating coefficient is performed based on the evaluation value $Res_{all}W_{band}$ (id,J) but the decoded high frequency sub-band power estimating coefficient may be selected based on the evaluation value $ResW_{band}$ (id,J).

<Modification 3>

Further, human hearing has a nature to better sense a frequency band when the amplitude (power) of the frequency band is large, so the evaluation value may be calculated for each decoded high frequency sub-band power estimating coefficient such that the weighting is placed on a sub-band having greater power.

Figure 27:
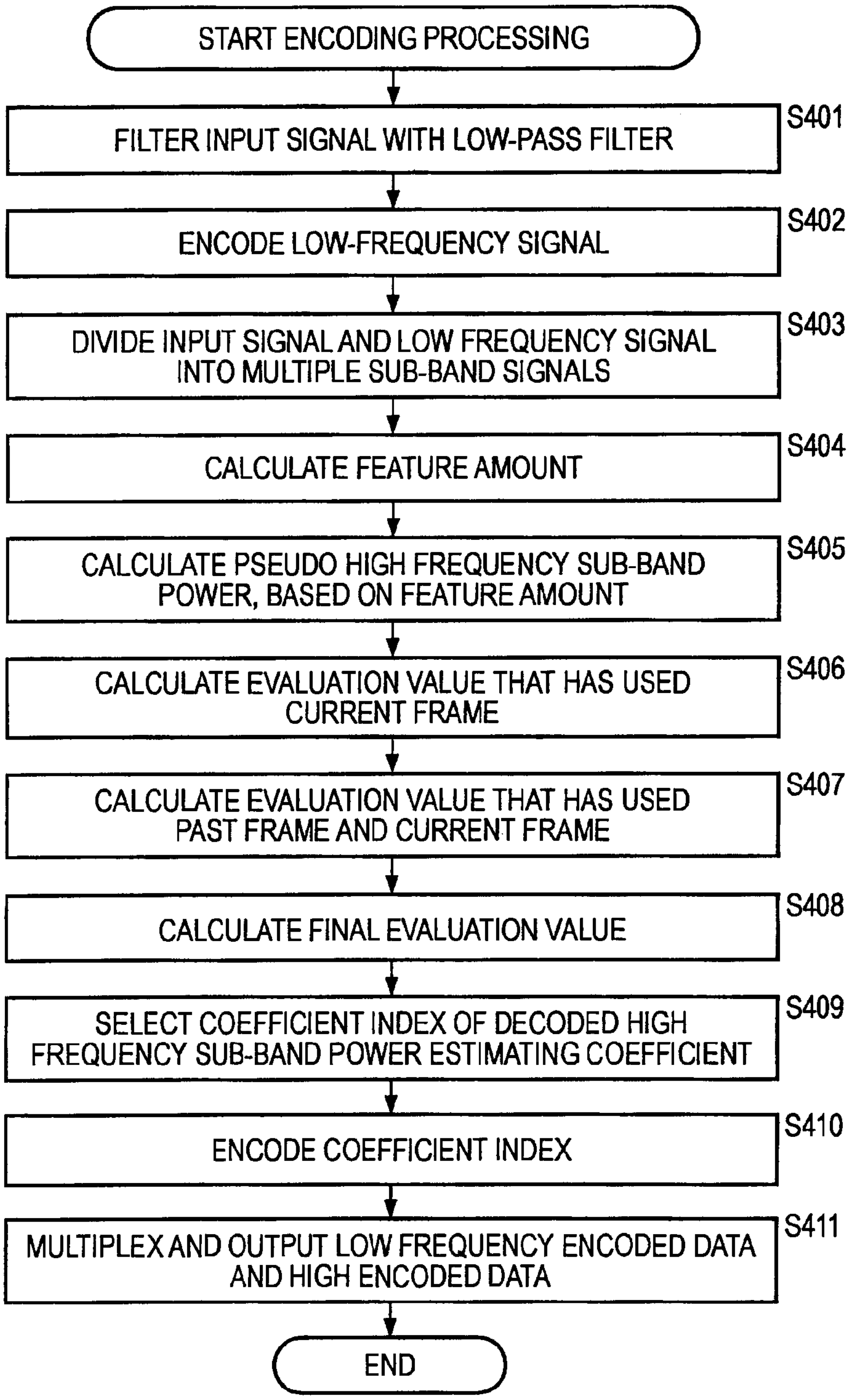
FIG. 27 is a flowchart describing encoding processing.

In such a case, the encoding device 30 in FIG. 18 performs the encoding processing shown in the flowchart in FIG. 27. The encoding processing with the encoding device 30 will be described below with reference to the flowchart in FIG. 27. Note that the processing in step S401 through step S405 is similar to the processing in step S331 through step S335 in FIG. 25, so description thereof will be omitted.

In step S406, the pseudo high frequency sub-band power difference calculating circuit 36 calculates an evaluation value $ResW_{power}$ (id,J) which uses the current frame J that is subject to processing, for each of K decoded high frequency sub-band power estimating coefficients.

Specifically, the pseudo high frequency sub-band power difference calculating circuit 36 uses a high frequency sub-band signal for each sub-band supplied from the sub-band dividing circuit 33 to perform computation similar to the above-described Expression (1), and calculates the high frequency sub-band power, power(ib,J), in frame J.

Upon the high frequency sub-band power, power(ib,J), having been obtained, the pseudo high frequency sub-band power difference calculating circuit 36 calculates the following Expression (29), and calculates a residual mean square value $Res_{std}W_{power}$ (id,J).

[Expression 29]

$$Res_{std}W_{power}(id,J) = \sum_{ib=sb+1}^{eb} \{W_{power}(\mathrm{power}(ib,J)) \times \{\mathrm{power}(ib,J) - power_{est}(ib,id,J)\}\}^2 \tag{29}$$

That is to say, the differences between the high frequency sub-band power, power(ib,J), and the pseudo high frequency sub-band power, $power_{est}(ib,id,J)$, for each sub-band at the high frequency side wherein the index is sb+1 through eb, are found, and a weighting $W_{power}(power(ib,J))$ for each sub-band is multiplied by these differences. The square sum of the differences multiplied by weighting $W_{power}(power(ib,J))$ is the residual mean square value $Res_{std}W_{power}(id,J)$.

Now, the weighting $W_{power}(power(ib,J))$ (where sb+1 ib eb) is defined by the following expression (30), for example. The value of the weighting $W_{power}(power(ib,J))$ increases as the high frequency sub-band power, power(ib,J) of the sub-band thereof increases.

[Expression 30]

$$W_{power}(\mathrm{power}(ib,J)) = \frac{3 \times \mathrm{power}(ib,J)}{80} + \frac{35}{8} \tag{30}$$

Next, the pseudo high frequency sub-band power difference calculating circuit 36 calculates a residual maximum value $Res_{max}W_{power}$ (id,J) Specifically, that which is the maximum value of the absolute values obtained by multiplying weighting $W_{power}$(power(ib,J)) by the differences between the high frequency sub-band power, power(ib,J) for each sub-band wherein the index is sb+1 through eb, and the pseudo high frequency sub-band power, $power_{est}$(ib,id,J), is the residual maximum value $Res_{max}W_{power}$(id,J).

Also, the pseudo high frequency sub-band power difference calculating circuit 36 calculates a residual mean value $Res_{ave}W_{power}$(id,J).

Specifically, the differences between the high frequency sub-band power, power(ib,J) for each sub-band wherein the index is sb+1 through eb, and the pseudo high frequency sub-band power, $power_{est}$(ib,id,J), are found, and multiplied by the weighting $W_{power}$(power(ib,J)), and the sum total of the differences multiplied by the weighting $W_{power}$(power (ib,J)) is found. The absolute value of the value obtained by dividing the obtained sum total of differences by the number of sub-bands (eb-sb) at the high frequency side is the residual mean value $Res_{ave}W_{power}$(id,J).

Further, the pseudo high frequency sub-band power difference calculating circuit 36 calculates the evaluation value $ResW_{power}$(id,J). That is to say, the sum of the residual mean square value $Res_{std}W_{power}$(id,J), residual maximum value $Res_{max}W_{power}$(id,J) which has been multiplied by the weighting $W_{max}$, and the residual mean value $Res_{ave}W_{power}$ (id,J) which has been multiplied by the weighting $W_{ave}$, is the evaluation value $ResW_{power}$(id,J).

In step S407, the pseudo high frequency sub-band power difference calculating circuit 36 calculates an evaluation value $ResPW_{power}$ (id,J) that uses a past frame and current frame.

Specifically, the pseudo high frequency sub-band power difference calculating circuit 36 records pseudo high frequency sub-band power for each sub-band, obtained using the decoded high frequency sub-band power estimating coefficient of the coefficient index finally selected, for the frame (J−1) that is temporally one frame prior to the frame J to be processed.

The pseudo high frequency sub-band power difference calculating circuit 36 first calculates an estimated residual mean square value $ResP_{std}W_{power}$(id,J). That is to say, for each sub-band at the high frequency side wherein the index is sb+1 through eb, the differences between the pseudo high frequency sub-band power, $power_{est}$(ib,$id_{selected}$(J−1),J−1), and pseudo high frequency sub-band power, $power_{est}$(ib,id, J), are found and multiplied by the weighting $W_{power}$(power (ib,J)). The square sum of the differences multiplied by the weighting $W_{power}$(power(ib,J)) is the estimated residual mean square value $ResP_{std}W_{power}$ (id,J).

Next, the pseudo high frequency sub-band power difference calculating circuit 36 calculates an estimated residual maximum value $ResP_{max}W_{power}$(id,J). Specifically, that which is the absolute value of the maximum value of the differences between the pseudo high frequency sub-band power, $power_{est}$(ib,$id_{selected}$(J−1),J−1) for each sub-band wherein the index is sb+1 through eb, and the pseudo high frequency sub-band power, $power_{est}$(ib,id,J), multiplied by the weighting $W_{power}$(power(ib,J)), is the estimated residual maximum value $ResP_{max}W_{power}$ (id,J).

Next, the pseudo high frequency sub-band power difference calculating circuit 36 calculates an estimated residual mean value $ResP_{ave}W_{power}$ (id,J). Specifically, the differences between the pseudo high frequency sub-band power, $power_{est}$(ib,$id_{selected}$(J−1),J−1) for each sub-band wherein the index is sb+1 through eb, and the pseudo high frequency sub-band power, $power_{est}$(ib,id,J), are found, and multiplied by the weighting $W_{power}$(power(ib,J)). The absolute value of the value obtained by dividing the sum total of differences that are multiplied by the weighting $W_{power}$ (power(ib,J)) by the number of sub-bands (eb-sb) at the high frequency side is the estimated residual mean value $ResP_{ave}W_{power}$ (id,J).

Further, the pseudo high frequency sub-band power difference calculating circuit 36 finds the sum of the estimated residual mean square value $ResP_{std}W_{power}$(id,J), estimated residual maximum value $ResP_{max}W_{power}$ (id,J) that has been multiplied by the weighting $W_{max}$, and estimated residual mean value $ResP_{ave}W_{power}$ (id,J) that has been multiplied by the weighting $W_{ave}$, and takes this as evaluation value $ResW_{power}$ (id,J).

In step S408, the pseudo high frequency sub-band power difference calculating circuit 36 adds the evaluation value $ResW_{power}$(id,J) and the evaluation value $ResPW_{power}$(id,J) that has been multiplied by the weighting $W_p$(J) in Expression (25), and calculates a final evaluation value $Res_{all}W_{power}$ (id,J). The evaluation value $Res_{all}W_{power}$(id,J) herein is calculated for each of K decoded high frequency sub-band power estimating coefficients.

Subsequently, the processing in step S409 through step S411 is performed and the encoding processing is ended, but the processing herein is similar to the processing in step S339 through step S341 in FIG. 25, so description thereof will be omitted. Note that in step S409, of the K coefficient indices, that which has the smallest evaluation value $Res_{all}W_{power}$ (id,J) is selected.

Thus, so that the weighting will be placed farther on a sub-band having greater power, each sub-band is weighted, whereby audio with higher sound quality can be obtained at the decoding device 40 side.

Note that with the above description, selection of the decoded high frequency sub-band power estimating coefficient is performed based on the evaluation value $Res_{all}W_{power}$(id,J), but the decoded high frequency sub-band power estimating coefficient may be selected based on the evaluation value $ResW_{power}$ (id,J).

<6. Sixth Embodiment>

[Configuration of Coefficient Learning Device]

Now, a set of coefficient $A_{ib}$(kb) and coefficient $B_{ib}$ serving as the decoded high frequency sub-band power estimating coefficients is correlated to the coefficient index and recorded in the decoding device 40 in FIG. 20. For example, upon the decoded high frequency sub-band power estimating coefficients of 128 coefficient indices having been recorded at the decoding device 40, a large region is needed as the recording region for memory that records these decoded high frequency sub-band power estimating coefficients and the like.

Figure 28:
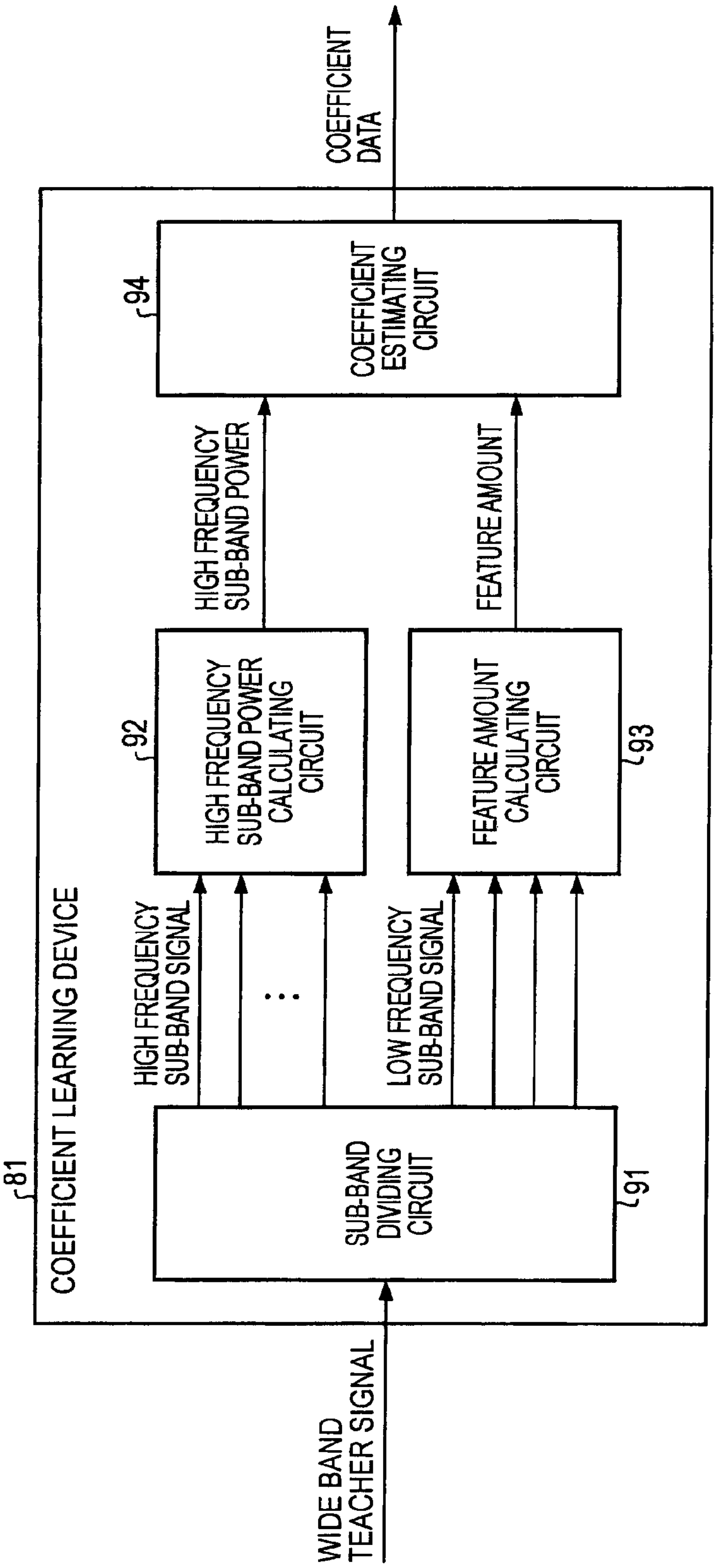
FIG. 28 is a diagram illustrating a configuration example of a coefficient learning device.

Thus, a portion of several decoded high frequency sub-band power estimating coefficients may be caused to be shared coefficients, and the recording region necessary for recording the decoded high frequency sub-band power estimating coefficients may be made smaller. In such a case, the coefficient learning device that finds decoded high frequency sub-band power estimating coefficients by learning is configured as shown in FIG. 28, for example.

The coefficient learning device 81 is made up of a sub-band dividing circuit 91, high frequency sub-band power calculating circuit 92, feature amount calculating circuit 93, and coefficient estimating circuit 94.

Multiple pieces of tune data or the like used for learning is supplied to the coefficient learning device 81 as wide band teacher signals. A wide band teacher signal is a signal that includes multiple high frequency sub-band components and multiple low frequency sub-band components.

The sub-band dividing circuit 91 is made up of a bandpass filter or the like, divides the supplied wide band teacher signal into multiple sub-band signals, and supplies these to the high frequency sub-band power calculating circuit 92 and feature amount calculating circuit 93. Specifically, the high frequency sub-band signal of each sub-band at the high frequency side wherein the index is sb+1 through eb is supplied to the high frequency sub-band power calculating circuit 92, and the low frequency sub-band signal of each sub-band at the low frequency side wherein the index is sb−3 through sb is supplied to the feature amount calculating circuit 93.

The high frequency sub-band power calculating circuit 92 calculates the high frequency sub-band power of the various high frequency sub-band signals supplied from the sub-band dividing circuit 91, and supplies this to the coefficient estimating circuit 94. The feature amount calculating circuit 93 calculates the low frequency sub-band power as a feature amount, based on the various low frequency sub-band signals supplied from the sub-band dividing circuit 91, and supplies this to the coefficient estimating circuit 94.

The coefficient estimating circuit 94 generates a decoded high frequency sub-band power estimating coefficient by using the high frequency sub-band power from the high frequency sub-band power calculating circuit 92 and the feature amount from the feature amount calculating circuit 93 to perform regression analysis, and outputs this to the decoding device 40.

[Description of Coefficient Learning Processing]

Next, the coefficient learning processing performed by the coefficient learning device 81 will be described with reference to the flowchart in FIG. 29.

In step S431, the sub-band dividing circuit 91 divides each of the multiple supplied wide band teacher signals into multiple sub-band signals. The sub-band dividing circuit 91 supplies the high frequency sub-band signal of the sub-band wherein the index is sb+1 through eb to the high frequency sub-band power calculating circuit 92, and supplies the low frequency sub-band signal of the sub-band wherein the index is sb−3 through sb to the feature amount calculating circuit 93.

In step S432, the high frequency sub-band power calculating circuit 92 performs computation similar to the above-described Expression (1) and calculates the high frequency sub-band power for the various high frequency sub-band signals supplied from the sub-band dividing circuit 91, and supplies these to the coefficient estimating circuit 94.

In step S433, the feature amount calculating circuit 93 performs computation similar to the above-described Expression (1) and calculates the low frequency sub-band power as a feature amount for the various low frequency sub-band signals supplied from the sub-band dividing circuit 91, and supplies these to the coefficient estimating circuit 94.

Thus, high frequency sub-band power and low frequency sub-band power are supplied to the coefficient estimating circuit 94 for the various frames of the multiple wide band teacher signals.

In step S434, the coefficient estimating circuit 94 performs regression analysis using a least square method, and calculates the coefficient $A_{ib}(kb)$ and coefficient $B_{ib}$ for each high frequency side sub-band ib (where sb+1≤ib≤eb) wherein the index is sb+1 through eb.

Note that with regression analysis, the low frequency sub-band power supplied from the feature amount calculating circuit 93 is an explanatory variable, and the high frequency sub-band power supplied from the high frequency sub-band power calculating circuit 92 is an explained variable. Also, regression analysis is performed using low frequency sub-band power and high frequency sub-band power for all of the frames, which make up all of the wide band teacher signals supplied to the coefficient learning device 81.

In step S435, the coefficient estimating circuit 94 uses the coefficient $A_{ib}(kb)$ and coefficient $B_{ib}$ found for each sub-band ib to find the residual vector for each frame of the wide band teacher signal.

For example, the coefficient estimating circuit 94 subtracts the sum of the sum total of the low frequency sub-band power, power(kb,J), which has been multiplied by the coefficient $A_{ib}(kb)$ (where sb−3≤kb≤sb), and the coefficient $B_{ib}$, from the high frequency sub-band power, power(ib,J), for each sub-band ib (where sb+1 ib eb) of frame J, and obtains the residual. The vector made up of the residuals of each sub-band ib of the frame J is the residual vector.

Note that the residual vector is calculated for all of the frames which make up all of the wide band teacher signal supplied to the coefficient learning device 81.

In step S436, the coefficient estimating circuit 94 normalizes the residual vectors found of the various frames. For example, the coefficient estimating circuit 94 normalizes the residual vector by finding the dispersion value of the residual of the sub-band ib of the residual vectors for all frames, and divides the residual of the sub-band ib of the various residual vectors by the square root of the dispersion value for each sub-band.

In step S437, the coefficient estimating circuit 94 clusters the residual vectors for all of the normalized frames by k-means or the like.

For example, an average frequency envelope for all frames, obtained when estimation of the high frequency sub-band power is performed using the coefficient $A_{ib}(kb)$ and coefficient $B_{ib}$, is called an average frequency envelope SA. Also, we will say that a predetermined frequency envelope having greater power than the average frequency envelope SA is a frequency enveloped SH, and that a predetermined frequency envelope having lower power than the average frequency envelope SA is a frequency enveloped SL.

At this time, residual vector clustering is performed so that each of the residual vectors of the coefficients, for which a frequency envelope near the average frequency envelope SA, frequency envelope SH, and frequency envelope SL is obtained, belong to a cluster CA, cluster CH, and cluster CL, respectively. In other words, clustering is performed so that the residual vector for each frame belongs to one of the cluster CA, cluster CH, or cluster CL.

With the frequency band extending processing that estimates the high frequency components based on the correlation between the low frequency components and high frequency components, upon calculating the residual vector using the coefficient $A_{ib}(kb)$ and coefficient $B_{ib}$ obtained with the regression analysis, the farther the sub-band is towards the high frequency side, the greater the residual becomes, from the characteristics thereof. Therefore, if the residual vector is clustered without change, a greater weighting is placed on sub-bands farther on the high frequency side, and processing is performed.

Conversely, with the coefficient learning device 81, by normalizing the residual vector with the dispersion value of the residual value for each sub-band, the dispersion of the residuals of each sub-band at first glance are equal, and clustering is performed by weighting the various sub-bands equally.

In step S438, the coefficient estimating circuit 94 selects one of the clusters of the cluster CA, cluster CH, or cluster CL, as a cluster to be processed.

In step S439, the coefficient estimating circuit 94 uses the frame of the residual vector belonging to the cluster selected as the cluster to be processed, to calculate the coefficient $A_{ib}$(kb) and coefficient $B_{ib}$ of the various sub-bands ib (where sb+1≤ib≤eb), with regression analysis.

That is to say, if we say that the frame of the residual vector belonging to the cluster to be processed is called a frame to be processed, the low frequency sub-band power and high frequency sub-band power for all of the frames to be processed are then explanatory variables and explained variables, and regression analysis using a least square method is performed. Thus, a coefficient $A_{ib}$(kb) and coefficient $B_{ib}$ is obtained for each sub-band ib.

In step S440, the coefficient estimating circuit 94 uses the coefficient $A_{ib}$(kb) and coefficient $B_{ib}$ obtained with the processing in step S439 for all of the frames to be processed, and finds the residual vector. Note that in step S440, processing similar to that in step S435 is performed, and the residual vectors for the various frames to be processed is found.

In step S441, the coefficient estimating circuit 94 normalizes the residual vectors of the various frames to be processed that are obtained in the processing in step S440, by performing similar processing as that in step S436. That is to say, the residual is divided by the square root of the dispersion value and normalizing of residual vectors is performed by each sub-band.

In step S442, the coefficient estimating circuit 94 clusters the residual vectors for all of the frames to be processed that have been normalized, by k-means or the like. The number of clusters here is defined as follows. For example, at the coefficient learning device 81, in the case of generating 128 coefficient index decoded high frequency sub-band power estimating coefficients, the number of frames to be processed is multiplied by 128, and the number obtained by dividing this by the number of all frames is the number of clusters. Now, the number of all frames is the total number of all frames of all of the wide band teacher signals supplied to the coefficient learning device 81.

In step S443, the coefficient estimating circuit 94 finds a center-of-gravity vector for the various clusters obtained with the processing in step S442.

For example, a cluster obtained by clustering in step S442 corresponds to the coefficient index, and at the coefficient learning device 81, a coefficient index is assigned to each cluster, and the decoded high frequency sub-band power estimating coefficient of each coefficient index is found.

Specifically, let us say that in step S438 the cluster CA is selected as the cluster to be processed, and in step S442 F number of clusters are obtained by the clustering in step S442. Now, if we focus on one cluster CF out of F clusters, the number of decoded high frequency sub-band power estimating coefficients of the coefficient index of cluster CF is set as the coefficient $A_{ib}$(kb) which is a linear correlation item of coefficient $A_{ib}$(ib) found for the cluster CA in step S439. Also, the sum of the vector performing reverse processing of the normalization (reverse normalization) performed in step S441 as to the center-of-gravity vector of the cluster CF found in step S443 and the coefficient $B_{ib}$ found in step S439 is the coefficient $B_{ib}$ which is a constant item of the decoded high frequency sub-band power estimating coefficient. The reverse normalizing here is, in the case that the normalizing performed in step S441 divides the residual with the square root of the dispersion value for each sub-band, for example, processing that multiplies the same value as the time of normalizing (square root of dispersion value for each sub-band) the elements of the center-of-gravity vector of the cluster CF.

That is to say, the set of the coefficient $A_{ib}$(kb) obtained in step S439 and the coefficient $B_{ib}$ found as described above becomes the estimated coefficient of the decoded high frequency sub-band power of the coefficient index of the cluster CF. Accordingly, each of the F number of clusters obtained by clustering have a shared coefficient $A_{ib}$(kb) found for the cluster CA, as a linear correlation item of the decoded high frequency sub-band power estimating coefficient.

In step S444, the coefficient learning device 81 determines whether or not all of the clusters of cluster CA, cluster CH, and cluster CL have been processed as clusters to be processed. In step S444, in the case determination is made that not yet all clusters have been processed, the processing returns to step S438, and the above-described processing is repeated. That is to say, the next cluster is selected as that to be processed, and a decoded high frequency sub-band power estimating coefficient is calculated.

Conversely, in step S444, in the case determination is made that all clusters have been processed, a predetermined number of decoded high frequency sub-band power estimating coefficients to be found are obtained, whereby the processing is advanced to step S445.

In step S445, the coefficient estimating circuit 94 outputs the found coefficient index and decoded high frequency sub-band power estimating coefficient to the decoding device 40 and causes this to be recorded, and the coefficient learning processing is ended.

For example, of the decoded high frequency sub-band power estimating coefficients output to the decoding device 40, several have the same coefficient $A_{ib}$(kb) as the linear correlation item. Thus, as to the coefficient $A_{ib}$(kb) which these share, the coefficient learning device 81 corresponds a linear correlation item index (pointer) which is information identifying the coefficient $A_{ib}$(kb) thereof, and as to the coefficient index, corresponds the linear correlation item index and coefficient $B_{ib}$ which is a constant item.

The coefficient learning device 81 supplies the corresponding linear correlation item index (pointer) and coefficient $A_{ib}$(kb) and the corresponding coefficient index and linear correlation item index (pointer) and coefficient $B_{ib}$ to the decoding device 40, and records this in the memory within the high frequency decoding circuit 45 of the decoding device 40. Thus, in recording multiple decoded high frequency sub-band power estimating coefficients, regarding shared linear correlation items, if a linear correlation item index (pointer) is stored in the recording region for the various decoded high frequency sub-band power estimating coefficients, the recording region can be kept considerably smaller.

In this case, the linear correlation item index and coefficient $A_{ib}$(kb) are correlated and recorded in the memory within the high frequency decoding circuit 45, whereby the linear correlation item index and coefficient $B_{ib}$ can be obtained from the coefficient index, and further the coefficient $A_{ib}$(kb) can be obtained from the linear correlation item index.

Note that as a result of analysis by the present applicant, we can see that even if three patterns or so of the linear correlation items of the multiple decoded high frequency sub-band power estimating coefficients are shared, there is very little sound quality deterioration from a listening perspective of audio subjected to frequency band extending processing. Accordingly, according to the coefficient learning device 81, sound quality of the vocals after the frequency band extending processing is not deteriorated, and a recording region necessary for recording the decoded high frequency sub-band power estimating coefficient can be smaller.

As shown above, the coefficient learning device 81 generates and outputs the decoded high frequency sub-band power estimating coefficient of each coefficient index from the supplied wide band teacher signal.

Figure 29:
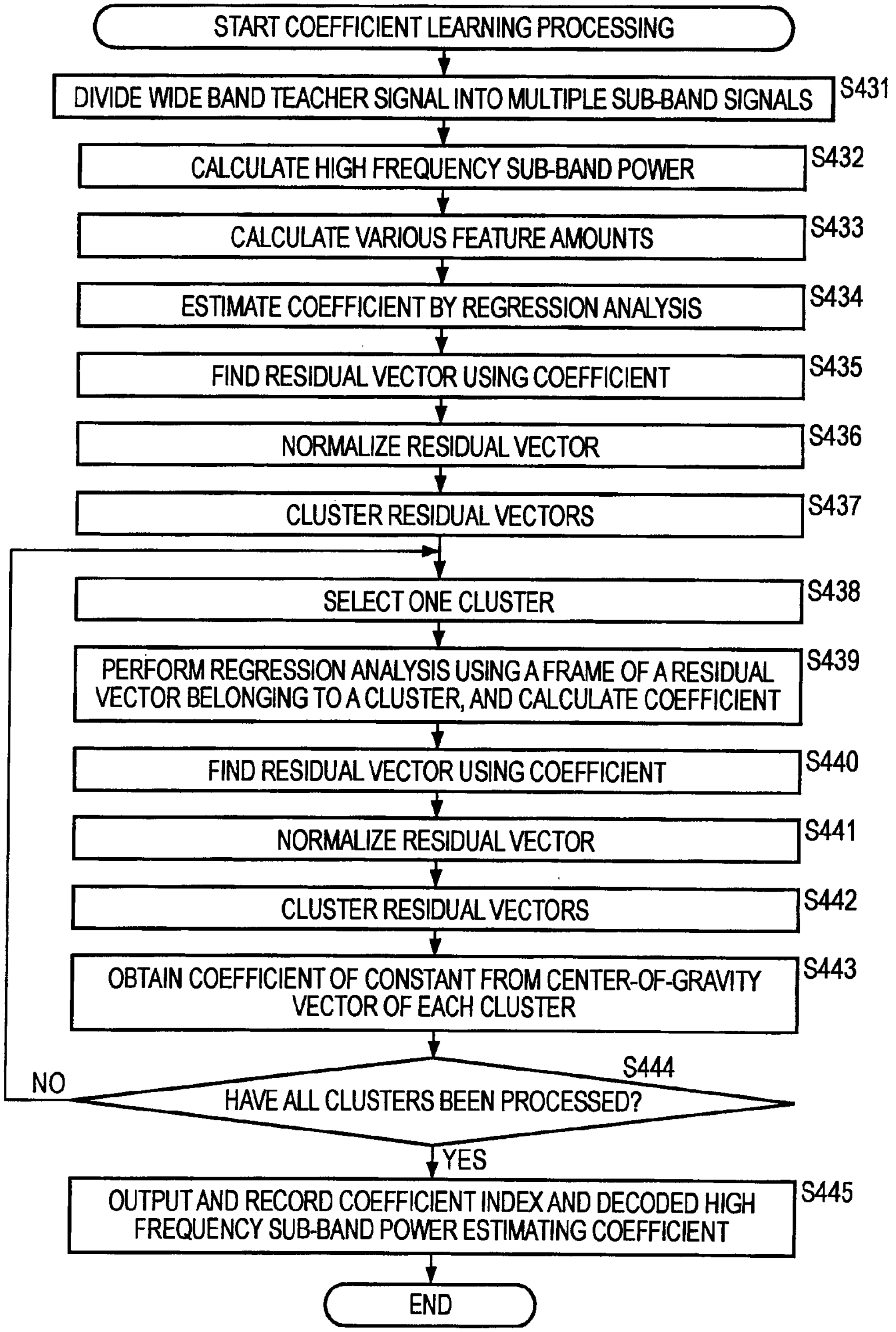
FIG. 29 is a flowchart describing coefficient learning processing.

Note that the coefficient learning processing in FIG. 29 is described as normalizing a residual vector, but in one or both of step S436 or step S441, normalizing the residual vector do not have to be performed.

Also, an arrangement may be made wherein normalizing the residual vector is performed, and sharing of the linear correlation items of the decoded high frequency sub-band power estimating coefficient is not performed. In such a case, after the normalizing processing in step S436, the normalized residual vector is clustered into the same number of clusters as the number of decoded high frequency sub-band power estimating coefficients to be found. Frames of the residual vectors belonging to the various clusters are used, regression analysis is performed for each cluster, and decoded high frequency sub-band power estimating coefficients are generated for the various clusters.

The series of processing described above can be executed with hardware or can be executed with software. In the case of executing the series of processing with software, a program making up the software thereof is installed from a program recording medium into a computer that has built-in dedicated hardware or a general-use personal computer or the like, for example, that can execute various types of functions by various types of programs being installed.

Figure 30:
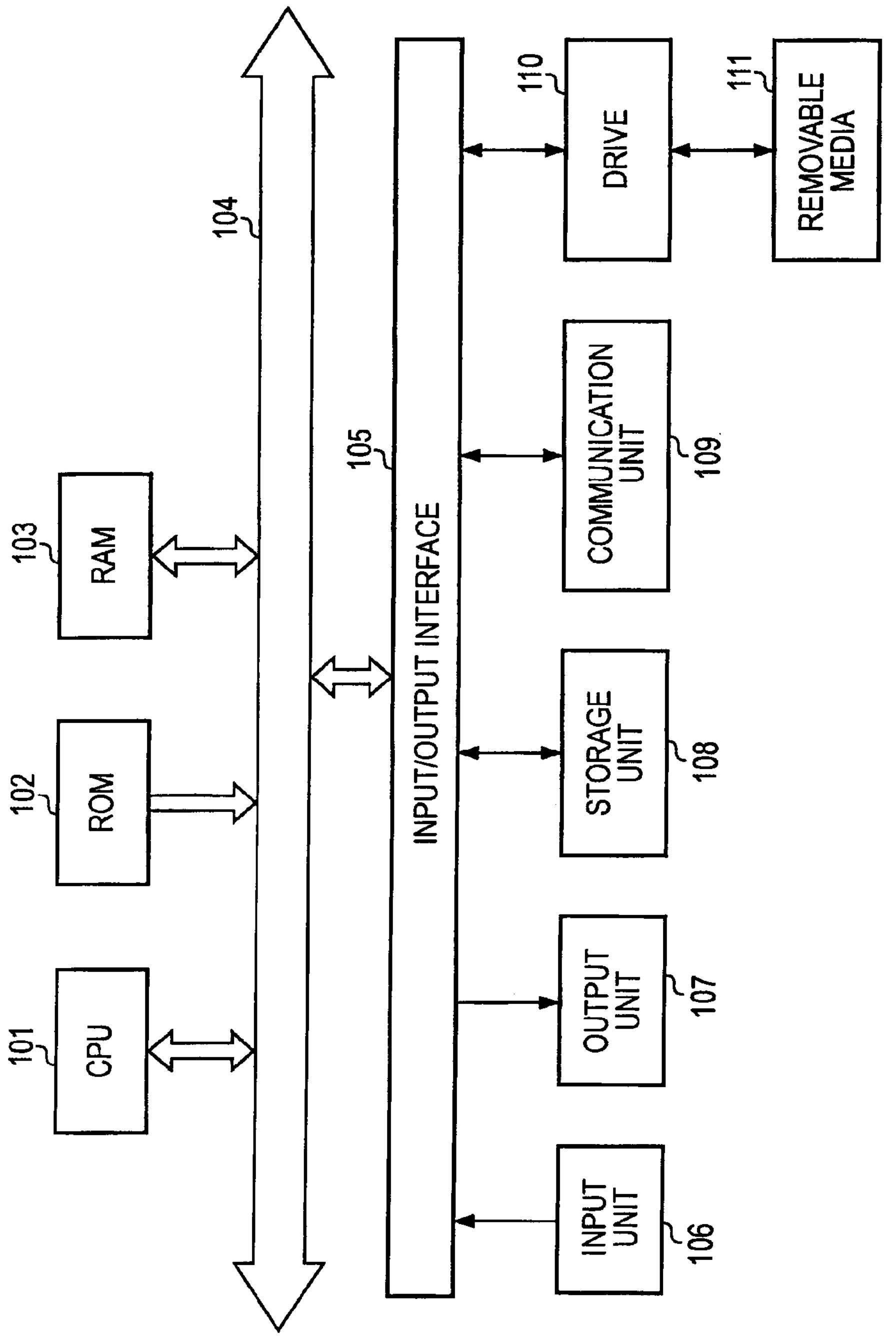
FIG. 30 is a block diagram illustrating a configuration example of computer hardware that executes processing to which the present invention has been applied, by a program.

FIG. 30 is a block diagram showing a configuration example of hardware of the computer that executes the above-described series of processing with a program.

In the computer, a CPU 101, ROM (Read Only Memory) 102, and RAM (Random Access Memory) 103 are mutually connected by a bus 104.

An input/output interface 105 is further connected to the bus 104. An input unit 106 made up of a keyboard, mouse, microphone or the like, an output unit 107 made up of a display, speaker or the like, a storage unit 108 made up of a hard disk or non-volatile memory or the like, a communication unit 109 made up of a network interface or the like, and a drive 110 for driving a removable media 111 such as magnetic disc, optical disc, magneto-optical disc, or semiconductor memory or the like, are connected to the input/output interface 105.

With a computer configured as described above, for example, the CPU 101 loads the program stored in the storage unit 108 to the RAM 103, via the input/output interface 105 and bus 104, and executes this, whereby the series of the above-described processing is performed.

The program that the computer (CPU 101) executes is recorded in removable media 111 which is package media made up of a magnetic disc (including flexible disc), optical disc (CD-ROM (Compact Disc-Read Only Memory), DVD (Digital Versatile Disc) or the like), magneto-optical disc, or semiconductor memory or the like, for example, or is provided via a cable or wireless transmission medium such as a local area network, the Internet, or digital satellite broadcast.

The program is installed in the storage unit 108 via the input/output interface 105, by mounting the removable media 111 on the drive 110. Also, the program can be received with the communication unit 109 via a cable or wireless transmission medium, and installed in the storage unit 108. Additionally, the program can be installed beforehand in the ROM 102 or storage unit 108.

Note that the program that the computer executes may be a program that performs processing in a time-series manner in the order described in the present Specification, or may be a program wherein processing is performed in parallel, or at necessary timing such as when called up, or the like.

Note that the embodiments of the present invention are not restricted to the above-described embodiments, and various modifications may be made within the essence of the present invention.

REFERENCE SIGNS LIST

10 frequency band extending device
11 low-pass filter
12 delay circuit
13, 13-1 through 13-N bandpass filter
14 feature amount calculating circuit
15 high frequency sub-band power estimating circuit
16 high frequency signal generating circuit
17 high-pass filter
18 signal adding unit
20 coefficient learning device
21, 21-1 through 21-(K+N) bandpass filter
22 high frequency sub-band power calculating circuit
23 feature amount calculating circuit
24 coefficient estimating circuit
30 encoding device
31 low-pass filter
32 low frequency encoding circuit
33 sub-band dividing circuit
34 feature amount calculating circuit
35 pseudo high frequency sub-band power calculating circuit
36 pseudo high frequency sub-band power difference calculating circuit
37 high frequency encoding circuit
38 multiplexing circuit
40 decoding device
41 demultiplexing circuit
42 low frequency decoding circuit
43 sub-band dividing circuit
44 feature amount calculating circuit
45 high frequency decoding circuit
46 decoded high frequency sub-band power calculating circuit
47 decoded high frequency signal generating circuit
48 synthesizing circuit
50 coefficient learning device
51 low-pass filter
52 sub-band dividing circuit
53 feature amount calculating circuit
54 pseudo high frequency sub-band power calculating circuit
55 pseudo high frequency sub-band power difference calculating circuit
56 pseudo high frequency sub-band power difference clustering circuit
57 coefficient estimating circuit
101 CPU
102 ROM
103 RAM
104 BUS
105 INPUT/OUTPUT INTERFACE
106 INPUT UNIT

107 OUTPUT UNIT
108 STORAGE UNIT
109 COMMUNICATION UNIT
110 DRIVE
111 REMOVABLE MEDIA

The invention claimed is:

1. An encoding device comprising: sub-band dividing means configured to divide an input signal into a plurality of sub-bands, and to generate a low frequency sub-band signal made up of a plurality of sub-bands at a low frequency side and a high frequency sub-band signal made up of a plurality of sub-bands at a high frequency side; feature amount calculating means configured to calculate feature amount that expresses a feature of said input signal, using at least one of said low frequency sub-band signal generated by said sub-band dividing means, and said input signal; pseudo high frequency sub-band power calculating means configured to calculate a pseudo high frequency sub-band power that is a pseudo power of said high frequency sub-band signal based on said feature amount calculated by said feature amount calculating means; pseudo high frequency sub-band power difference calculating means configured to calculate a high frequency sub-band power that is the power of said high frequency sub-band signal from said high frequency sub-band signal generated by said sub-band dividing means, and to calculate pseudo high frequency sub-band power difference that is difference as to said pseudo high frequency sub-band power calculated by said pseudo high frequency sub-band power calculating means; high frequency encoding means configured to encode said pseudo high frequency sub-band power difference calculated by said pseudo high frequency sub-band power difference calculating means to generate high frequency encoded data; low frequency encoding means configured to encode a low frequency signal that is a low frequency signal of said input signal to generate low frequency encoded data; and multiplexing means configured to multiplex said low frequency encoded data generated by said low frequency encoding means, and said high frequency encoded data generated by said high frequency encoding means to obtain an output code string.

2. The encoding device according to claim 1, further comprising: low frequency decoding means configured to decode said low frequency encoded data generated by said low frequency encoding means to generate a low frequency signal; wherein said sub-band dividing means generate said low frequency sub-band signal from said low frequency signal generated by said low frequency decoding means.

3. The encoding device according to claim 1, wherein said high frequency encoding means calculate similarity between said pseudo high frequency sub-band power difference, and a representative vector or representative value in predetermined plurality of pseudo high frequency sub-band power difference space to generate an index corresponding to a representative vector or representative value of which the similarity is the maximum, as said high frequency encoded data.

4. The encoding device according to claim 1, wherein said pseudo high frequency sub-band power difference calculating means calculate an evaluated value based on said pseudo high frequency sub-band power of each sub-band, and said high frequency sub-band power for every plurality of coefficients for calculating said pseudo high frequency sub-band power; and wherein said high frequency encoding means generate an index indicating said coefficient of said evaluated value that is the highest evaluated value, as said high frequency encoded data.

5. The encoding device according to claim 4, wherein said pseudo high frequency sub-band power difference calculating means calculate said evaluated value based on at least any of sum of squares of said pseudo high frequency sub-band power difference of each sub-band, the maximum value of the absolute value of said pseudo high frequency sub-band power of said sub-band, or the mean value of said pseudo high frequency sub-band power difference of each sub-band.

6. The encoding device according to claim 5, wherein said pseudo high frequency sub-band power difference calculating means calculate said evaluated value based on said pseudo high frequency sub-band power difference of different frames.

7. The encoding device according to claim 5, wherein said pseudo high frequency sub-band power difference calculating means calculate said evaluated value using said pseudo high frequency sub-band power difference multiplied by weight that is weight for each sub-band such that the lower frequency side the sub-band is, the greater weight thereof is.

8. The encoding device according to claim 5, wherein said pseudo high frequency sub-band power difference calculating means calculate said evaluated value using said pseudo high frequency sub-band power difference multiplied by weight that is weight for each sub-band such that the greater said high frequency sub-band power of the sub-band is, the greater weight thereof is.

9. An encoding method comprising: a sub-band dividing step arranged to divide an input signal into a plurality of sub-bands, and to generate a low frequency sub-band signal made up of a plurality of sub-bands at a low frequency side and a high frequency sub-band signal made up of a plurality of sub-bands at a high frequency side; a feature amount calculating step arranged to calculate feature amount that expresses a feature of said input signal, using at least one of said low frequency sub-band signal generated by the processing in said sub-band dividing step, and said input signal; a pseudo high frequency sub-band power calculating step arranged to calculate a pseudo high frequency sub-band power that is a pseudo power of said high frequency sub-band signal based on said feature amount calculated by the processing in said feature amount calculating step; a pseudo high frequency sub-band power difference calculating step arranged to calculate a high frequency sub-band power that is the power of said high frequency sub-band signal from said high frequency sub-band signal generated by the processing in said sub-band dividing step, and to calculate pseudo high frequency sub-band power difference that is difference as to said pseudo high frequency sub-band power calculated by the processing in said pseudo high frequency sub-band power calculating step; a high frequency encoding step arranged to encode said pseudo high frequency sub-band power difference calculated by the processing in said pseudo high frequency sub-band power difference calculating step to generate high frequency encoded data; a low frequency encoding step arranged to encode a low frequency signal that is a low frequency signal of said input signal to generate low frequency encoded data; and a multiplexing step arranged to multiplex said low frequency encoded data generated by the processing in said low frequency encoding step, and said high frequency encoded data generated by the processing in said high frequency encoding step to obtain an output code string.

10. A non-transitory computer-readable medium encoded with instructions which, when executed by a computer, cause the computer to execute processing comprising: a sub-band dividing step arranged to divide an input signal into a plurality of sub-bands, and to generate a low frequency sub-band signal made up of a plurality of sub-bands at a low frequency side and a high frequency sub-band signal made up of a plurality of sub-bands at a high frequency side; a feature amount calculating step arranged to calculate feature amount that expresses a feature of said input signal, using at least one of said low frequency sub-band signal generated by the processing in said sub-band dividing step, and said input signal; a pseudo high frequency sub-band power calculating step arranged to calculate a pseudo high frequency sub-band power that is a pseudo power of said high frequency sub-band signal based on said feature amount calculated by the processing in said feature amount calculating step; a pseudo high frequency sub-band power difference calculating step arranged to calculate a high frequency sub-band power that is the power of said high frequency sub-band signal from said high frequency sub-band signal generated by the processing in said sub-band dividing step, and to calculate pseudo high frequency sub-band power difference that is difference as to said pseudo high frequency sub-band power calculated by the processing in said pseudo high frequency sub-band power calculating step; a high frequency encoding step arranged to encode said pseudo high frequency sub-band power difference calculated by the processing in said pseudo high frequency sub-band power difference calculating step to generate high frequency encoded data; a low frequency encoding step arranged to encode a low frequency signal that is a low frequency signal of said input signal to generate low frequency encoded data; and a multiplexing step arranged to multiplex said low frequency encoded data generated by the processing in said low frequency encoding step, and said high frequency encoded data generated by the processing in said high frequency encoding step to obtain an output code string.

* * * * *